United States Patent
Park et al.

(10) Patent No.: US 10,154,271 B2
(45) Date of Patent: Dec. 11, 2018

(54) METHOD AND APPARATUS FOR INTER-LAYER DECODING VIDEO USING DEPTH-BASED DISPARITY VECTOR, AND METHOD AND APPARATUS FOR INTER-LAYER ENCODING VIDEO USING DEPTH-BASED DISPARITY VECTOR

(71) Applicant: SAMSUNG ELECTRONICS CO., LTD., Suwon-si (KR)

(72) Inventors: Min-woo Park, Hwaseong-si (KR); Jin-young Lee, Hwaseong-si (KR); Byeong-doo Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 214 days.

(21) Appl. No.: 14/904,600

(22) PCT Filed: Jul. 14, 2014

(86) PCT No.: PCT/KR2014/006337
§ 371 (c)(1),
(2) Date: Jan. 12, 2016

(87) PCT Pub. No.: WO2015/005753
PCT Pub. Date: Jan. 15, 2015

(65) Prior Publication Data
US 2016/0165241 A1  Jun. 9, 2016

Related U.S. Application Data

(60) Provisional application No. 61/845,589, filed on Jul. 12, 2013.

(51) Int. Cl.
*H04N 19/597* (2014.01)
*H04N 19/105* (2014.01)
(Continued)

(52) U.S. Cl.
CPC .......... *H04N 19/30* (2014.11); *H04N 19/103* (2014.11); *H04N 19/136* (2014.11);
(Continued)

(58) Field of Classification Search
CPC ....... H04N 19/30; H04N 19/597; H04N 19/52
See application file for complete search history.

(56) References Cited

U.S. PATENT DOCUMENTS 9,451,267 B2    9/2016  Lee et al.
2011/0122950 A1  5/2011  Ji et al.
(Continued)

FOREIGN PATENT DOCUMENTS

CN   103098467 A   5/2013
EP     0986262 A2   3/2000
(Continued)

OTHER PUBLICATIONS

Sullivan, Meeting report of the forth meeting of the Joint Collaborative Team on 3D Video Coding Extension Development (JCT-3V), Incheon, KR, Apr. 20-26, 2013, Joint Collaborative Team on 3D Video Coding Extension Development of ITU-T SG 16 WP 3 and ISO/IEC JTC 1/SC 29/WG 11 4th Meeting: Incheon, KR, Apr. 20-26, 2013 JCT3V-D_Notes_d9; entire document.*

(Continued)

*Primary Examiner* — David J Czekaj
*Assistant Examiner* — Alison Slater
(74) *Attorney, Agent, or Firm* — Sughrue Mion, PLLC

(57) ABSTRACT

An inter-layer decoding method including reconstructing a color image and a depth image of a first layer based on encoding information obtained from a bitstream; determining, from the depth image of the first layer, a depth image block of the first layer corresponding to a current block of a second layer image to be decoded; determining whether an area included in the determined depth image block deviates (Continued)

from a boundary of the depth image of the first layer; when the area included in the depth image block deviates from the boundary, determining a depth value of the area deviating from the boundary of the depth image; determining a disparity vector indicating a corresponding block of the first layer image with respect to the current block, based on the determined depth value; and reconstructing the current block by using the disparity vector.

7 Claims, 32 Drawing Sheets

(51) Int. Cl.
| | |
|---|---|
| *H04N 19/176* | (2014.01) |
| *H04N 19/30* | (2014.01) |
| *H04N 19/503* | (2014.01) |
| *H04N 19/513* | (2014.01) |
| *H04N 19/52* | (2014.01) |
| *H04N 19/103* | (2014.01) |
| *H04N 19/136* | (2014.01) |
| *H04N 19/167* | (2014.01) |
| *H04N 19/187* | (2014.01) |
| *H04N 19/44* | (2014.01) |
| *H04N 19/563* | (2014.01) |
| *H04N 19/55* | (2014.01) |

(52) U.S. Cl.
CPC ......... *H04N 19/167* (2014.11); *H04N 19/176* (2014.11); *H04N 19/187* (2014.11); *H04N 19/44* (2014.11); *H04N 19/55* (2014.11); *H04N 19/563* (2014.11); *H04N 19/597* (2014.11)

(56) References Cited

U.S. PATENT DOCUMENTS

| | | | |
|---|---|---|---|
| 2013/0083853 A1 | 4/2013 | Coban et al. | |
| 2013/0266208 A1 | 10/2013 | Lim et al. | |
| 2013/0287093 A1* | 10/2013 | Hannuksela | H04N 19/00769 375/240.02 |
| 2014/0192154 A1 | 7/2014 | Jeong et al. | |
| 2015/0103896 A1* | 4/2015 | Kim | H04N 19/52 375/240.12 |
| 2015/0146103 A1* | 5/2015 | Koo | H04N 19/597 348/607 |
| 2015/0201216 A1* | 7/2015 | Lin | H04N 19/597 348/42 |
| 2015/0245063 A1* | 8/2015 | Rusanovskyy | H04N 19/597 375/240.12 |

FOREIGN PATENT DOCUMENTS

| | | |
|---|---|---|
| EP | 3059966 A1 | 8/2016 |
| JP | 6-351001 A | 12/1994 |
| KR | 10-2009-0130712 A | 12/2009 |
| KR | 10-1039204 A | 6/2011 |
| KR | 10-2012-0018915 A | 3/2012 |
| WO | 2012/020977 A2 | 2/2012 |
| WO | 2013/022297 A2 | 2/2013 |
| WO | 2013/068547 A2 | 5/2013 |
| WO | 2013/069933 A1 | 5/2013 |

OTHER PUBLICATIONS

Search Report dated Oct. 16, 2014, issued by the International Searching Authority in counterpart International Application No. PCT/KR2014/006337 (PCT/ISA/210).
Written Opinion dated Oct. 16, 2014, issued by the International Searching Authority in counterpart International Application No. PCT/KR2014/006337 (PCT/ISA/237).
Min Woo Park, et al., "3D-CE2.h related: Clipping in depth-based disparity vector derivation", Joint Collaborative Team on 3D Video Coding Extensions of ITU-T SG 16 WP 3 and ISO/IEC JTC 1/SC 29/WG 11, 5th Meeting: Vienna, AT, Jul. 27-Aug. 2, 2013, Document: JCT3V-E0141 (cited as "JCT3V-E0141 Ver. 1" in Cite No. 10; cited as "JCT3V-E0141" and "XP030131161" in Cite No. 18), total 4 pages.
Shinya Shimizu, et al., "3D-CE2.h-related: Clipping in the depth-based disparity vector refinement", Joint Collaborative Team on 3D Video Coding Extensions of ITU-T SG 16 WP 3 and ISO/IEC JTC 1/SC 29/WG 11, 5th Meeting: Vienna, AT, Jul. 27-Aug. 2, 2013, Document: JCT3V-E0209 (cited as "JCT3V-E0209 Ver. 1" in Cite No. 10; cited as "JCT3V-E209" and "XP030131253" in Cite No. 182, total 4 pages.
Gerhard Tech, et al., "3D-HEVC Test Model 4", Joint Collaborative Team on 3D Video Coding Extension Development of ITU-T SG 16 WP 3 and ISO/IEC JTC 1/SC 29/WG 11, 4th Meeting: Incheon, KR, Apr. 20-26, 2013, Document: JCT3V-D1005-v4, total 53 pages.
Communication dated Dec. 22, 2016, issued by the Korean Intellectual Property Office in counterpart Korean application No. 10-2015-7006921.
Yu-Lin Chang, et al., "CE1.h: Depth-oriented Neighboring Block Disparity Vector (DoNBDV) with virtual depth retrieval", Joint Collaborative Team on 3D Video Coding Extension Development of ITU-T SG 16 WP 3 and ISO/IEC JTC 1/SC 29/WG 11, 3rd Meeting: Geneva, CH, Jan. 17-23, 2013, Document: JCT3V-C0131 (cited as "JCTSV-C0131 version 3" in Cite No. 122, total 19 pages.
Communication dated Jan. 4, 2017, issued by the Japanese Patent Office in counterpart Japanese application No. 2016-525298.
Gerhard Tech, et al., "3D-HEVC Test Model 4", Joint Collaborative Team on 3D Video Coding Extension Development of ITU-T SG 16 WP 3 and ISO/IEC JTC 1/SC 29/WG 11, 4th Meeting: Incheon, KR, Apr. 20-26, 2013, Document: JCT3V-D1005-spec-v1 (cited as "JCT3V-D1005" in Cite No. 18), XP030130998, total 88 pages.
Gerhard Tech, et al., "3D-HEVC Test Model 4", Joint Collaborative Team on 3D Video Coding Extension Development of ITU-T SG 16 WP 3 and ISO/IEC JTC 1/SC 29/WG 11, 4th Meeting: Incheon, KR, Apr. 20-26, 2013, Document: JCT3V-D1005-v1 (cited as "JCT3V-D1005" in Cite No. 18), XP030130983, total 52 pages.
Shinya Shimizu, et al., "3D-CE1.h-related: Clipping operations in VSP", Joint Collaborative Team on 3D Video Coding Extensions of ITU-T SG 16 WP 3 and ISO/IEC JTC 1/SC 29/WG 11, 5th Meeting: Vienna, AT, Jul. 27-Aug. 2, 2013, Document: JCT3V-E0208, XP030131252, total 4 pages.
Gerhard Tech, et al., "3D-HEVC Draft Text 1", Joint Collaborative Team on 3D Video Coding Extension Development of ITU-T SG 16 WP 3 and ISO/IEC JTC 1/SC 29/WG 11, 5th Meeting: Vienna, AT, Jul. 27-Aug. 2, 2013, Document: JCT3V-E1001-v3, XP030131378, total 89 pages.
Li Zhang, et al., "3D-HEVC Test Model 5", Joint Collaborative Team on 3D Video Coding Extension Development of ITU-T SG 16 WP 3 and ISO/IEC JTC 1/SC 29/WG 11, 5th Meeting: Vienna, AT, Jul. 27-Aug. 2, 2013, Document: JCT3V-E1005, XP030131385, total 50 pages.
Communication dated Feb. 15, 2017, issued by the European Patent Office in counterpart European application No. 14822819.0.
Communication issued by the Japanese Patent Office dated Jul. 4, 2017 in counterpart Japanese Patent Application No. 2016-525298.
Yu-Lin Chang et al., "3D-CE2.h related: Simplified DV derivation for DoNBDV and BVSP", Joint Collaborative Team on 3D Video Coding Extensions of ITU-T SG 16 WP 3 and ISO/IEC JTC 1/SC 29/WG 11, 4th Meeting, Apr. 20-26, 2013, Document: JCT3V-D0138, Total 6 pages, Incheon, KR, Source: MediaTek Inc.
Communication dated Feb. 28, 2018 issued by the State Intellectual Property Office of P.R. China in counterpart Chinese Patent Application No. 201480050588.X.

\* cited by examiner

REFERENCE
PICTURE

CURRENT
PICTURE

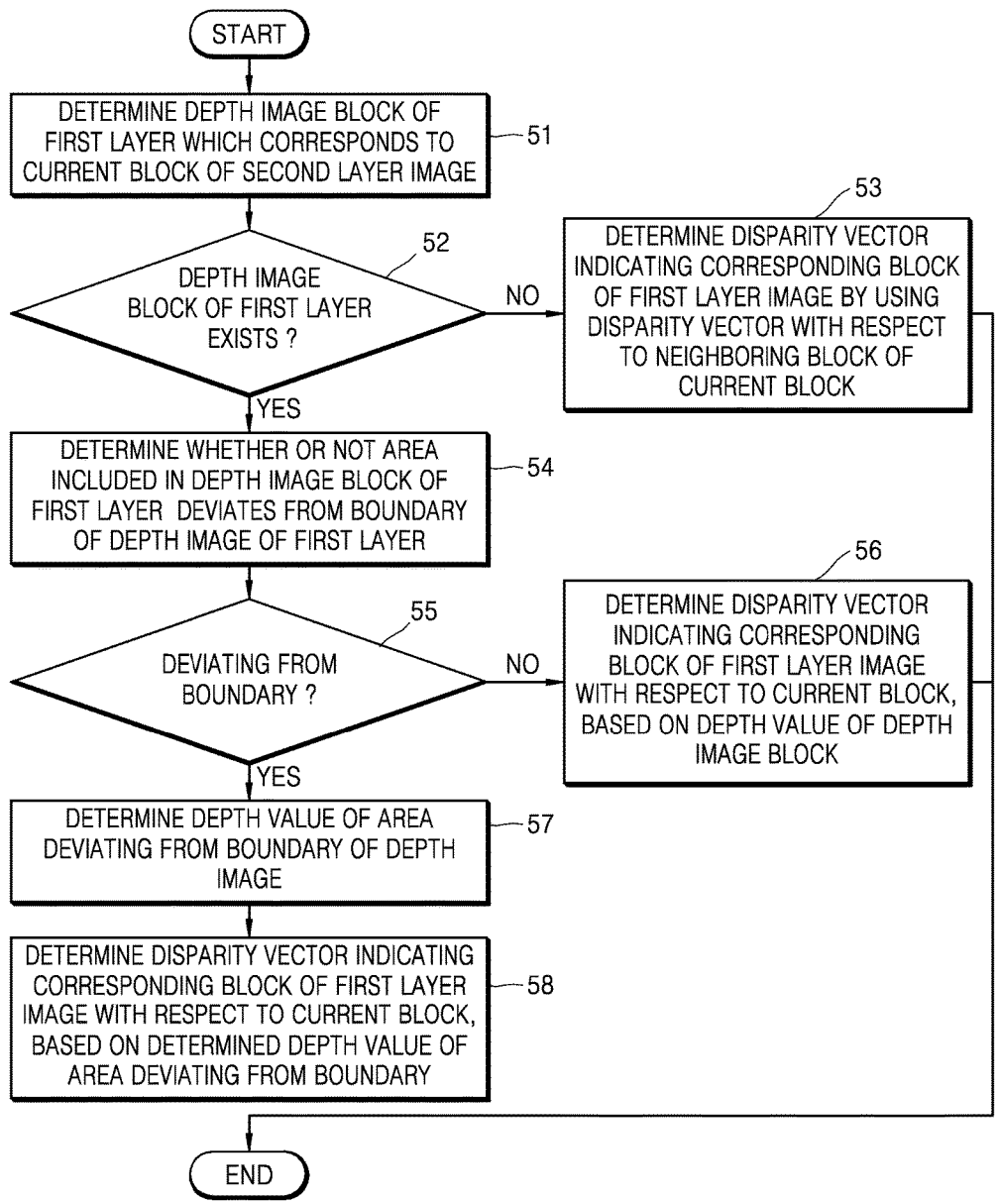

FIG. 15
PARTITION TYPE (800)
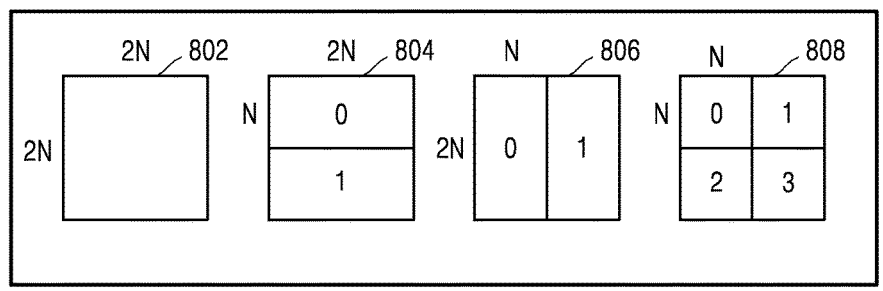
PREDICTION MODE (810)
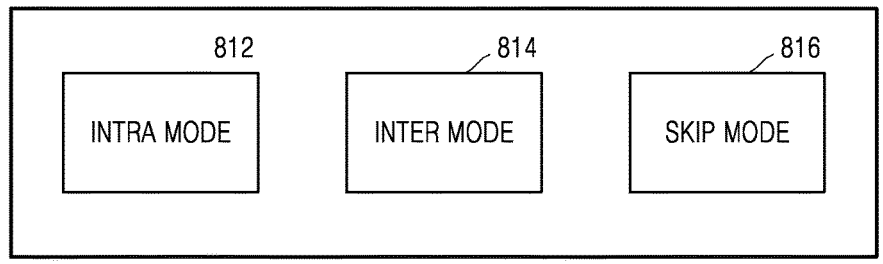
SIZE OF TRANSFORMATION UNIT (820)
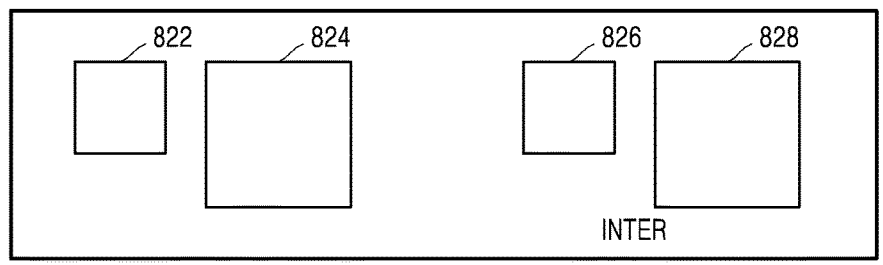

CODING UNIT (1010)

METHOD AND APPARATUS FOR INTER-LAYER DECODING VIDEO USING DEPTH-BASED DISPARITY VECTOR, AND METHOD AND APPARATUS FOR INTER-LAYER ENCODING VIDEO USING DEPTH-BASED DISPARITY VECTOR

TECHNICAL FIELD

Various embodiments relate to an inter-layer video decoding method and apparatus therefor that use a depth-based disparity vector, and an inter-layer video encoding method and apparatus therefor that use a depth-based disparity vector. In more detail, various embodiments relate to an inter-layer video decoding method and apparatus therefor that use a depth-based disparity vector determined near a boundary of a reference-view depth image, and an inter-layer video encoding method and apparatus therefor that use a depth-based disparity vector determined near a boundary of a reference-view depth image.

BACKGROUND ART

As hardware for reproducing and storing high resolution or high quality video content is being developed and supplied, a need for a video codec for effectively encoding or decoding the high resolution or high quality video content is increasing. According to a video codec of the related art, a video is encoded according to a limited encoding method based on based on coding units of a tree structure.

Image data of a spatial domain is transformed into coefficients of a frequency domain via frequency transformation. According to a video codec, an image is split into blocks of predetermined size, DCT is performed on each block, and frequency coefficients are encoded in block units, for rapid calculation of frequency transformation. Compared with image data of a spatial domain, coefficients of a frequency domain are easily compressed. In particular, since an image pixel value of a spatial domain is expressed according to a prediction error via inter prediction or intra prediction of a video codec, when frequency transformation is performed on the prediction error, a large amount of data may be transformed to 0. According to a video codec, an amount of data may be reduced by replacing data that is consecutively and repeatedly generated with small-sized data.

A multilayer video codec encodes and decodes a first layer video and one or more second layer videos. By removing temporal/spatial redundancy of the first layer video and the second layer video, and redundancy between layers, amounts of data of the first layer video and the second layer video may be reduced.

DETAILED DESCRIPTION OF THE INVENTION

Technical Problem

Provided are inter-layer video encoding and decoding methods capable of improving a coding efficiency, when an area included a reference layer depth image block corresponding to a current layer block deviates from a boundary of a reference layer depth image, by determining a depth value of the area deviating from the boundary of the reference layer depth image, by determining a depth-based disparity vector indicating a corresponding block of a reference layer image according to the determined depth value of the area deviating from the boundary, and by coding the current layer block by directly and indirectly using the determined depth-based disparity vector.

Technical Solution

Additional aspects will be set forth in part in the description which follows and, in part, will be apparent from the description, or may be learned by practice of the presented embodiments.

According to an aspect of the present invention, there is provided an inter-layer decoding method including:

reconstructing a color image and a depth image of a first layer, based on encoding information about the color image and the depth image of the first layer, wherein the encoding information is obtained from a bitstream;

determining, from the depth image of the first layer, a depth image block of the first layer which corresponds to a current block of a second layer image to be decoded;

determining whether an area included in the determined depth image block of the first layer deviates from a boundary of the depth image of the first layer;

when the area included in the depth image block deviates from the boundary, determining a depth value of the area deviating from the boundary of the depth image;

determining a disparity vector indicating a corresponding block of the first layer image with respect to the current block, based on the determined depth value of the area deviating from the boundary of the depth image; and reconstructing the current block by using the disparity vector.

According to another aspect of the present invention, there is provided a computer-readable recording medium having recorded thereon a program for performing the method according to the aspect of the present invention.

Advantageous Effects

A coding efficiency may be improved, when an area included a reference layer depth image block corresponding to a current layer block deviates from a boundary of a reference layer depth image, by determining a depth value of the area deviating from the boundary of the reference layer depth image, by determining a depth-based disparity vector indicating a corresponding block of a reference layer image according to the determined depth value of the area deviating from the boundary, and by coding the current layer block by directly and indirectly using the determined depth-based disparity vector.

DESCRIPTION OF THE DRAWINGS

FIG. 5 illustrates a flowchart of determining, by the inter-layer video decoding apparatus, a depth-based disparity vector, according to an embodiment.

FIG. 15 illustrates a plurality of pieces of encoding information, according to an embodiment of the present invention.

BEST MODE

Figure 1A:
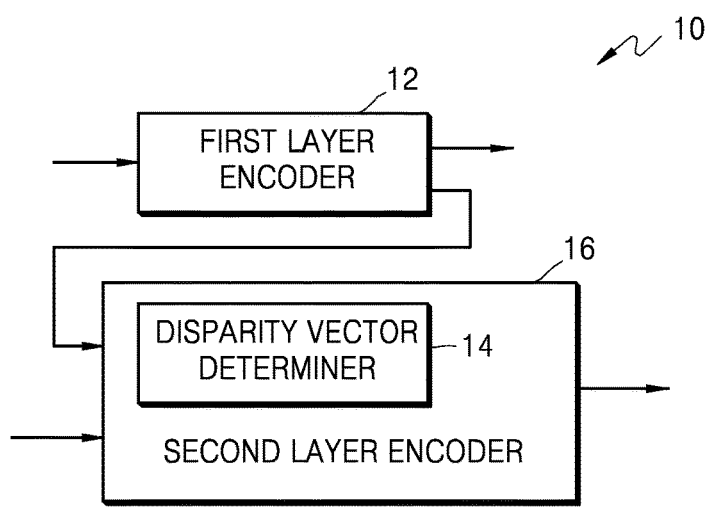
FIG. 1A illustrates a block diagram of an inter-layer video encoding apparatus, according to an embodiment.

According to an aspect of the present invention, there is provided an inter-layer decoding method including reconstructing a color image and a depth image of a first layer, based on encoding information about the color image and the depth image of the first layer, wherein the encoding information is obtained from a bitstream; determining, from the depth image of the first layer, a depth image block of the first layer which corresponds to a current block of a second layer image to be decoded; determining whether an area included in the determined depth image block of the first layer deviates from a boundary of the depth image of the first layer; when the area included in the depth image block deviates from the boundary, determining a depth value of the area deviating from the boundary of the depth image; determining a disparity vector indicating a corresponding block of the first layer image with respect to the current block, based on the determined depth value of the area deviating from the boundary of the depth image; and reconstructing the current block by using the disparity vector.

The determining of the depth value of the area deviating from the boundary of the depth image may include setting the depth value of the area deviating from the boundary as a depth value at the boundary of the depth image of the first layer; and determining the depth value of the area deviating from the boundary by referring to the set depth value of the depth image of the first layer.

The determining of the depth value of the area deviating from the boundary of the depth image may include determining the depth value of the area deviating from the boundary by setting coordinates of the area deviating from the boundary so as for the coordinates to correspond to coordinates at the boundary of the depth image of the first layer.

The determining of the disparity vector may include determining a representative depth value from among depth values of all areas or part areas in the depth image block, based on the depth value of the area deviating from the boundary of the depth image; and determining the disparity vector indicating the corresponding block of the first layer image, based on the determined representative depth value.

The determining of the representative depth value may include selecting a plurality of areas of the depth image block, based on the depth value of the area deviating from the boundary of the depth image; and comparing depth values of the plurality of selected areas and determining the representative depth value.

The determining of the depth value of the area deviating from the boundary of the depth image may include determining whether to determine the depth value of the area deviating from the boundary of the depth image, according to a prediction mode of the current block; and determining the depth value of the area deviating from the boundary of the depth image, based on a result of the determining of whether to determine the depth value of the area deviating from the boundary of the depth image according to the prediction mode of the current block.

When the area included in the determined depth image block of the first layer deviates from the boundary of the depth image of the first layer, the inter-layer decoding method may further include not determining the disparity vector based on a depth value of the depth image block.

The determining of the depth value of the area deviating from the boundary of the depth image may include determining the depth value of the area deviating from the boundary as a predetermined depth value.

According to another aspect of the present invention, there is provided an inter-layer encoding method including generating a bitstream including encoding information generated by encoding a color image and a depth image of a first layer; determining, from the depth image of the first layer, a depth image block of the first layer which corresponds to a current block of a second layer image to be encoded; determining whether an area included in the determined depth image block of the first layer deviates from a boundary of the depth image of the first layer; when the area included in the depth image block deviates from the boundary, determining a depth value of the area deviating from the boundary of the depth image; determining a disparity vector indicating a corresponding block of the first layer with respect to the current block, based on the determined depth value of the area deviating from the boundary; and encoding the current block by using the disparity vector.

The determining of the depth value of the area deviating from the boundary of the depth image may include determining the depth value of the area deviating from the boundary by referring to a depth value of the depth image of the first layer.

The determining of the depth value of the area deviating from the boundary of the depth image may include determining the depth value of the area deviating from the boundary by setting coordinates of the area deviating from the boundary so as for the coordinates to correspond to coordinates at the boundary of the depth image of the first layer.

The determining of the disparity vector may include determining a representative depth value from among depth values of all areas or part areas in the depth image block, based on the depth value of the area deviating from the boundary of the depth image; and determining the disparity vector indicating the corresponding block of the first layer, based on the determined representative depth value.

The determining of the representative depth value may include selecting a plurality of areas of the depth image block, based on the depth value of the area deviating from the boundary of the depth image; and comparing depth values of the plurality of selected areas and determining the representative depth value.

The determining of the depth value of the area deviating from the boundary of the depth image may include determining whether to determine the depth value of the area deviating from the boundary of the depth image, according to a prediction mode of the current block; and determining the depth value of the area deviating from the boundary of the depth image, based on a result of the determining of whether to determine the depth value of the area deviating from the boundary of the depth image according to the prediction mode of the current block.

According to another aspect of the present invention, there is provided an inter-layer decoding apparatus including a first layer encoder configured to reconstruct a color image and a depth image of a first layer, based on encoding information about the color image and the depth image of the first layer, wherein the encoding information is obtained from a bitstream; a disparity vector determiner configured to determine, from the depth image of the first layer, a depth image block of the first layer which corresponds to a current block of a second layer image to be decoded, to determine whether an area included in the determined depth image block of the first layer deviates from a boundary of the depth image of the first layer, when the area included in the depth image block deviates from the boundary, to determine a depth value of the area deviating from the boundary of the depth image, and to determine a disparity vector indicating a corresponding block of the first layer image with respect to the current block, based on the determined depth value of the area deviating from the boundary of the depth image; and a second layer encoder configured to reconstruct the current block by using the disparity vector.

MODE OF THE INVENTION

Hereinafter, an inter-layer video encoding technique and an inter-layer video decoding technique that use a disparity vector determined by using a reference layer image, according to various embodiments, are provided with reference to FIGS. 1A through 7B. In more detail, an inter-layer video encoding technique and an inter-layer video decoding technique that use a disparity vector determined near a boundary of a reference layer depth image, according to various embodiments, are provided with reference to FIGS. 1A through 7B. In addition, a video encoding technique and a video decoding technique based on coding units of a tree structure according to various embodiments, which may be applied to the inter-layer video encoding technique and the inter-layer video decoding technique, are provided with reference to FIGS. 8 through 20. In addition, various embodiments to which the video encoding technique and the video decoding technique may be applied are provided with reference to FIGS. 21 through 27.

Hereinafter, an 'image' may indicate a still image of a video, or a moving image, i.e., a video itself.

Hereinafter, a 'sample' means data that is allocated to a sampling position of an image and is a processing target. For example, pixels in an image in a spatial domain may be samples.

First, with reference to FIGS. 1A through 7B, an inter-layer video encoding method and an inter-layer video encoding apparatus that use a depth-based disparity vector determined by using a reference-view depth image, and an inter-layer video decoding apparatus and an inter-layer video decoding method that use a depth-based disparity vector determined by using a reference-view depth image, according to embodiments, are provided.

Figure 1B:
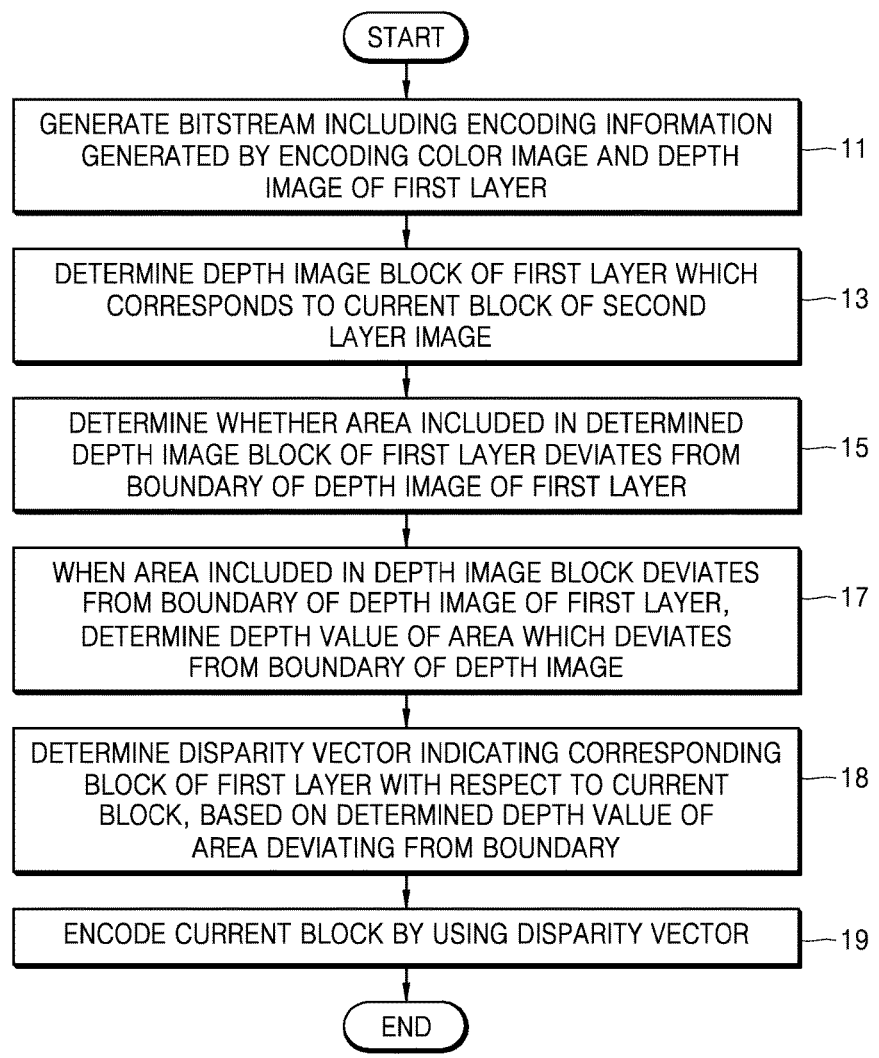
FIG. 1B illustrates a flowchart of an inter-layer video encoding method, according to an embodiment.

FIG. 1A illustrates a block diagram of an inter-layer video encoding apparatus 10, according to an embodiment. FIG. 1B illustrates a flowchart of an inter-layer video encoding method, according to an embodiment.

The inter-layer video encoding apparatus 10 according to various embodiments includes a first layer encoder 12 and a second layer encoder 16. The second layer encoder 16 may include a disparity vector determiner 14. On the other hand, the disparity vector determiner 14 may be formed outside the second layer encoder 16.

The inter-layer video encoding apparatus 10 according to various embodiments may encode each of a plurality of image sequences according to layers by using a scalable video coding scheme, and may output a separate stream including encoded data of each of the layers. The inter-layer video encoding apparatus 10 may encode a first layer image sequence and a second layer image sequence to different layers.

The first layer encoder 12 may encode first layer images, and may output a first layer stream including encoded data of the first layer images.

The second layer encoder 16 may encode second layer images, and may output a second layer stream including encoded data of the second layer images.

For example, according to the scalable video coding scheme based on spatial scalability, low resolution images may be encoded as the first layer images, and high resolution images may be encoded as the second layer images. An encoding result of the first layer images may be output as a first layer stream, and an encoding result of the second layer images may be output as a second layer stream.

As another example, a multiview video may be encoded according to the scalable video coding scheme. Left-view images may be encoded as the first layer images, and right-view images may be encoded as the second layer images. Alternatively, each of center-view images, left-view images, and right-view images may be encoded, and among these images, the center-view images may be encoded as the first layer images, the left-view images may be encoded as second layer images, and the right-view images may be encoded as third layer images.

As another example, the scalable video coding method may be performed according to temporal hierarchical prediction based on temporal scalability. A first layer stream including encoding information may be output, wherein the encoding information is generated by encoding images with a base frame rate. Temporal levels may be classified according to frame rates, and may be encoded to layers, respectively. By further encoding images with a high speed frame rate by referring to the images of the base frame rate, a second layer stream including encoding information about the high speed frame rate may be output.

Also, scalable video coding may be performed on a first layer and a plurality of second layers. In a case where the number of the second layers is equal to or greater than 3, first layer images, first second-layer images, second second-layer images, . . . , and Kth second-layer images may be encoded. Accordingly, an encoding result of the first layer images may be output as a first layer stream, and encoding results of the first second-layer images, the second second-layer images, . . . , and the Kth second-layer images may be output as a first second-layer stream, a second second-layer stream, . . . , and a Kth second-layer stream, respectively.

The inter-layer video encoding apparatus 10 according to various embodiments may perform inter prediction by which a current image is predicted by referring to images of a single layer. Via the inter prediction, a motion vector indicating motion information between the current image and a reference image, and a residual component between the current image and the reference image may be generated.

Also, the inter-layer video encoding apparatus 10 may perform inter-layer prediction by which second layer images are predicted by referring to first layer images.

Also, when the inter-layer video encoding apparatus 10 according to the embodiment allows at least three layers of a first layer, a second layer, a third layer, etc., the inter-layer video encoding apparatus 10 may perform the inter-layer prediction between a first layer image and a third layer image, and may perform the inter-layer prediction between a second layer image and the third layer image, according to a multilayer prediction structure.

Via the inter-layer prediction, a location difference component between a reference image of another layer and the current image, and a residual component between the reference image of the other layer and the current image may be generated.

An inter-layer prediction structure will be described in detail with reference to FIG. 3.

The inter-layer video encoding apparatus 10 according to various embodiments encodes each of blocks of each of images of a video according to layers. A type of a block may be a square, a rectangle, or a random geometric shape. A block is not limited to a data unit of a constant size. The block may be a largest coding unit, a coding unit, a prediction unit, a transformation unit, etc. from among coding units of a tree structure. A largest coding unit including coding units of a tree structure may be variously called a coding tree unit, a coding block tree, a block tree, a root block tree, a coding tree, a coding root, or a tree trunk. Video encoding and decoding methods using the coding units of the tree structure will be described with reference to FIGS. 8 through 20.

The inter prediction and the inter-layer prediction may be performed by using a data unit of the coding unit, the prediction unit, or the transformation unit.

The first layer encoder 12 according to various embodiments may generate symbol data by performing source coding operations including the inter prediction or intra prediction on the first layer image. The symbol data indicates a sample value of each encoding parameter, and a sample value of a residual component.

For example, the first layer encoder 12 may generate the symbol data by performing the inter prediction or intra prediction, transformation, and quantization on samples of a data unit of the first layer images, and may generate the first layer stream by performing entropy encoding on the symbol data.

The second layer encoder 16 may encode the second layer images, based on the coding units of the tree structure. The second layer encoder 16 may generate symbol data by performing the inter prediction or intra prediction, the transformation, and the quantization on samples of a coding unit of a second layer image, and may generate the second layer stream by performing entropy encoding on the symbol data.

The second layer encoder 16 according to various embodiments may perform inter-layer prediction to predict the second layer image, by using prediction information of the first layer image. In order to encode a second layer original image among the second layer image sequence via the inter-layer prediction structure, the second layer encoder 16 may determine prediction information of a second layer current image by using prediction information of a reconstructed first layer image, and may generate a second layer prediction image based on the determined prediction information and thus may encode a prediction error between the second layer original image and the second layer prediction image.

Meanwhile, the second layer encoder 16 may perform the inter-layer prediction on the second layer image according to blocks such as the coding unit or the prediction unit so as to determine a block of the first layer image to be referred to by a block of the second layer image. For example, a reconstructed block of the first layer image that is positioned while corresponding to a position of a current block in the second layer image may be determined. The second layer encoder 16 may determine a second layer prediction block by using a reconstructed first layer block corresponding to a second layer block.

The second layer encoder 16 may use the second layer prediction block as a reference image for inter-layer prediction of a second layer original block, wherein the second layer prediction block is determined by using the reconstructed first layer block according to the inter-layer prediction structure. The second layer encoder 16 may perform entropy encoding by transforming and quantizing, by using the reconstructed first layer image, a residual component according to the inter-layer prediction, i.e., a difference between a sample value of the second layer prediction block and a sample value of the second layer original block.

Meanwhile, when the aforementioned inter-layer video encoding apparatus 10 encodes the multiview video, a first layer image to be encoded may be a first view video, and a second layer image may be a second view video. Since the multiview images are obtained at a same time, similarity among images of each view is very high.

The multiview images may have a disparity since characteristics of an image capturing position, an image capturing angle, an image capturing apparatus (a camera, a lens, etc.), or the like vary according to views. Here, the disparity means a difference between the multiview images which occurs in the multiview images of a same time. In more detail, the disparity may mean a difference in distances between same objects in the multiview images. The disparity may be expressed as a disparity vector. Here, the disparity vector means a vector indicating displacement of the object which occurs due to a change in positions of the object in the multiview images. That is, the disparity vector may correspond to a temporal-direction motion vector within a view in a view direction.

An encoding efficiency may be increased by performing disparity compensated prediction by which an area in another view image which is the most similar to a block to be currently encoded is searched for by using the disparity vector and is encoded.

Meanwhile, the inter-layer video encoding apparatus 10 may determine the disparity vector for the inter-layer prediction, and may transmit information about the determined disparity vector to an inter-layer video decoding apparatus 20 via a bitstream.

In addition, the inter-layer video encoding apparatus 10 may allow the disparity vector to be predicted (or to be derived) from a plurality of pieces of other coding information so as to decrease an amount of data to be transmitted in each prediction unit. For example, the disparity vector may be predicted from temporally or spatially neighboring blocks of a block to be currently decoded and encoded. The inter-layer video encoding apparatus 10 may search for an area corresponding to the block to be currently decoded and encoded, by using the disparity vector predicted (or derived) from the neighboring block.

The inter-layer video encoding apparatus 10 may determine a disparity vector by using a reference layer depth image, and by doing so, the inter-layer video encoding apparatus 10 may further search for the area corresponding to the block to be currently decoded and encoded, compared to the disparity vector predicted from the neighboring block, so that decoding and encoding performances and accuracy of prediction may be improved.

For example, the inter-layer video encoding apparatus 10 may determine the disparity vector by using a depth image in a manner below.

$$\text{Disparity vector} = (s*\text{depth value} + o, 0) \quad \text{[Equation 1]}$$

Here, for convenience of description, it is assumed that a y component of the disparity vector, i.e., a vertical component, is 0. That is, it is assumed that positions of an object in multiview images are only horizontally changed according to a change in views in the multiview images. An x component of the disparity vector may be calculated by multiplying a depth value by s and adding o. Here, s means a scale factor, the depth value means a depth value of a particular pixel in the depth image, and o means an offset. The scale factor and the offset may be determined from a camera parameter with respect to a reference layer image. For example, the camera parameter may include a focal distance and baseline information of a camera. Here, the baseline information of the camera means information about a distance between the camera and a lens.

The depth image may store the depth value with respect to the particular pixel of a corresponding layer color image. The depth value may include information about a distance between the camera and the object. For example, in a depth image having a bit depth of 8-bit, a maximum distance and a minimum distance may be mapped from 0 through 255. Here, since a distance and displacement of the object are in inverse proportion, displacement of each pixel may be estimated by using the depth value, and a new view image may be virtually generated based on them. That is, the depth image may be used to provide a method of providing multiview images by synthesizing a virtual view by using less-views images.

Here, for convenience of description, it is assumed that the y component of the disparity vector, i.e., the vertical component, is 0, but it is not limited thereto, and the vertical component may have a value other than 0, and in this regard, the y component may be calculated in a manner that the x component is calculated via Equation 1.

When the inter-layer video encoding apparatus 10 determines a disparity vector by using a depth value included in a depth correspondence block, an area included in the depth correspondence block may deviate from a boundary of a reference view depth image. Here, the depth correspondence block means a predetermined-size block in the reference view depth image which corresponds to a current block.

Since the inter-layer video encoding apparatus 10 cannot use a depth value of the area deviating from the boundary of the reference view depth image and included in the depth correspondence block, if the disparity vector is predicted (derived), compared to a disparity vector predicted from a case where the depth correspondence block includes all parts of the reference view depth image, the inter-layer video encoding apparatus 10 searches for an area less similar to the block to be currently coded, such that a coding efficiency and accuracy of prediction may deteriorate.

When the area included in the depth correspondence block deviates from the boundary of the reference view depth image, the inter-layer video encoding apparatus 10 according to the embodiment of the present invention limits coordinates of the area of the depth correspondence block which deviates from the boundary so as for the coordinates to correspond to coordinates within a boundary of the depth correspondence block so as to include an area of the depth correspondence block which is located within the boundary of the reference view depth image and not to include an area located outside the boundary, so that the inter-layer video encoding apparatus 10 may predict (or may derive) the disparity vector without using a depth value of the area outside the boundary. When actually embodied, the area outside the depth image may be padded with a boundary pixel. That is, when actually embodied, a depth value of the area outside the depth image may be a depth value of a boundary pixel. In this case, even if the area deviates from the depth image, the inter-layer video encoding apparatus 10 changelessly refers to the deviating area and thus may determine the depth value of the area outside the depth image. That is, even if the area deviates from the depth image, the inter-layer video encoding apparatus 10 may completely refer to the area outside the depth image by using coordinates of the deviating area, and may determine the depth value of the area outside the depth image.

In particular, when the area included in the depth correspondence block deviates from the boundary of the reference view depth image, the inter-layer video encoding apparatus 10 according to the embodiment of the present invention may use a depth value of an area located within the boundary of the depth image and located within the depth correspondence block, and may determine a depth value of an area located outside the boundary of the depth image and located within the depth correspondence block as a depth value of the boundary of the depth value by limiting coordinates of the area of the depth correspondence block which deviates from the boundary so as for the coordinates to correspond to coordinates within the boundary of the depth correspondence block, so that the inter-layer video encoding apparatus 10 may predict (or may derive) a disparity vector indicating a block similar to the current block.

Hereinafter, a method of determining the depth-based disparity vector, the method performed by the inter-layer video encoding apparatus 10, will be described in detail with reference to FIGS. 4 through 7B.

The inter-layer video encoding apparatus 10 may perform entropy encoding by transforming and quantizing, by using the reconstructed first layer image, a residual component according to the inter-layer prediction, i.e., a difference between a sample value of the second layer prediction block and a sample value of the second layer original block. Also, an error between a plurality of pieces of prediction information may be entropy-encoded.

As described above, the second layer encoder 16 may encode a current layer image sequence by referring to reconstructed first layer images via the inter-layer prediction structure. However, the inter-layer video encoding apparatus 10 according to various embodiments may encode the second layer image sequence according to a single layer prediction structure, without referring to other layer samples. Therefore, it should not narrowly interpret that the inter-layer video encoding apparatus 10 performs only the inter-layer prediction of an inter-layer prediction structure so as to encode the second layer image sequence.

Hereinafter, an operation of the inter-layer video encoding apparatus 10 that determines the depth-based disparity vector for the inter-layer prediction is described in detail with reference to FIG. 1B. In descriptions below, a first layer image may mean a reference view image, and a second layer image may mean an image of a view which is currently encoded.

FIG. 1B illustrates a flowchart of an inter-layer video encoding method, according to various embodiments.

In operation 11, the first layer encoder 12 according to the embodiment may generate a bitstream including encoding information generated by encoding a color image and a depth image of a first layer.

In operation 13, the disparity vector determiner 14 according to the embodiment determines, from the depth image of the first layer, a depth image block of the first layer which corresponds to a current block of the second layer image. Here, in order to determine the depth image block of the first layer which corresponds to the current block, the disparity vector determiner 14 may determine whether a disparity vector is predictable by using a neighboring block of the current block, and if it is determined to be predictable, the disparity vector determiner 14 may predict (or may derive) the disparity vector by using the neighboring block. The disparity vector may indicate the depth image block of the first layer. Therefore, the disparity vector determiner 14 may determine the depth image block of the first layer by using the disparity vector predicted from the neighboring block. For example, the disparity vector determiner 14 may obtain a disparity vector from a neighboring block of a second layer current block, and when the disparity vector is obtained from the neighboring block, the disparity vector determiner 14 may predict a disparity vector of the current block by using the obtained disparity vector. A method of obtaining the disparity vector from the neighboring block of the second layer current block is described in detail with reference to FIG. 4. Therefore, when the disparity vector is obtained from the neighboring block, the disparity vector determiner 14 may determine that the disparity vector is predictable.

Meanwhile, the disparity vector determiner 14 may determine the depth image block of the first layer by using a depth-based disparity vector. Here, the depth-based disparity vector means a disparity vector predicted (or derived) based on a depth value. For example, the depth-based disparity vector may be the disparity vector predicted based on a random depth value. In particular, a range of a depth value having a depth of 8-bits corresponds to a depth value of 0 through 255, here, by using 128 that is a middle value of the depth value, the disparity vector indicating a corresponding block of the first layer image which corresponds to the current block may be predicted (or may be derived).

Also, for example, the depth-based disparity vector may mean a disparity vector obtained by predicting the disparity vector from the neighboring block, by determining a corresponding block of the depth image of the first layer which corresponds to the current block, and by performing prediction (or derivation) based on a depth value of the determined corresponding block of the depth image.

Also, for example, when the disparity vector determiner 14 performs view synthesis prediction with respect to the current block, the disparity vector determiner 14 predicts (or derives) a new disparity vector by using a depth value of the depth image of the first layer, here, in order to use the depth value of the depth image with respect to the first layer, the disparity vector determiner 14 may determine a corresponding block of the depth image with respect to the first layer. In order to determine the corresponding block of the depth image with respect to the first layer, a disparity vector indicating a depth image block with respect to the first layer which corresponds to the current block may be used, and this vector is referred to as an initial disparity vector.

However, determining the disparity vector so as to determine the depth image block with respect to the first layer is not limited to the aforementioned descriptions, and the disparity vector determiner 14 may determine a disparity vector that is predicted (or is derived) in various manners, and may determine the depth image block by using the predicted disparity vector. Also, a new disparity vector may be re-predicted (re-derived) by using the determined disparity vector, and the depth image block may be determined by using the new disparity vector. That is, the depth image block of the first layer which corresponds to the current block of the second layer image may be determined by using a disparity vector with various forms.

In operation 15, the disparity vector determiner 14 according to the embodiment may determine whether an area included in the determined depth image block of the first layer deviates from a boundary of the depth image of the first layer.

In operation 17, when the area included in the depth image block deviates from the boundary of the depth image of the first layer, the disparity vector determiner 14 according to the embodiment determines a depth value of the area of the depth image block which deviates from the boundary of the depth image. The disparity vector determiner 14 may determine the depth value of the area of the depth image block which deviates from the boundary of the depth image, as a depth value within the boundary included in the depth image block.

For example, the disparity vector determiner 14 may determine the depth value of the area deviating from the boundary of the depth image, as the depth value at the boundary of the depth image, by limiting coordinates of the area of the depth image block which deviates from the boundary so as for the coordinates to correspond to coordinates within a boundary of a depth correspondence block. As a result, the disparity vector determiner 14 may determine a disparity vector by using a depth value of the depth image within the boundary.

When actually embodied, the area outside the depth image may be padded with a boundary pixel. That is, when actually embodied, a depth value of the area outside the depth image may be a depth value of a boundary pixel. In this case, even if the area deviates from the depth image, the deviating area is changelessly referred to and the depth value of the area outside the depth image may be determined.

Meanwhile, the disparity vector determiner 14 may determine a prediction mode of the current block. Also, the disparity vector determiner 14 may determine the depth value of the area of the depth image block which deviates from the boundary of the depth image, according to the determined prediction mode of the current block. For example, when the prediction mode of the current block is a mode where prediction is performed according to view synthesis prediction, the disparity vector determiner 14 may not determine the depth value of the area of the depth image block which deviates from the boundary of the depth image. When the prediction mode of the current block is another prediction mode, not the mode where prediction is performed according to view synthesis prediction, the disparity vector determiner 14 may determine the depth value of the area of the depth image block which deviates from the boundary of the depth image. However, the disparity vector determiner 14 may determine or may not determine the depth value of the area deviating from the boundary of the depth image, according to various prediction modes, not limited to determining the depth value of the area deviating from the boundary of the depth image according to whether or not the prediction mode is the mode where the prediction is performed according to the view synthesis prediction. The disparity vector determiner 14 may determine the prediction mode, and with respect to a particular prediction mode, the disparity vector determiner 14 may not determine whether an area included in a block deviates from the boundary of the depth image of the first layer.

In operation 18, the disparity vector determiner 14 may determine the disparity vector indicating the corresponding block of the first layer with respect to the current block, based on the determined depth value of the area deviating from the boundary.

The disparity vector determiner 14 determines a representative depth value from among all or part depth values of one or more areas in the depth image block, based on the determined depth value of the area deviating from the boundary.

Here, to determine the representative depth value may mean that the disparity vector determiner 14 may select the representative depth value from among the depth values of one or more areas in the depth image block, based on the determined depth value of the area deviating from the boundary, or may calculate a representative depth value by using all or part depth values of one or more areas in the depth image block, based on the determined depth value of the area deviating from the boundary. Also, the disparity vector determiner 14 may determine the disparity vector indicating the corresponding block of the first layer, based on the determined representative depth value. Meanwhile, the disparity vector determiner 14 may select a plurality of split areas in the depth image block, may compare depth values of the plurality of selected areas, and may determine a representative depth value. The disparity vector determiner 14 may compare the depth values of the plurality of areas and may determine a maximum depth value.

The disparity vector determiner 14 may convert the determined maximum depth value and may determine the disparity vector.

The disparity vector determiner 14 may determine a co-located reference block of the first layer depth image which corresponds to the disparity vector, based on a location of the current block of the second layer, and may obtain depth values of a pixel located in a corner of the determined reference block of a first depth image. Then, a maximum value from among the depth values of the corner may be converted as the disparity vector and thus may be determined as the disparity vector of the current block.

In operation 19, the second layer encoder 16 encodes the current block by directly or indirectly using the determined disparity vector. When the current block is encoded by directly or indirectly using the determined disparity vector, the second layer encoder 16 predicts the current block by referring to the corresponding block of the first layer which is indicated by the determined disparity vector. The second layer encoder 16 may encode the current block by using a block predicted with respect to the current block. That is, the second layer encoder 16 generates residue information indicating a difference between a sample value of the block predicted with respect to the current block and a sample value of the current block of an actual image, and encodes the generated residue information.

Also, the second layer encoder 16 may refer to the depth image block of the first layer by using the determined disparity vector as an initial disparity vector, may perform view synthesis prediction by referring to the referred depth image block of the first layer, may perform the view synthesis prediction so as to refer to an image synthesized from the first layer image which corresponds to the current block, and may predict the current block by referring to the synthesized image. The second layer encoder 16 may encode the current block by using the block predicted with respect to the current block. That is, the second layer encoder 16 generates the residue information indicating the difference between the sample value of the block predicted with respect to the current block and the sample value of the current block of the actual image, and encodes the generated residue information.

An example where the disparity vector is indirectly used means a case where a motion parameter corresponding to the disparity vector is used in prediction.

Detailed descriptions with respect to the view synthesis prediction are provided at a later time with reference to FIG. 7B.

The inter-layer video encoding apparatus 10 according to various embodiments may include a central processor (not shown) that generally controls the first layer encoder 12, the disparity vector determiner 14, and the second layer encoder 16. Alternatively, each of the first layer encoder 12, the disparity vector determiner 14, and the second layer encoder 16 may be driven by its own processor (not shown), and the processors may interoperate with each other, so that the inter-layer video encoding apparatus 10 may operate. Alternatively, according to control by an external processor (not shown) of the inter-layer video encoding apparatus 10, the first layer encoder 12, the disparity vector determiner 14, and the second layer encoder 16 may be controlled.

The inter-layer video encoding apparatus 10 may include one or more data storage units (not shown) for storing input and output data of the first layer encoder 12, the disparity vector determiner 14, and the second layer encoder 16. The inter-layer video encoding apparatus 10 may include a memory controller (not shown) that manages an input and output of data of the one or more data storage units.

The inter-layer video encoding apparatus 10 may inter-operate with an internal video encoding processor that is internally embedded or an external video encoding processor so as to output a video encoding result, so that the inter-layer video encoding apparatus 10 may perform a video encoding operation including transformation. The internal video encoding processor of the inter-layer video encoding apparatus 10 may correspond to not only a separate processor but also may correspond to a case in which a central processing unit (CPU) or a graphical operational unit of the inter-layer video encoding apparatus 10 includes a video encoding processing module and thus performs a basic video encoding operation.

Figure 2A:
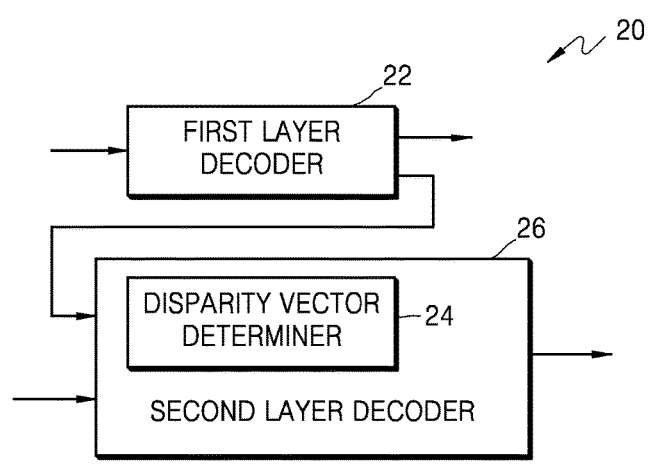
FIG. 2A illustrates a block diagram of an inter-layer video decoding apparatus, according to an embodiment.

FIG. 2A illustrates a block diagram of an inter-layer video decoding apparatus, according to various embodiments.

An inter-layer video decoding apparatus 20 according to various embodiments includes a first layer decoder 22, a disparity vector determiner 24, and a second layer decoder 26. The disparity vector determiner 24 may be included in the second layer decoder 26. The disparity vector determiner 24 according to another embodiment may be formed outside the second layer decoder 26.

The inter-layer video decoding apparatus 20 according to various embodiments may receive bitstreams according to layers, based on a scalable encoding method. The number of layers of the bitstreams that the inter-layer video decoding apparatus 20 receives is not limited. However, for convenience of description, hereinafter, an embodiment where the first layer decoder 22 of the inter-layer video decoding apparatus 20 receives and decodes a first layer stream, and the second layer decoder 26 receives and decodes a second layer stream is described in detail.

For example, the inter-layer video decoding apparatus 20 based on spatial scalability may receive a stream in which image sequences having different resolutions are encoded to different layers. A low resolution image sequence may be reconstructed by decoding a first layer stream, and a high resolution image sequence may be reconstructed by decoding a second layer stream.

As another example, a multiview video may be decoded by using a scalable video coding scheme. When a stereoscopic video stream having a plurality of layers is received, left-view images may be reconstructed by decoding a first layer stream. By further decoding a second layer stream in addition to the first layer stream, right-view images may be reconstructed.

Alternatively, when a multiview video stream having a plurality of layers is received, center-view images may be reconstructed by decoding a first layer stream. By further decoding a second layer stream in addition to the first layer stream, left-view images may be reconstructed. By further decoding a third layer stream in addition to the first layer stream, right-view images may be reconstructed.

As another example, a scalable video coding method based on temporal scalability may be performed. By decoding the first layer stream, images with a base frame rate may be reconstructed. By further decoding the second layer stream in addition to the first layer stream, images with a high speed frame rate may be reconstructed.

In a case where the number of second layers is equal to or greater than 3, first layer images may be reconstructed from the first layer stream, and second layer images may be further reconstructed by further decoding the second layer by referring to the reconstructed first layer images. If a Kth layer stream is further decoded by referring to the reconstructed second layer image, Kth layer images may be further reconstructed.

The inter-layer video decoding apparatus 20 may obtain encoded data of the first layer images and the second layer images from the first layer stream and the second layer stream, and may further obtain a motion vector generated by inter prediction, and prediction information generated by inter-layer prediction.

For example, the inter-layer video decoding apparatus 20 may decode inter-predicted data of each of layers, and may decode data that is inter-layer predicted between a plurality of layers. The reconstruction may be performed by using motion compensation and inter-layer decoding, based on a coding unit or a prediction unit.

Images of each layer stream may be reconstructed by performing motion compensation for a current image by referring to reconstructed images that are predicted via inter prediction with respect to a same layer. The motion compensation means an operation of reconstructing a reconstructed image of the current image by synthesizing a reference image and a residual component of the current image, wherein the reference image is determined by using a motion vector of the current image.

Also, the inter-layer video decoding apparatus 20 may perform the inter-layer decoding by referring to prediction information of the first layer images, so as to decode the second layer image predicted via the inter-layer prediction. The inter-layer decoding means an operation of reconstructing prediction information of the current image by using prediction information of a reference block of another layer so as to determine the prediction information of the current image.

The inter-layer video decoding apparatus 20 according to the embodiment may perform the inter-layer decoding so as to reconstruct third layer images that are predicted by referring to the second layer images. An inter-layer prediction structure will be described in detail with reference to FIG. 3.

However, the second layer decoder 26 according to various embodiments may decode the second layer stream, without referring to the first layer image sequence. Therefore, it should not narrowly interpret that the second layer decoder 26 performs the inter-layer prediction so as to decode a second layer image sequence.

The inter-layer video decoding apparatus 20 decodes each block of each image of a video. The block may be a largest coding unit, a coding unit, a prediction unit, a transformation unit, etc. from among coding units of a tree structure.

The first layer decoder 22 may decode the first layer image by using encoding symbols of a parsed first layer image. If the inter-layer video decoding apparatus 20 receives streams that are encoded based on the coding units of the tree structure, the first layer decoder 22 may perform decoding on each largest coding unit of the first layer stream, based on the coding units of the tree structure.

The first layer decoder 22 may perform entropy decoding on each largest coding unit, and thus may obtain encoding information and the encoded data. The first layer decoder 22 may perform inverse-quantization and inverse-transformation on the encoded data obtained from the stream, and thus may reconstruct a residual component. The first layer decoder 22 according to another embodiment may directly receive a bitstream of quantized transform coefficients. As a result of the inverse-quantization and the inverse-transformation that are performed on the quantized transform coefficients, a residual component of images may be reconstructed.

The first layer decoder 22 may determine a prediction image via motion compensation between same layer images, and may reconstruct the first layer images by combining the prediction image and the residual component.

According to the inter-layer prediction structure, the second layer decoder 26 may generate a second layer prediction image by using samples of the reconstructed first layer image. The second layer decoder 26 may decode the second layer stream, and may obtain a prediction error due to the inter-layer prediction. The second layer decoder 26 may generate the reconstructed second layer image by combining the second layer prediction image with the prediction error.

The second layer decoder 26 may determine the second layer prediction image by using the reconstructed first layer image decoded by the first layer decoder 22. According to the inter-layer prediction structure, the second layer decoder 26 may determine a block of the first layer image that is to be referred to by a block such as a coding unit or a prediction unit of the second layer image. For example, a reconstructed block of the first layer image that is positioned while corresponding to a position of a current block in the second layer image may be determined. The second layer decoder 26 may determine a second layer prediction block by using a reconstructed first layer block corresponding to a second layer block.

The second layer decoder 26 may use the second layer prediction block as a reference image for inter-layer prediction of a second layer original block, wherein the second layer prediction block is determined by using the reconstructed first layer block according to the inter-layer prediction structure. In this case, the second layer decoder 26 may reconstruct the second layer block by synthesizing a sample value of the second layer prediction block and a residual component according to the inter-layer prediction, wherein the second layer prediction block is determined by using the reconstructed first layer image.

Meanwhile, when the inter-layer video decoding apparatus 20 decodes the multiview video, the first layer image that is encoded may be a first view video, and the second layer image may be a second view video.

The inter-layer video decoding apparatus 20 may obtain, via a bitstream, a disparity vector for inter-layer prediction in the multiview video or may predict the disparity vector from a plurality of pieces of other encoding information.

For example, the disparity vector may be predicted from neighboring blocks of a block that is currently reconstructed.

Hereinafter, a method of determining the disparity vector, the method performed by the inter-layer video decoding apparatus 20, according to an embodiment, will be described in detail with reference to FIGS. 4 through 7B.

According to a spatial scalable video coding scheme, when the first layer decoder 22 reconstructs a first layer image having a resolution different from that of the second layer image, the second layer decoder 26 may interpolate the reconstructed first layer image so as to adjust a size of the reconstructed first layer image to a resolution of a second layer original image. The interpolated reconstructed first layer image may be determined as a second layer prediction image for inter-layer prediction.

Therefore, the first layer decoder 22 of the inter-layer video decoding apparatus 20 may decode the first layer stream and thus may reconstruct the first layer image sequence, and the second layer decoder 26 may decode the second layer stream and thus may reconstruct the second layer image sequence.

Hereinafter, an operation of the inter-layer video decoding apparatus 20 that determines a disparity vector for inter-layer prediction is described in detail with reference to FIG. 2B. In descriptions below, a first layer image may mean a reference view image, and a second layer image may mean a current view image to be decoded.

Figure 2B:
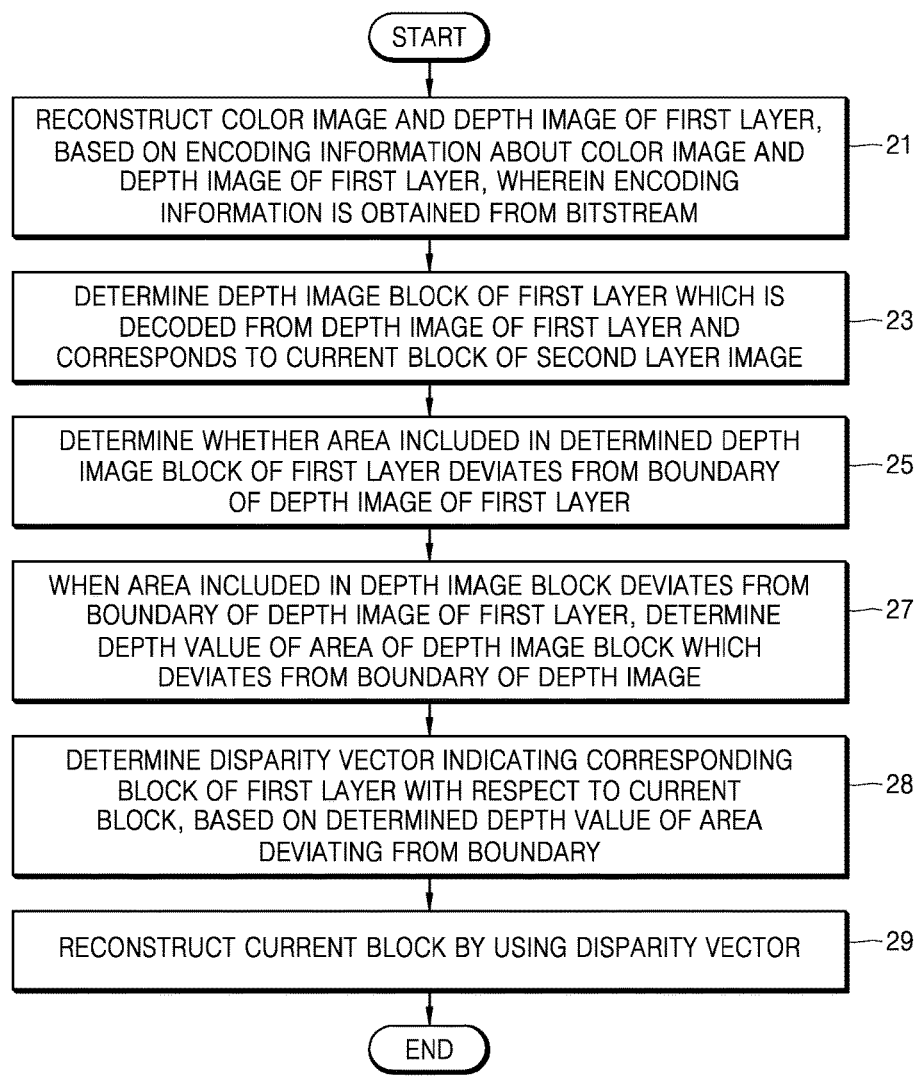
FIG. 2B illustrates a flowchart of an inter-layer video decoding method, according to an embodiment.

FIG. 2B illustrates a flowchart of an inter-layer video decoding method, according to various embodiments.

In operation 21, the first layer decoder 22 may reconstruct a color image and a depth image of a first layer, based on encoding information about the color image and the depth image of the first layer, wherein the encoding information is obtained from a bitstream.

In operation 23, the disparity vector determiner 24 according to the embodiment may determine a depth image block of the first layer which is decoded from the depth image of the first layer and corresponds to a current block of the second layer image. Here, in order to determine the depth image block of the first layer which corresponds to the current block, the disparity vector determiner 24 may determine whether a disparity vector is predictable by using a neighboring block of the current block, and if it is determined to be predictable, the disparity vector determiner 24 may predict (or may derive) the disparity vector by using the neighboring block. The disparity vector may indicate the depth image block of the first layer. Therefore, the disparity vector determiner 24 may determine the depth image block of the first layer by using the disparity vector predicted from the neighboring block. For example, the disparity vector determiner 24 may obtain a disparity vector from a neighboring block of a second layer current block, and when the disparity vector is obtained from the neighboring block, the disparity vector determiner 24 may predict a disparity vector of the current block by using the obtained disparity vector.

A method of obtaining the disparity vector from the neighboring block of the second layer current block is described in detail with reference to FIG. 4. Therefore, when the disparity vector is obtained from the neighboring block, the disparity vector determiner 14 may determine that the disparity vector is predictable.

Meanwhile, the disparity vector determiner 14 may determine the depth image block of the first layer by using a depth-based disparity vector. Here, the depth-based disparity vector means a disparity vector predicted (or derived) based on a depth value. For example, the depth-based disparity vector may be the disparity vector predicted based on a random depth value. In particular, a range of a depth value having a depth of 8-bits corresponds to a depth value of 0 through 255, here, by using 128 that is a middle value of the depth value, the disparity vector indicating a corresponding block of the first layer image which corresponds to the current block may be predicted (or may be derived). Also, for example, the depth-based disparity vector may mean a disparity vector obtained by predicting the disparity vector from the neighboring block, by determining a corresponding block of the depth image of the first layer which corresponds to the current block, and by performing prediction (or derivation) based on a depth value of the determined corresponding block of the depth image.

Also, for example, when the disparity vector determiner 14 performs view synthesis prediction, the disparity vector determiner 14 predicts (or derives) a new disparity vector by using a depth value of the depth image of the first layer, here, in order to use the depth value of the depth image with respect to the first layer, the disparity vector determiner 14 may determine a depth image block with respect to the first layer.

When a second layer depth image corresponding to the current block of the second layer is usable in a decoding terminal, the disparity vector determiner 24 may determine that the disparity vector is predictable. Since a distance of an object and a disparity are in inverse proportion, a disparity vector of each pixel may be predicted by using a depth image corresponding to the current block of the second layer.

However, determining the disparity vector so as to determine the corresponding block of the depth image with respect to the first layer is not limited to the aforementioned descriptions, and the disparity vector determiner 24 may determine a disparity vector that is predicted (or is derived) in various manners, and may determine the depth image block by using the predicted disparity vector. Also, a new disparity vector may be re-predicted (re-derived) by using the determined disparity vector, and the corresponding block of the depth image may be determined by using the new disparity vector. That is, the depth image block of the first layer which corresponds to the current block of the second layer image may be determined by using a disparity vector with various forms. Also, regarding a procedure of determining the disparity vector so as to determine the corresponding block of the depth image with respect to the first layer, when the inter-layer video encoding apparatus 10 determines a disparity vector during an encoding procedure, information about the disparity vector may be generated and a bitstream may include the information about the disparity vector, and the disparity vector determiner 24 may directly obtain the information about the disparity vector from the bitstream, and may determine the disparity vector by using the obtained information about the disparity vector.

As another example, when the second layer depth image corresponding to the current block of the second layer is already reconstructed and thus is usable, the disparity vector determiner 24 may determine that the disparity vector is predictable.

In operation 25, the disparity vector determiner 24 according to the embodiment determines whether an area included in the determined depth image block of the first layer deviates from a boundary of the depth image of the first layer.

In operation 27, when the area included in the depth image block deviates from the boundary of the depth image of the first layer, the disparity vector determiner 24 according to the embodiment determines a depth value of the area of the depth image block which deviates from the boundary of the depth image. The disparity vector determiner 24 may determine the depth value of the area deviating from the boundary of the depth image, as the depth value of the boundary included in the depth image block, by limiting coordinates of the area of the depth image block which deviates from the boundary so as for the coordinates to correspond to coordinates within a boundary of a depth correspondence block. For example, the disparity vector determiner 24 may determine the depth value of the area deviating from the boundary of the depth image, as the depth value at the boundary of the depth image, by limiting coordinates of the area of the depth image block which deviates from the boundary so as for the coordinates to correspond to the coordinates within the boundary of the depth correspondence block. As a result, the disparity vector determiner 14 may determine a disparity vector by using only a depth value of an area within a depth image boundary.

When actually embodied, the area outside the depth image may be padded with a boundary pixel. That is, when actually embodied, a depth value of the area outside the depth image may be a depth value of a boundary pixel. In this case, even if the area deviates from the depth image, the deviating area is changelessly referred to and the depth value of the area outside the depth image may be determined.

Meanwhile, the disparity vector determiner 24 may determine a prediction mode of the current block. For example, an encoding apparatus may include, in a bitstream, information about the prediction mode of the current block, and the disparity vector determiner 24 may determine the prediction mode, based on the information about the prediction mode of the current block which is included in the bitstream. For example, when the disparity vector determiner 24 receives the bitstream indicating that the prediction mode of the current block is a merge mode, the disparity vector determiner 24 may determine that the prediction mode of the current block is the merge mode.

Also, the disparity vector determiner 24 may determine the depth value of the area deviating from the boundary of the depth image, according to the determined prediction mode of the current block. For example, when the prediction mode of the current block is a mode where prediction is performed according to view synthesis prediction, the disparity vector determiner 24 may not determine the depth value of the area deviating from the boundary of the depth image. When the depth value of the area deviating from the boundary of the depth image is not determined, the disparity vector determiner 24 may not be able to use the depth value of the deviating area.

When the prediction mode of the current block is another prediction mode, not the mode where prediction is performed according to view synthesis prediction, the disparity vector determiner 24 may determine the depth value of the area deviating from the boundary of the depth image. However, the disparity vector determiner 24 may determine or may not determine the depth value of the area deviating from the boundary of the depth image, according to various prediction modes, not limited to determining the depth value of the area deviating from the boundary of the depth image according to whether or not the prediction mode is the mode where the prediction is performed according to the view synthesis prediction.

Meanwhile, the disparity vector determiner 24 may determine the prediction mode, and during a particular prediction mode, the disparity vector determiner 24 may not determine whether or not an area included in a block deviates from the boundary of the depth image of the first layer.

In operation 28, the disparity vector determiner 24 may determine the disparity vector indicating the corresponding block of the first layer with respect to the current block, based on the determined depth value of the area deviating from the boundary of the depth image. For example, the disparity vector determiner 24 determines a representative depth value from among all or part depth values of one or more areas in the depth image block, based on the determined depth value of the area deviating from the boundary of the depth image. Here, to determine the representative depth value may mean that the disparity vector determiner 24 may select the representative depth value from among the depth values of one or more areas in the depth image block, based on the determined depth value of the area deviating from the boundary of the depth image. Alternatively, the disparity vector determiner 24 may calculate a representative depth value by using all or part depth values of one or more areas in the depth image block, based on the determined depth value of the area deviating from the boundary of the depth image. The disparity vector determiner 24 may determine the disparity vector indicating the corresponding block of the first layer, based on the determined representative depth value. Meanwhile, the disparity vector determiner 4 may select a plurality of areas of the depth image block, may compare depth values of the plurality of selected areas, and may determine a representative depth value. The disparity vector determiner 24 may compare the depth values of the plurality of areas and may determine a maximum depth value.

The disparity vector determiner 24 may convert the determined maximum depth value and may determine the disparity vector.

The disparity vector determiner 14 may determine a co-located reference block of the first layer depth image which corresponds to the disparity vector, based on a location of the current block of the second layer, and may obtain depth values of a pixel located in a corner of the determined reference block of the first layer depth image. Then, a maximum value from among the depth values of the corner may be converted as the disparity vector and thus may be determined as the disparity vector of the current block of the second layer.

In operation 29, the second layer decoder 26 reconstructs the current block by directly or indirectly using the determined disparity vector.

In an example where the disparity vector is directly used, the second layer decoder 26 predicts the current block by referring to the corresponding block of the first layer which is indicated by the determined disparity vector. The second layer decoder 26 may reconstruct the current block by using a block predicted with respect to the current block. That is, the second layer decoder 26 may obtain, from the bitstream, residue information indicating a difference between a same value of the block predicted with respect to the current block and a sample value of the current block of an actual image, and may reconstruct the current block by synthesizing the obtained residue information and the sample value of the block predicted with respect to the current block.

In more detail, the second layer decoder 26 may refer to the depth image block of the first layer by using the determined disparity vector, may perform view synthesis prediction by referring to the referred depth image block of the first layer, may perform the view synthesis prediction so as to refer to an image synthesized from the first layer image, and may predict the current block by referring to the synthesized image. The second layer decoder 26 may encode the current block by using the block predicted with respect to the current block. That is, the second layer decoder 26 may obtain, from the bitstream, the residue information indicating the difference between the sample value of the block predicted with respect to the current block and the sample value of the current block of the actual image, and may reconstruct the current block by synthesizing the obtained residue information and the sample value of the block predicted with respect to the current block.

An example where the disparity vector is indirectly used means a case where a motion parameter corresponding to the disparity vector is used in prediction.

Detailed descriptions with respect to the view synthesis prediction are provided at a later time with reference to FIG. 7B.

The inter-layer video decoding apparatus 20 according to various embodiments may include a central processor (not shown) that generally controls the first layer decoder 22, the disparity vector determiner 24, and the second layer decoder 26. Alternatively, each of the first layer decoder 22, the disparity vector determiner 24, and the second layer decoder 26 may be driven by its own processor (not shown), and the processors may interoperate with each other, so that the inter-layer video decoding apparatus 20 may operate. Alternatively, according to control by an external processor (not shown) of the inter-layer video decoding apparatus 20 according to various embodiments, the first layer decoder 22, the disparity vector determiner 24, and the second layer decoder 26 may be controlled.

The inter-layer video decoding apparatus 20 according to various embodiments may include one or more data storage units (not shown) for storing input and output data of the first layer decoder 22, the disparity vector determiner 24, and the second layer decoder 26. The inter-layer video decoding apparatus 20 may include a memory controller (not shown) that manages an input and output of data of the one or more data storage units.

The inter-layer video decoding apparatus 20 according to various embodiments may interoperate with an internal video decoding processor that is internally embedded or an external video decoding processor so as to reconstruct a video via video decoding, so that the inter-layer video decoding apparatus 20 may perform a video decoding operation including inverse-transformation. The internal video decoding processor of the inter-layer video decoding apparatus 20 according to various embodiments may correspond to not only a separate processor but also may correspond to a case in which a CPU or a graphical operational unit of the inter-layer video decoding apparatus 20 includes a video decoding processing module and thus performs a basic video decoding operation.

Referring to FIGS. 1A through 2B, when an area included in the depth image block of the first layer, which corresponds to the current block, deviates from a boundary of the depth image of the first layer, the inter-layer video encoding apparatus 10 and the inter-layer video decoding apparatus 20 may determine the depth value of the depth image block deviating from the boundary, in more detail, the inter-layer video decoding apparatus 20 provides methods of encoding and decoding an inter-layer video by determining the depth value of the depth image block deviating from the boundary as a depth value of the boundary of the depth image of the first layer, and by determining the disparity vector by using the depth value of the depth image block, based on the determined depth value of the area deviating from the boundary, thereby improving coding performance and accuracy.

Hereinafter, an inter layer prediction structure that may be performed in the inter-layer video encoding apparatus 10 according to various embodiments will be described in detail with reference to FIG. 3.

Figure 3:
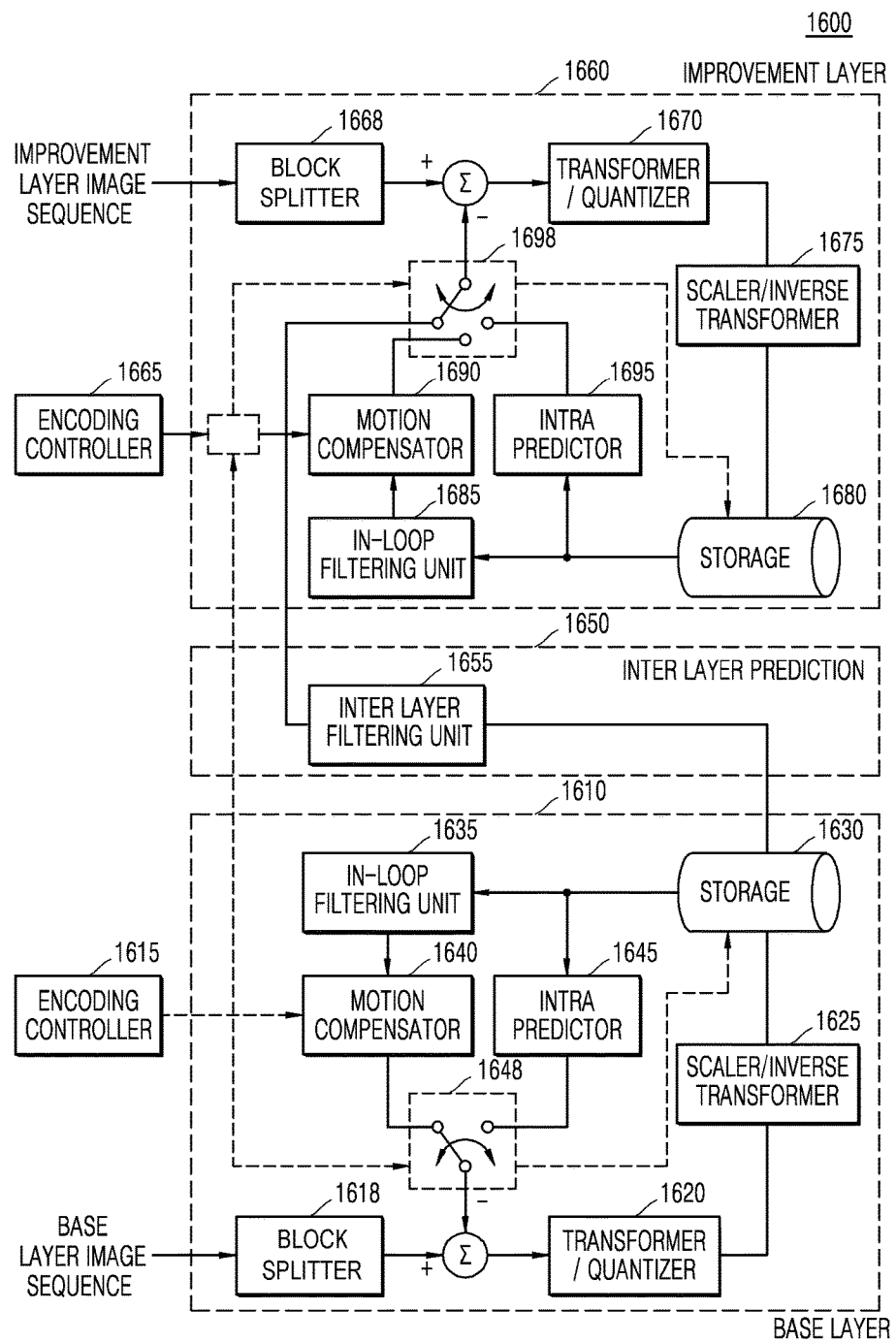
FIG. 3 illustrates an inter-layer prediction structure, according to an embodiment.

FIG. 3 illustrates an inter-layer prediction structure, according to an embodiment.

An inter-layer encoding system 1600 includes a base layer encoding end 1610, an improvement layer encoding end 1660, and an inter-layer prediction end 1650 between the base layer encoding end 1610 and the improvement layer encoding end 1660. The base layer encoding end 1610 and the improvement layer encoding end 1660 may be included in the inter-layer encoder 12.

The base layer encoding end 1610 receives and encodes a base layer image sequence for each image. The improvement layer encoding end 1660 receives and encodes an improvement layer image sequence for each image. Redundant descriptions of similar operations between the base layer encoding end 1610 and the improvement layer encoding end 1660 will be simultaneously given.

Block splitters 1618 and 1668 split input images (a low resolution image and a high resolution image) into a largest coding unit, a coding unit, a prediction unit, a transformation unit, etc. To encode the coding unit output by the block splitters 1618 and 1668, intra prediction or inter prediction may be performed for each prediction unit of the coding unit. Prediction switches 1648 and 1698 may perform inter prediction with reference to a previous reconstructed image output by motion compensators 1640 and 1690 or may perform intra prediction by using a neighboring prediction unit of a current prediction unit within the current input image output by intra prediction units 1645 and 1695 according to whether a prediction mode of the prediction unit is an intra prediction mode or an inter prediction mode. Residual information may be generated for each prediction unit through inter prediction.

Residual information between the prediction unit and an adjacent image is input into transformer/quantizers 1620 and 1670 for each prediction unit of the coding unit. The transformer/quantizers 1620 and 1670 may perform transformation and quantization for each transformation unit based on the transformation unit of the coding unit and may output a quantized transformation coefficient.

Scaler/inverse transformer 1625 and 1675 may perform scaling and inverse transformation on the quantized transformation coefficient for each transformation unit of the coding unit again to generate residual information of a spatial area. When an inter mode is configured by the prediction switches 1648 and 1698, the residual information is combined with the previous reconstruction image or the neighboring prediction unit, thereby generating a reconstruction image including a current prediction unit, and storing a current reconstruction image in storages 1630 and 1680. The current reconstruction image may be transferred to intra prediction units 1645 and 1695/motion compensation units 1640 and 1690 according to a prediction mode of a prediction unit encoded later.

In particular, in the inter mode, in-loop filtering units 1635 and 1685 may perform at least one selected from deblocking filtering and sample adaptive offset (SAO) filtering for each coding unit on the reconstruction image stored in the storages 1630 and 1680. At least one filtering of deblocking filtering and sample adaptive offset (SAO) filtering may be performed on at least one of the coding unit, the prediction unit included in the coding unit, and the transformation unit.

Deblocking filtering is filtering for relaxing a blocking phenomenon of the data unit. SAO filtering is filtering for compensating for a pixel value modified by data encoding and decoding. Data filtered by the in-loop filtering units 1635 and 1685 may be transferred to the motion compensation units 1640 and 1690 for each prediction unit. Residual information between the current reconstruction image output by the motion compensation units 1640 and 1690 and the block splitters 1618 and 1668 and a next coding unit may be generated, to encode a coding unit of a next order output by the block splitters 1618 and 1668 again.

In this manner, the above-described encoding method may be repeated for each coding unit of the input image.

The improvement layer encoding end 1660 for inter layer prediction may refer to the reconstruction image stored in the storage 1630 of the base layer encoding end 1610. An encoding controller 1615 of the base layer encoding end 1610 may control the storage 1630 of the base layer encoding end 1610 and may transfer the reconstruction image of the base layer encoding end 1610 to the improvement layer decoding end 1660. The inter layer prediction end 1650 may perform deblocking filtering or SAO filtering on the base layer reconstruction image output by the storage 1630 of the base layer encoding end 1610. When a resolution differs between images of the base layer and that of the improvement layer, the inter layer prediction end 1650 may upsample the reconstruction image of the base layer and may transfer the reconstruction image to the improvement layer encoding end 1660. When inter layer prediction is performed according to control of the switch 1698 of the improvement layer encoding end 1660, inter layer prediction may be performed on the improvement layer image with reference to the base layer reconstruction image transferred through the inter layer prediction end 1650.

For encoding of an image, various encoding modes for the coding unit, the prediction unit, and the transformation unit may be set. For example, a depth or a split flag, etc. may be set as an encoding mode with respect to the coding unit. A prediction mode, a partition type, intra direction information, reference list information, etc. may be set as an encoding mode with respect to the prediction unit. A transformation depth or the split flag, etc. may be set as an encoding mode with respect to the transformation unit.

The base layer encoding end 1610 may determine an encoding depth having a highest encoding efficiency, a prediction mode, a partition type, an intra direction/reference list, a transformation depth, etc. according to a result of performing encoding by applying various depths for the coding unit, various prediction modes with respect to the prediction unit, various partition types, various intra directions, various reference lists, and various transformation depths for the transformation unit, respectively. However, the present invention is not limited to the encoding modes determined by the base layer encoding end 1610.

The encoding controller 1615 of the base layer encoding end 1610 may control various encoding modes to be appropriately applied to operations of the elements. The encoding controller 1615 may control the improvement layer encoding end 1660 to determine the encoding mode or the residual information by referring to an encoding result of the base layer encoding end 1610, for inter layer encoding of the improvement layer encoding end 1660.

For example, the improvement encoding end 1660 may determine an encoding mode for the improvement layer image by using the encoding mode of the base layer encoding end 1610 as an encoding mode of the improvement layer image or by referring to the encoding mode of the base layer encoding end 1610. The encoding controller 1615 of the base layer encoding end 1610 may control a control signal of the encoding controller 1655 of the improvement layer encoding end 1660 so that the improvement layer encoding end 1660 may use a current encoding mode from the encoding mode of the base layer encoding end 1610, to determine the current encoding mode.

Similarly to the inter layer encoding system 1600 according to the inter layer prediction method of FIG. 3, an inter layer decoding system according to the inter layer prediction method may be implemented. That is, the inter layer decoding system of a multi-layer video may receive a base layer bitstream and an improvement layer bitstream. A base layer decoding end of the inter layer decoding system may decode the base layer bitstream to reconstruct base layer images. An improvement layer decoding end of the inter layer decoding system of the multi-layer video may use a base layer reconstruction image and parsed encoding information to decode the improvement layer bitstream and reconstruct improvement layer images.

If the inter-layer video encoding apparatus 10 according to various exemplary embodiments performs inter layer prediction, the inter-layer video decoding apparatus 20 may reconstruct multi-layer images according to the above-described inter layer decoding system.

Hereinafter, with reference to FIGS. 4A through 7B, exemplary embodiments in which the inter-layer video encoding apparatus 10 and the inter-layer video decoding apparatus 20 apply an inter layer prediction structure regarding a multi-view video will now be described in detail. An individual view video is applied to one layer in an inter-view prediction structure of the multi-view video, and thus the inter-view prediction structure may be interpreted as the inter layer prediction structure.

Hereinafter, with reference to FIGS. 4A through 7B, an inter-layer video encoding technique and an inter-layer video decoding technique for determining a disparity vector by using a reference layer depth image, according to various embodiments, are provided.

Figure 4A:
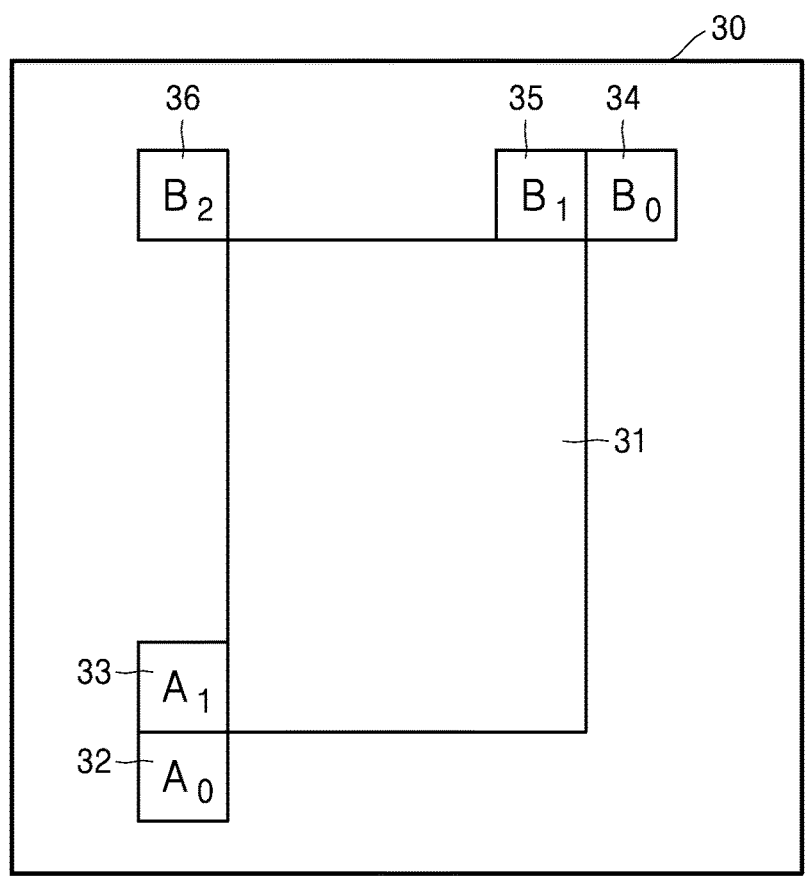
FIG. 4 illustrates an example of predicting a disparity vector by using a neighboring block, according to an embodiment.

FIG. 4A illustrates a spatial prediction candidate used in an inter prediction mode, according to an embodiment.

Referring to FIG. 4A, candidate blocks to which the inter-layer decoding apparatus 20 are to refer in order to determine prediction information of a current block 31 of a current picture 30 may be prediction units spatially adjacent to the current block 31. For example, the candidate blocks may include a neighboring block A0 32 located in the left bottom outside of a left bottom sample of the current block 31, a neighboring block A1 33 located in the left outside of the left bottom sample of the current block 31, a neighboring block B0 34 located in the right top outside of a right top sample of the current block 31, a neighboring block B1 35 located in the top outside of the right top sample of the current block 31, and a neighboring block B2 36 located in the left top outside of a left top sample of the current block 31. To determine blocks that may be the candidate blocks, neighboring blocks 32, 33, 34, 35, and 36 of predetermined locations may be explored in order of the neighboring blocks A1 33, B1 35, B0 34, A0 32, and B2 36.

For example, four of the neighboring blocks A1 33, B1 35, B0 34, A0 32, and B2 36 may be selected as spatial candidate blocks. That is, motion information of the four spatial candidate blocks may be included in a candidate list for inter prediction.

The inter-layer decoding apparatus 20 may include blocks having motion information among the neighboring blocks A1 33, B1 35, B0 34, A0 32, and B2 36, i.e. inter predicted blocks, in prediction candidates for inter prediction and exclude blocks having no motion information from the prediction candidates. The inter-layer decoding apparatus 20 may exclude blocks having redundant motion information from the prediction candidates for inter prediction.

Locations and number of neighboring blocks that may be included in the spatial prediction candidates may not be limited thereto but may be changed. Meanwhile, blocks used to determine the spatial prediction candidates may be coding units or prediction units.

Figure 4B:
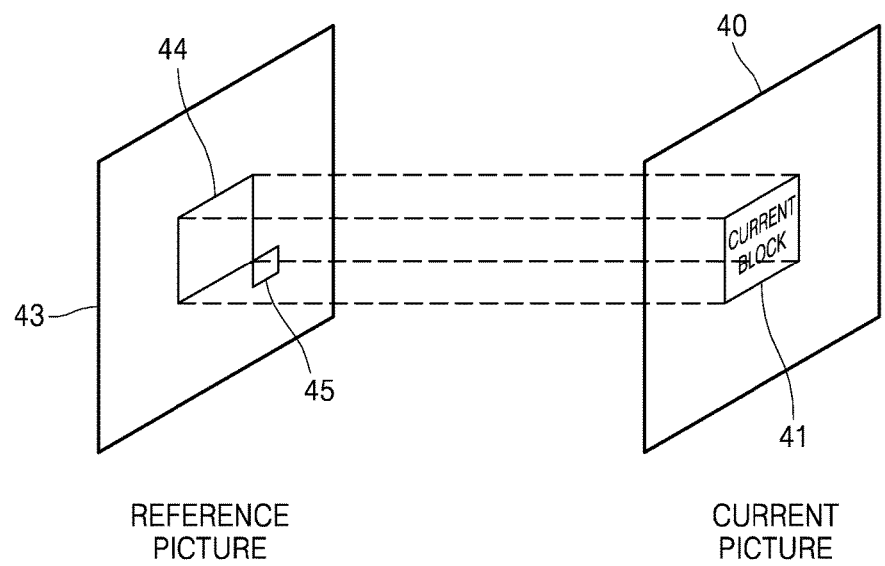

FIG. 4B illustrates a temporal prediction candidate used in an inter prediction mode, according to an embodiment.

Referring to FIG. 4B, the inter-layer video decoding apparatus 20 may include a co-located block 44 co-located with a current block 41, and at least one of blocks in the periphery of the co-located block 44 which are included in a reference picture 43 as temporal prediction candidates, for inter prediction of the current block 41 included in a current picture 40. For example, a right bottom block 45 of the co-located block 44 may be included in the temporal prediction candidates. Meanwhile, blocks used to determine the temporal prediction candidates may be coding units or prediction units.

Hereinafter, with reference to FIGS. 5 through 7, and a pseudo code of Table 1, a method and apparatus are described, in which the inter-layer video decoding apparatus 20 according to an embodiment determines whether or not a depth image block corresponding to a current block deviates from a depth image of a first layer, changes a depth value of an area of the depth image block which deviates from the depth image, and determines a disparity vector through the changed depth value.

FIG. 5 illustrates a flowchart of determining a depth-based disparity vector, according to an embodiment.

In operation 51, the inter-layer video decoding apparatus 20 according to the embodiment determines a depth image block of a first layer which corresponds to a current block of a second layer image.

Here, the inter-layer video decoding apparatus 20 may obtain, from a bitstream, information about a disparity vector indicating the depth image block of the first layer which corresponds to the current block, and may obtain the disparity vector by using the obtained information about the disparity vector. Alternatively, the inter-layer video decoding apparatus 20 may obtain the disparity vector from a neighboring block. Alternatively, the inter-layer video decoding apparatus 20 may obtain a depth-based disparity vector.

The inter-layer video decoding apparatus 20 may determine the depth image block of the first layer which corresponds to the current block, by using the obtained disparity vector.

In operation 52, the inter-layer video decoding apparatus 20 may determine whether or not an area included in the depth image block of the first layer deviates from a boundary of a depth image of the first layer.

In operation 53, if the area included in the depth image block of the first layer does not deviate from the boundary, in operation 54, the inter-layer video decoding apparatus 20 may determine a disparity vector indicating a corresponding block of the first layer image with respect to the current block, based on a depth value of a current depth image block.

In operation 53, if the area included in the depth image block of the first layer deviates from the boundary, in operation 55, the inter-layer video decoding apparatus 20 may determine a depth value of an area of the depth image block which deviates from the boundary of the depth image. In particular, the inter-layer video decoding apparatus 20 may not change a depth value of an area of the depth image block which does not deviate from the boundary of the depth image, and may determine only the depth value of the area of the depth image block which deviates from the boundary of the depth image.

In operation 56, the inter-layer video decoding apparatus 20 may determine the disparity vector indicating the corresponding block of the first layer image with respect to the current block, based on the determined depth value of the area deviating from the boundary. The determined disparity vector is a depth-based disparity vector that is a disparity vector determined based on the depth value. The obtained disparity vector may be used in performing various inter-layer predictions. For example, when the inter-layer video decoding apparatus 20 performs view synthesis prediction, the inter-layer video decoding apparatus 20 has to determine a disparity vector corresponding to a current block so as to perform the view synthesis prediction, and here, the determined disparity vector may be determined as a disparity vector that corresponds to the current block.

Figure 6A:
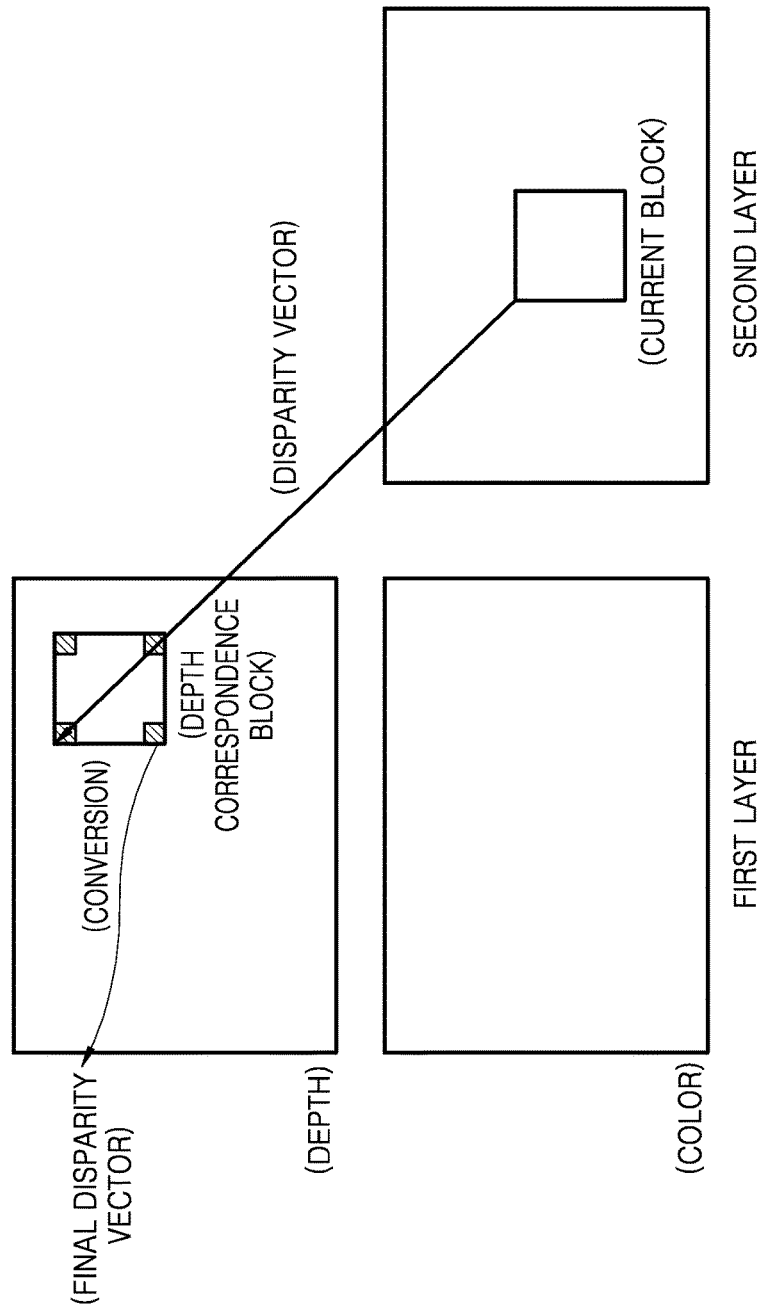
FIGS. 6A through 6C illustrate a process of determining a depth-based disparity vector, the process being performed by the inter-layer video decoding apparatus.
Figure 6B:
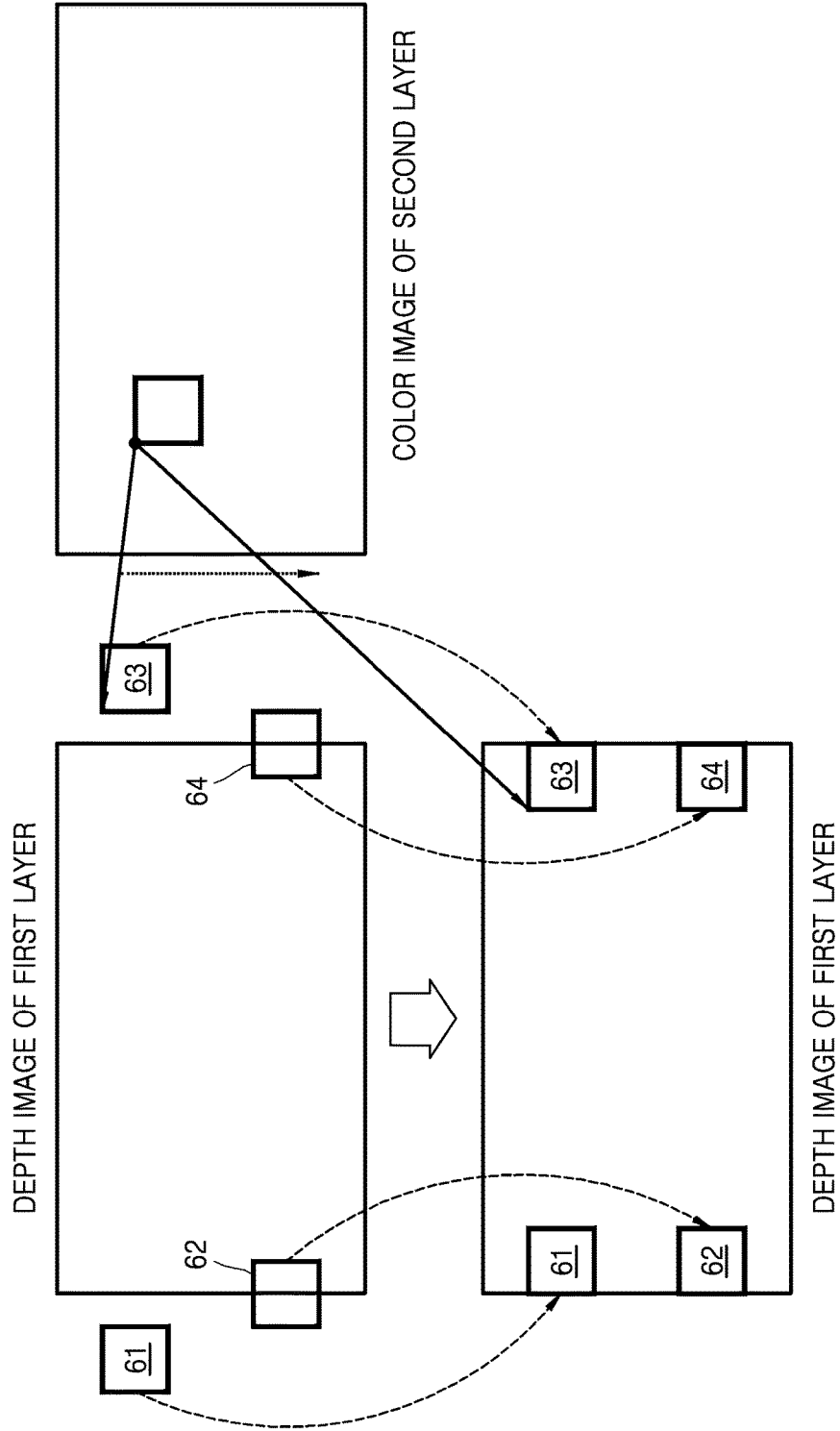
Figure 6C:
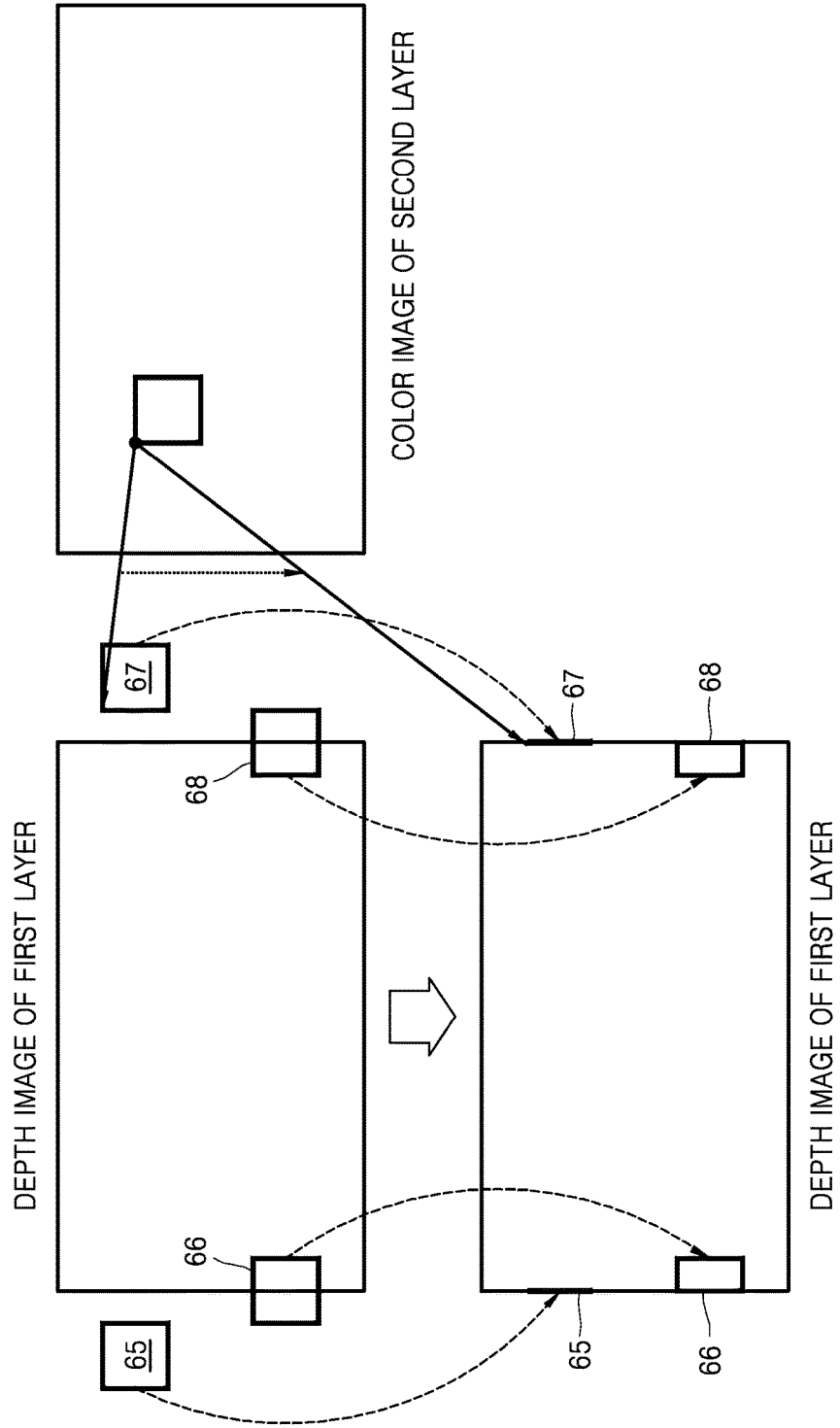

FIGS. 6A through 6C illustrate diagrams for describing a process of determining a depth-based disparity vector.

FIG. 6A illustrates diagrams for describing a process of determining a depth-based disparity vector.

Referring to FIG. 6A, the inter-layer video decoding apparatus 20 may determine the depth-based disparity vector as below. Here, it is assumed that a color image and a depth image of a first layer are encoded and then are reconstructed, and the inter-layer video decoding apparatus 20 decodes a current block included in a second layer, by referring to the reconstructed first layer images.

The inter-layer video decoding apparatus 20 determines a depth image block of the first layer which corresponds to the current block. Here, the inter-layer video decoding apparatus 20 may determine a depth image block 60 of the first layer which corresponds to the current block, by using a disparity vector indicating the first layer image.

When the inter-layer video decoding apparatus 20 determines the depth image block 60 of the first layer, the inter-layer video decoding apparatus 20 may determine a representative depth value in the depth image block 60. In more detail, the inter-layer video decoding apparatus 20 may obtain four depth values located at corners of the depth image block 60, and may determine a depth value representing a maximum value by comparing the obtained depth values.

The inter-layer video decoding apparatus 20 may convert the representative depth value to a disparity vector (a final disparity vector).

The converted disparity vector is a vector determined based on the depth value, and thus may be referred to as the depth-based disparity vector. The depth-based disparity vector may have improved accuracy, compared to a general disparity vector, and a reference layer corresponding block that is further close to the current block may be determined by using the depth-based disparity vector, so that, when prediction is performed by using the depth-based disparity vector, coding efficiency may be further improved.

Meanwhile, the inter-layer video decoding apparatus 20 is not limited thereto, and may re-determine a disparity vector by repeating the aforementioned process by using the determined disparity vector.

In addition, while the inter-layer video decoding apparatus 20 performs view synthesis prediction, the inter-layer video decoding apparatus 20 determines a disparity vector of a sub-block by using an initial disparity vector, and performs prediction-coding on the current block by using that, and this procedure will be described in detail with reference to FIG. 7B.

FIG. 6B illustrates diagrams for describing a process of determining a depth image block used in determining a depth-based disparity vector.

As described above with reference to FIG. 6A, the depth image block corresponding to a current block of a second layer is determined, and a disparity vector corresponding to the current block is determined by using a depth value of the determined depth image block.

Referring to FIG. 6B, an area included in the depth image block may deviate from a current depth image. Portions of blocks 62 and 64 deviate from a depth image of a first layer, and blocks 61 and 63 deviate from the depth image of the first layer. In this case, when an area of the depth image block deviates from a boundary of the depth image of the first layer, the inter-layer video decoding apparatus 20 may not use a depth value of the area deviating from the boundary, or since the area has an undesired depth value, even if the inter-layer video decoding apparatus 20 uses the depth value, the inter-layer video decoding apparatus 20 may not determine (or may not derive) an accurate disparity vector.

Therefore, the inter-layer video decoding apparatus 20 may adjust a location of the depth image block so as for the depth image block to be located within the depth image of the first layer. For example, the inter-layer video decoding apparatus 20 may horizontally adjust locations of areas included in the depth image blocks, wherein the areas leftwardly and rightwardly deviate from the boundary, and thus may allow the areas to be located within the boundary of the depth image of the first layer.

In this case, since the inter-layer video decoding apparatus 20 uses a depth value of a different location that does not correspond to an actual disparity, if a disparity vector is determined by using a depth value of the depth image block at the changed location, accuracy may deteriorate.

FIG. 6C illustrates diagrams for describing a process of determining a depth image block used in determining a depth-based disparity vector, according to an embodiment of the present invention.

Referring to FIG. 6C, an area included in the depth image block may deviate from a current depth image. Portions of blocks 66 and 68 deviate from a depth image of a first layer, and blocks 65 and 67 deviate from the depth image of the first layer. In this case, when an area of the depth image block deviates from a boundary of the depth image of the first layer, the inter-layer video decoding apparatus 20 may not use a depth value of the area deviating from the boundary, or since the area has an undesired depth value, even if the inter-layer video decoding apparatus 20 uses the depth value, the inter-layer video decoding apparatus 20 may not determine (or may not derive) an accurate disparity vector.

In this case, since the inter-layer video decoding apparatus 20 uses a depth value of a different location that does not correspond to an actual disparity, if a disparity vector is determined by using a depth value of the depth image block at the changed location, accuracy may deteriorate.

Therefore, the inter-layer video decoding apparatus 20 according to the embodiment of the present invention may limit coordinates of an area of a depth correspondence block which deviates from a boundary so as for the coordinates to correspond to coordinates within the boundary of the depth correspondence block, and thus may refer to only a depth value within the depth image of the first layer. For example, the inter-layer video decoding apparatus 20 may limit the coordinates of the area of the depth correspondence block which deviates from the boundary so as for the coordinates to correspond to the coordinates within the boundary of the depth correspondence block, and thus may clip areas of the depth correspondence block, wherein the areas leftwardly and rightwardly deviate from the boundary or are outside the boundary, and by doing so, the inter-layer video decoding apparatus 20 may refer to only the depth value within the depth image of the first layer.

When actually embodied, the area outside the depth image may be padded with a boundary pixel. That is, when actually embodied, a depth value of the area outside the depth image may be a depth value of a boundary pixel. In this case, even if the area deviates from the depth image, the deviating area is changelessly referred to and the depth value of the area outside the depth image may be determined.

The coordinates of the areas deviating from the boundary may be determined as coordinates of the boundary which are met when the coordinates of the areas are horizontally and vertically moved, respectively. Coordinates of the area that is outside the boundary when the area deviating from the boundary is horizontally and vertically moved may be determined to correspond to coordinates of the boundary which are met the coordinates of the area when the area deviating from the boundary is horizontally and vertically moved. Alternatively, coordinates of the area that is outside the boundary when the area deviating from the boundary is horizontally or vertically moved may be determined to correspond to coordinates of the boundary which are the most adjacent to the area. However, the inter-layer video decoding apparatus 20 may not be limited to a case where the area deviating from the boundary is horizontally or vertically moved, and may determine coordinates of the area deviating from the boundary so as for the coordinates to correspond to coordinates of the boundary which are met when the area is moved in various directions.

In addition, the inter-layer video decoding apparatus 20 may not be limited to the aforementioned descriptions, and may determine, as a depth value of a random depth image, the depth value of the area of the depth image block which deviates from the boundary of the depth image of the first layer. For example, when a depth value is expressed as 8 bits, the inter-layer video decoding apparatus 20 may determine a depth value of a portion of the depth image block which deviates from a boundary of the first layer, as 128 that is a middle value.

Referring to FIG. 6C, the inter-layer video decoding apparatus 20 may determine coordinates of areas included in the blocks 65 and 67 and outside the boundary, so that the coordinates of the blocks 65 and 67 outside the boundary may correspond to coordinates of the boundary which are met when the area deviating from the boundary is horizontally moved. As a result, the inter-layer video decoding apparatus 20 may refer to depth values of the blocks 65 and 67 within the boundary.

A method of determining the disparity vector according to the embodiment of the present invention may be executed in the inter-layer video decoding apparatus 20 according to the pseudo code of Table 1 below.

TABLE 1

Derivation process for a disparity sample array
Inputs to this process are:
    a luma location ( xP, yP ) of the lop-left luma sample of the current prediction unit relative to
    the top-left luma sample of the current picture,
    a disparity vector mvDisp,
    a view order index refViewIdx specifying a reference view,
    a view order index depthViewIdx specifying the view the depth should be derived from
    variables nPSW and nPSH specifying the width and the height, respectively, of the current
    prediction unit.
    variable nSubBlkW and nSubBlkW specifying the conversion precision of the corresponding
    depth samples,
        Outputs of this process are:
    a (nPSW)x(nPSH) array disparitySamples of disparities values.
        Let refDepPels be an array of reconstructed depth samples of the depth view
component with ViewIdx equal to depthViewIdx. The luma location ($x_{TL}$, $y_{TL}$) of top-left luma
sample of a block in refDepPels is derived by
$x_{TL}$ = xP + ( ( mvDisp[ 0 ] + 2 ) >> 2 )  (H-253)
$y_{TL}$ = yP + ( ( mvDisp[ 1 ] + 2 ) >> 2 )  (H-254)
    The array disparitySamples of size (nPSW)x(nPSH) is derived as specified in the
following:
        For sBy in the range of 0 to ( ( nPSH / nSubBlkH) −1 ), inclusive, the following applies:
            For sBx in the range of 0 to ( ( nPSW / nSubBlkW) −1 ), inclusive, the following applies:
                The variable maxDep is set equal to 1 and modified as specified in the following.
                      xP0 = Clip3(0, pic_width_in_luma_samples − 1, $x_{TL}$ + sBx * nSubBlkW)
                      yP0 = Clip3(0, pic_height_in_luma_samples − 1, $y_{TL}$ + sBy * nSubBlkH)
                      xP1 = Clip3(0, pic_width_in_luma_samples − 1, $x_{TL}$ + sBx * nSubBlkW + nSubBlkW
1)
                      yP1 = Clip3(0, pic_height_in_luma_samples − 1, $y_{TL}$ + sBy * nSubBlkH + nSubBlkH
1)
                maxDep − Max( maxDep, refDepPels[ xP0 ][ yP0 ] )
                maxDep = Max( maxDep, refDepPels[ xP0 ][ yP1 ] )
                maxDep = Max( maxDep, refDepPels[ xP1 ][ yP0 ] )
                maxDep = Max( maxDep, refDepPels[ xP1 ][ yP1 ] )
                The values of the array depthSamples are derived as specified in the following:
                    for ( yOff = 0; yOff < nSubBlkH; yOff++ )
                    for( xOff = 0; xOff < nSubBlkW; xOff++ ) {
                      x = sBx * nSubBlkW + xOff
                      y = sBy * nSubBlkH + yOff
                      disparitySamples[ x ][ y ] = DepthToDisparityB[ refViewIdx ][ maxDep ]
        }

A disparity vector value 'disparitySamples[ ][ ]' converted to a (nCbW)x(nCbH) size may be determined by using a location (xP,yP) of a current block 61, a disparity vector (mvDisp), and a reference view index (refViewiewIdx). Here, nCbW and nCbH may mean a size in a coding unit of the current block ( ). A size of a sub-block may be equal to or less than the size of the current block.

First, referring to Table 1, a location (xTL, yTL) of a block of a depth image (or a luma image of a same location) may be determined by using a disparity vector indicating a luma block of a first layer or a depth image block of a same location. xTL may be calculated by using a x-coordinate location (xP) of the current block and an x-component mvDisp[0] of the disparity vector. yTL may be calculated by using a y-coordinate location (yP) of the current block and an y-component mvDisp[1] of the disparity vector.

Referring to Table 1, the inter-layer video decoding apparatus 20 may perform a process below so as to determine a maximum depth value (maxDep). The location of the sub-block included in the current block may be calculated by using a height or a width (nSubBlkH, nSubBlkW) of the sub-block and an index (sBx, sBy) of the sub-block with respect to a top-left side of the current block.

Here, two x-coordinates (xp0, xp1) and two y-coordinates (yp0, yp1) for using a depth value may be calculated.

First, a left x-coordinate (xp0) to use a depth value in the sub-block may be calculated through the Clip3( ) function. The Clip3($x,y,z$) function is a function where if a value in a range of x and y is input, the value is changelessly output, and if a value exceeds the range of x and y, the value less than x is output as x, and the value greater than y is output as y. First, if a value within a range of 0 and a width of a luma (or a corresponding depth) image (pic_width_in_luma_samples)−1 is input as an x-coordinate (xTL+sBx*nSubBlkW) of a pixel located at a leftmost side of the sub-block, the left x-coordinate (xp0) to use the depth value in a block is its value, if the value within the range of 0 and the width of the luma image is not input but a value less than 0 is input, the left x-coordinate (xp0) is 0, and if the value is greater than (pic_width_in_luma_samples)−1, the left x-coordinate (xp0) is a value of (pic_width_in_luma_samples)−1.

A top y-coordinate (yP1) to use a depth value in the sub-block may be calculated through the Clip3( ) function. If a value within a range of 0 and a height of a luma (or a corresponding depth) image (pic_height_in_luma_samples)−1 is input as a y-coordinate (yTL+sBy*nSubBlkH) of pixels located at a top side of the sub-block, the top y-coordinate (yP1) is its value, if the value within the range of 0 and the height of the luma image is not input but a value less than 0 is input, the top y-coordinate (yP1) is 0, and if the value is greater than (pic_height_in_luma_samples)−1, the top y-coordinate (yP1) is a value of (pic_height_in_luma_samples)−1.

A right x-coordinate (xp1) to use a depth value in the sub-block may be calculated through the Clip3( ) function. If a value within a range of 0 and a width of a luma (or a corresponding depth) image (pic_width_in_luma_samples)−1 is input as a x-coordinate (xTL+sBx*nSubBlkW+nSubBlkW?1) of pixels located at a rightmost side of the sub-block, the right x-coordinate (xp1) is its value, if the value within the range of 0 and the width of the luma image is not input but a value less than 0 is input, the right x-coordinate (xp1) is 0, and if the value is greater than (pic_width_in_luma_samples)−1, the right x-coordinate (xp1) is a value of (pic_width_in_luma_samples)−1.

A bottom y-coordinate (yP2) to use a depth value in the sub-block may be calculated through the Clip3( ) function. If a value within a range of 0 and a height of a luma (or a corresponding depth) image (pic_height_in_luma_samples)−1 is input as a y-coordinate (yTL+sBy*nSubBlkH+nSubBlikH−1) of pixels located at a bottom side of the sub-block, the bottom y-coordinate (yP2) is its value, if the value within the range of 0 and the height of the luma image is not input but a value less than 0 is input, the bottom y-coordinate (yP2) is 0, and if the value is greater than (pic_height_in_luma_samples)−1, the bottom y-coordinate (yP2) is a value of (pic_height_in_luma_samples)−1.

A maximum depth value (maxDep) may be determined in a manner below. In order to obtain the maximum depth value (maxDep), the Max( ) function may be used. Max(x,y) is a function from which a greater value of x and y values is output.

The inter-layer video decoding apparatus 20 may compare a current maximum depth value (maxDep) with depth values (ref DepPels[xp0][yp0]) of the pixels (xp0, yp0) located at the top-left side of the current sub-block, and may determine the maximum depth value (maxDep). In an equal manner, with respect to pixels (xp0, yp1) located at a bottom-left side of a clipped current sub-block, pixels (xp1,yp0) located at a top-right side of the clipped current sub-block, and pixels (xp1, yp1) located at a bottom-right side of the clipped current sub-block, a process of comparing the current maximum depth value (maxDep) is performed, so that the maximum depth value (maxDep) may be calculated.

Afterward, a disparity sample 'disparitySamples[ ][ ]' converted to a sub-block size ((nSubBlkW)×(nSubBlkH)) may be determined. That is, the inter-layer video decoding apparatus 20 may calculate a disparity vector with respect to each pixel included in the current block. A disparity vector value (DepthToDisparityB[refViewIdx][maxDep]) corresponding to a reference view index (refViewIdx) and the maximum depth value (maxDep) may be calculated as a disparity sample value (disparitySample[x][y]) of a pixel located at (x,y) within the sub-block.

In an equal manner described above, a disparity sample may be calculated with respect to other sub-blocks included in the current block. Therefore, a disparity vector value 'disparitySamples[ ][ ]' converted to a size ((nCbW)×(nCbH)) of the current block may be determined.

The inter-layer video decoding apparatus 20 may determine a disparity vector (mvRefinedDisp) of the current block 61 by using a converted horizontal component value of the disparity vector and a vertical component value (mvDisp) of the disparity vector. For example, the determined disparity vector (mvRefinedDisp) may be expressed as (disparitySamples[0][0], mvDisp[1]). Here, 'mvDisp[1]' that is the vertical component value of the disparity vector may be 0.

Figure 7A:
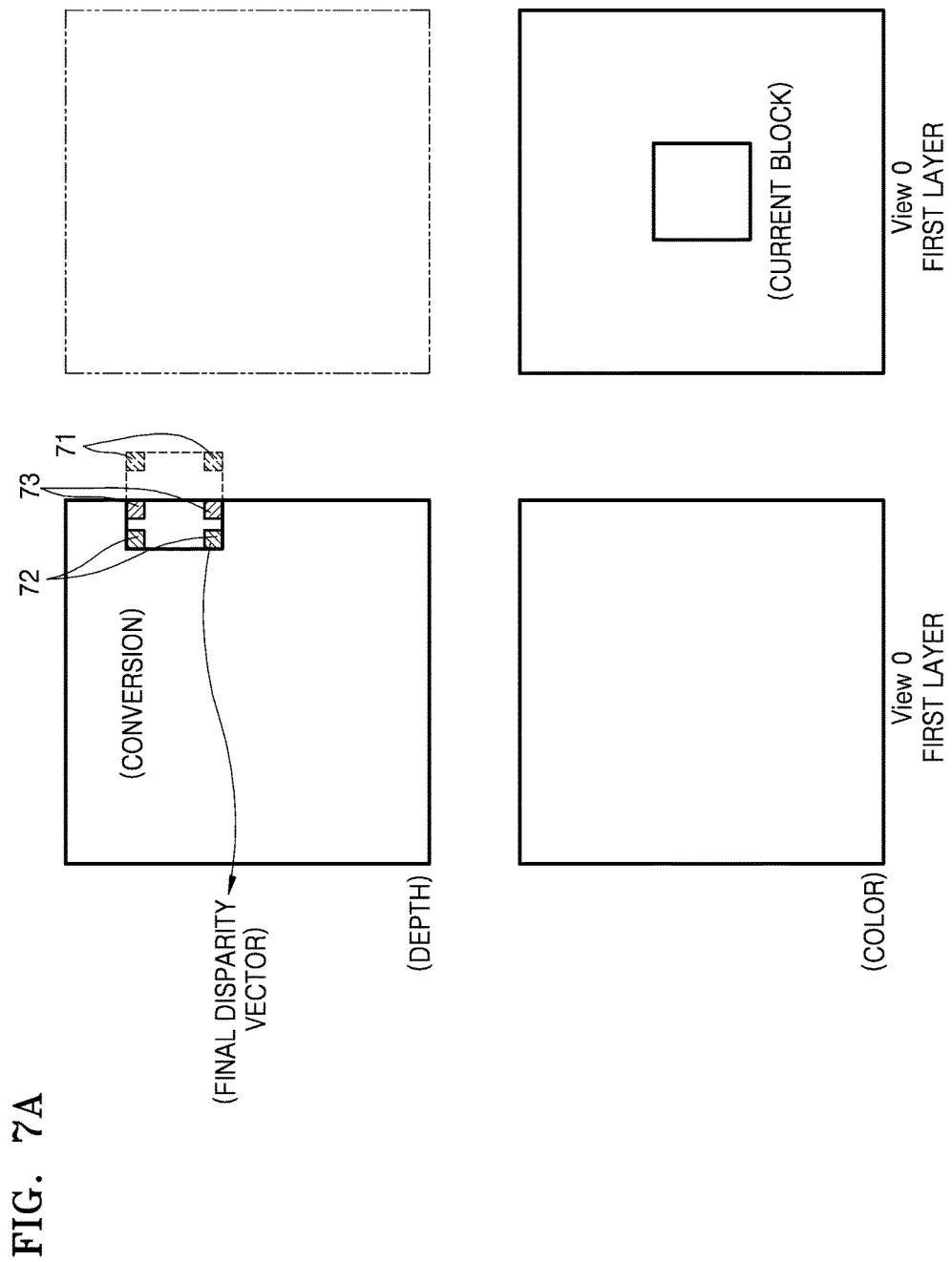
FIGS. 7A and 7B illustrate diagrams for describing a detailed process of determining a depth-based disparity vector, the process being performed by the inter-layer video decoding apparatus, according to embodiments of the present invention.
Figure 7B:
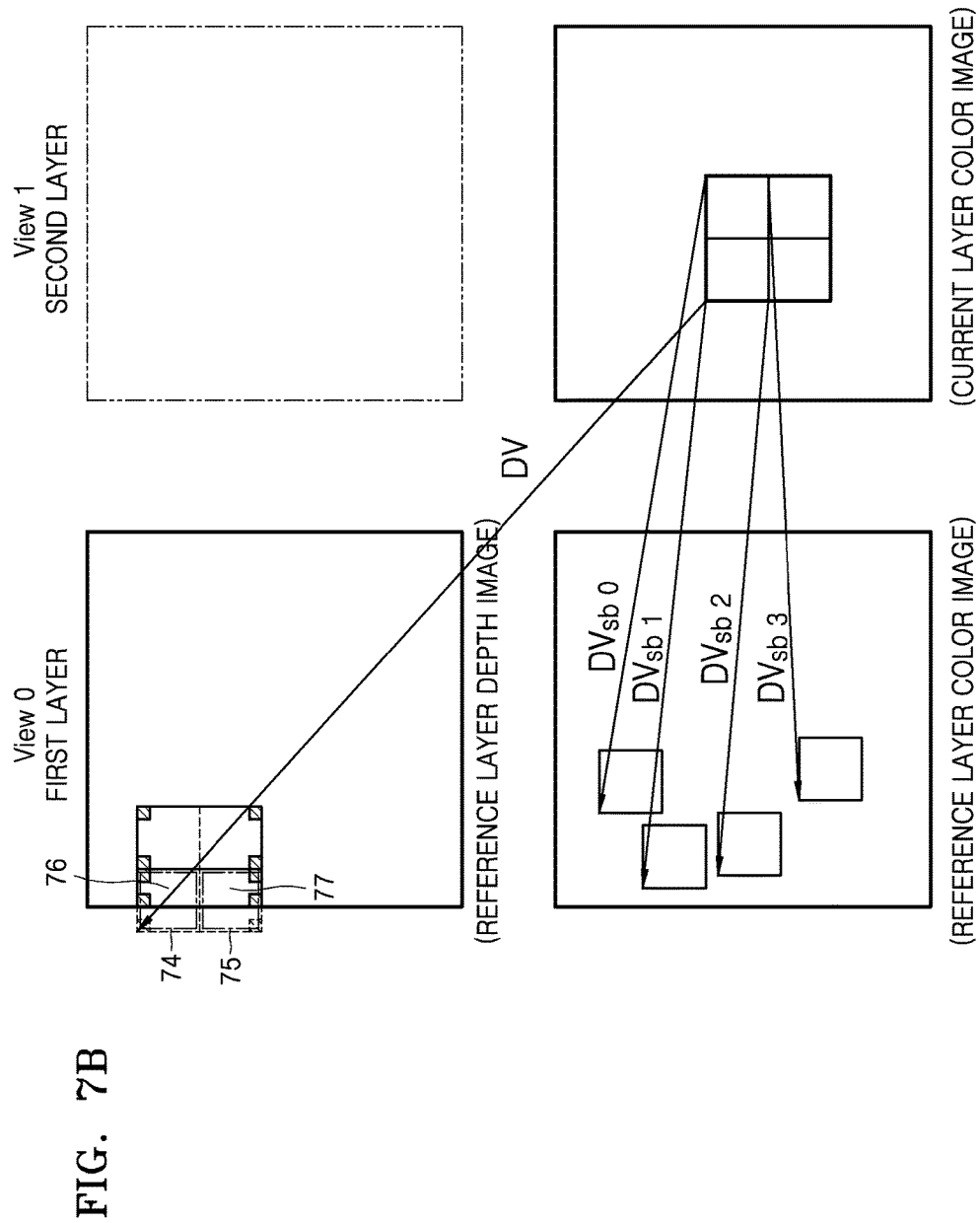

FIGS. 7A and 7B illustrate diagrams for describing a detailed process of determining a depth-based disparity vector, according to embodiments of the present invention.

FIG. 7A illustrates diagrams for describing a detailed process of determining a depth-based disparity vector, according to an embodiment of the present invention.

Referring to FIG. 7A, the inter-layer video decoding apparatus 20 may determine (or may derive) a disparity vector indicating a depth image block of a first layer so as to determine a depth image block of the first layer which corresponds to a current block of a second layer. The inter-layer video decoding apparatus 20 may obtain information about a disparity from a bitstream, and may determine the disparity vector by using the obtained information about the disparity. In addition, the inter-layer video decoding apparatus 20 may derive (or may determine) the disparity vector from a neighboring block. In addition, the inter-layer video decoding apparatus 20 may determine a depth-based disparity vector.

The inter-layer video decoding apparatus 20 may determine the depth image block of the first layer by using the determined disparity vector. Here, it is assumed that an area included in the determined depth image block of the first layer deviates from a boundary of a depth image of the first layer. In a case where the inter-layer video decoding apparatus 20 changelessly uses a depth value of the depth image block without changing it, if depth values of four corners are used, the inter-layer video decoding apparatus 20 uses two depth values 71 of corners outside the boundary, but since the values are located outside the boundary, the values may not be usable or may have undesired depth values. Therefore, a maximum depth value is determined by using only depth values of pixels located at two corners from among the depth values of the four corners, and a final disparity vector is determined by converting the determined depth value, such that accuracy of the disparity vector may deteriorate.

On the other hand, when the area included in the depth image block deviates from the boundary of the depth image, the inter-layer video decoding apparatus 20 according to the embodiment of the present invention may determine coordinates of pixels located outside the depth image so as for the coordinates to correspond to coordinates of pixels located at the boundary of the depth image of the first layer which are met when the pixels located outside the depth image are horizontally moved, and thus may refer to only a depth value in the depth image. A depth value of the pixel located outside the boundary of the depth image may be determined as the depth value in the depth image by changing coordinates of the pixel.

The inter-layer video decoding apparatus 20 may determine the disparity vector by using the determined depth value. When the inter-layer video decoding apparatus 20 uses the depth values of the four corners of the depth image block, the inter-layer video decoding apparatus 20 may use the depth values of the four corners of the depth image block. That is, the inter-layer video decoding apparatus 20 may use all of depth values 72 of two corners and depth values 73 of two corners.

The inter-layer video decoding apparatus 20 may determine a maximum depth value from among the depth values of the four corners. Here, the inter-layer video decoding apparatus 20 may convert the maximum depth value to the disparity vector that indicates a corresponding block of a first layer image. Therefore, the inter-layer video decoding apparatus 20 may determine the more accurate disparity vector.

FIG. 7B illustrates diagrams for describing a detailed process of determining a depth-based disparity vector with respect to a sub-block when view synthesis prediction with respect to a current block is performed, according to an embodiment of the present invention.

A view synthesis prediction method is one of prediction methods used in inter-layer prediction, by which the current block is divided into various sub-blocks, a disparity vector with respect to each of the divided sub-blocks is determined from a depth value, and the inter-layer prediction is performed by referring to sub-blocks of the first layer which are indicated by the disparity vectors of the sub-blocks, respectively. Here, a corresponding block of an image of the first layer which corresponds to the current block is not used by using the disparity vector, but the corresponding block of the image of the first layer which corresponds to the sub-block of the current block is determined by using an initial disparity vector, and the current block is predicted by referring to an image that is synthesized by combining the sub-blocks of areas of the first layer, so that this prediction is called the view synthesis prediction. Here, since the disparity vector of each sub-block is determined from a depth value, the disparity vector may be determined by using the method of determining a depth-based disparity vector according to the embodiment of the present invention. Here, the current block may be a prediction unit but is not limited thereto, and the current block may be a coding unit. Here, a sub-block of the coding unit may be a prediction unit.

However, the view synthesis prediction method is not limited to the embodiment where, when the view synthesis prediction is performed, the current block is divided into the sub-blocks, and the view synthesis prediction method may include determining the depth-based disparity vector of a sub-block by using the sub-block having a same size as the current block, and predicting the current block by referring to a corresponding block of the image of the first layer which is indicated by the determined disparity vector.

Referring to FIG. 7B, when the inter-layer video decoding apparatus 20 predicts a current block by performing view synthesis prediction, in order to determine a depth image block of a first layer which corresponds to the current block of a second layer, the inter-layer video decoding apparatus 20 may determine (or may derive) an initial disparity vector indicating the depth image block of the first layer.

The inter-layer video decoding apparatus 20 may determine, by using the determined initial disparity vector, the depth image block of the first layer which corresponds to the current block. Here, it is assumed that an area included in the determined depth image block of the first layer deviates from a boundary of a depth image of the first layer. In a case where the inter-layer video decoding apparatus 20 changelessly uses a depth value of the depth image block without changing it, if depth values of four corners at each of a top-left sub-block 74 and a top-right sub-block 75 are used, the inter-layer video decoding apparatus 20 uses depth values of two corners outside the boundary, but since the values are located outside the boundary, the values may not be usable or may have undesired depth values. Therefore, a maximum depth value is determined by using only depth values of pixels located at two corners from among the depth values of the four corners, and a final disparity vector is determined by converting the determined depth value, such that accuracy of the disparity vector may deteriorate.

On the other hand, when the area included in the depth image block deviates from the boundary of the depth image, the inter-layer video decoding apparatus 20 according to the embodiment of the present invention may determine coordinates of pixels located outside the depth image so as for the coordinates to correspond to coordinates of pixels located at the boundary of the depth image of the first layer which are met when the pixels located outside are horizontally moved, and thus may refer to a depth value in the depth image. That is, a depth value of the area deviating from the boundary of the depth image may be determined to correspond to the coordinates of the pixel located at the boundary of the depth image of the first layer which are met when moved horizontally, and thus may be determined as a depth value within the boundary of the depth image.

The inter-layer video decoding apparatus 20 may determine the disparity vector by using a depth value of a clipped depth image block. When the inter-layer video decoding apparatus 20 uses depth values of four corners of a depth image sub-block, the inter-layer video decoding apparatus 20 may use depth values of four corners of depth image sub-blocks 76 and 77, and thus may use all of depth values of four corners located within the boundary. The inter-layer video decoding apparatus 20 may determine a maximum depth value from among the depth values of the four corners. Here, the inter-layer video decoding apparatus 20 may convert the maximum depth value to a disparity vector indicating a sub-corresponding block of the image of the first layer. Therefore, when an area included in the depth image sub-block deviates from the boundary of the depth image of the first layer, the inter-layer video decoding apparatus 20 may determine coordinates of an area located outside the boundary of the depth image so as for the coordinates to correspond to coordinates of an area located within the boundary of the depth image, and thus may determine the more accurate disparity vector.

Meanwhile, the inter-layer video decoding apparatus 20 is not limited to determining a disparity vector by applying, regardless of a prediction mode, the method of determining a depth-based disparity vector according to the embodiment of the present invention, and thus the inter-layer video decoding apparatus 20 may apply, according to a prediction mode, the method of determining a depth-based disparity vector according to the embodiment of the present invention or may apply a method of determining a disparity vector according to the related art. The method of determining a disparity vector according to the related art means a method of determining the disparity vector by changelessly using a depth image block even if an area included in the depth image block deviates from a boundary of a depth image of a first layer. For example, as in FIG. 7B, when a disparity vector of a sub-block is determined by performing prediction on a current block according to a view synthesis prediction mode, the method of determining a disparity vector according to the related art may be applied thereto. Meanwhile, when a disparity vector of a current block is determined, regardless of a prediction mode, the method of determining a depth-based disparity vector according to the embodiment of the present invention may be applied thereto.

When the area included in the depth image block which corresponds to the current block deviates from the boundary of the depth image of the first layer during the view synthesis prediction, the inter-layer video decoding apparatus 20 may not include a candidate indicating the view synthesis prediction method, in a merge candidate. Here, the merge candidate means a candidate selected via a method that may be used to predict the current block during a merge mode. The merge candidate may be determined for each prediction block, and may be different in each prediction block. The inter-layer video decoding apparatus 20 may select a prediction method among merge candidates which is to be used so as to predict a current block, and may include a merge index indicating the selected method in a bitstream. The inter-layer video decoding apparatus 20 may select, based on the merge index included in the bitstream, the prediction method among the merge candidates which is to be used so as to predict the current block. Meanwhile, a process of determining the merge candidate may be equally performed in the inter-layer video encoding apparatus 10 and the inter-layer video decoding apparatus 20, and the merge candidate may be determined by using coding information of a neighboring block or a neighboring view, which is encoded and reconstructed in the process.

Meanwhile, although it is described that the operations described above with reference to FIGS. 4A through 7 are performed by the inter-layer video decoding apparatus 20, it will be easily understood by one or ordinary skill in the art that the same operations may be performed by the inter-layer video encoding apparatus 10.

In the inter-layer video encoding apparatus 10 according to an embodiment and the inter-layer video decoding apparatus 20 according to an embodiment, as described above, video data may be split into coding units having a tree structure, and coding units, prediction units, and transformation units are used for inter layer prediction or inter prediction on the coding units. Hereinafter, a video encoding method and apparatus and a video decoding method and apparatus based on coding units having a tree structure according to an embodiment will be described with reference to FIGS. 8 through 20.

In principle, during encoding/decoding for multi-layer video, encoding/decoding processes for first layer images and encoding/decoding processes for second layer images are separately performed. That is, when inter-layer prediction is performed on a multi-layer video, encoding/decoding results of a single-layer video are referred to each other, but separate encoding/decoding processes are performed for respective single-layer videos.

For convenience of description, since a video encoding process and a video decoding process based on a coding unit according to a tree structure, which will be described with reference to FIGS. 8 through 20, are performed on a single-layer video, only inter prediction and motion compensation will be described. However, as described with reference to FIGS. 1A through 7B, inter-layer prediction and compensation between base layer images and second layer images are performed to encode/decode a video stream.

Figure 8:
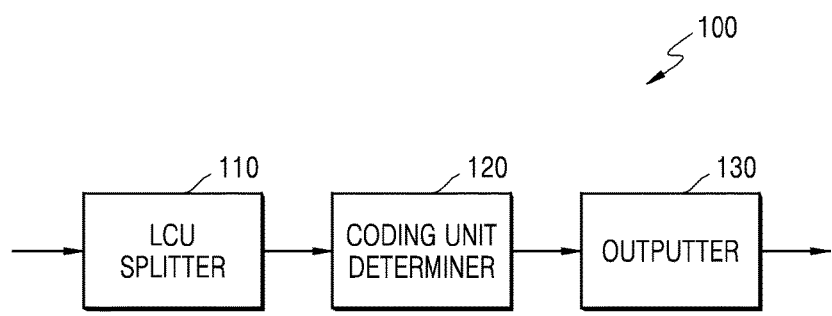
FIG. 8 illustrates a block diagram of a video encoding apparatus based on coding units according to a tree structure, according to an embodiment.

Thus, when the encoder 12 of the inter-layer video encoding apparatus 10 according to an embodiment encodes a multi-layer video based on a coding unit according to a tree structure, in order to encode a video for each respective single-view video, the inter-layer video encoding apparatus 10 includes as many video encoding apparatuses 100 of FIG. 8 as the number of layers of the multi-layer video in order to encode a video such that each video encoding apparatus 100 may be controlled to encode an assigned single-layer video. In addition, the scalable video encoding apparatus 1200 may perform inter-view prediction by using the encoding results of separate single-views of each video encoding apparatus 100. Thus, the encoder 12 of the inter-layer video encoding apparatus 10 may generate a base layer video stream and a second layer video stream, in which the encoding results for respective layers are recorded, for each respective hierarchy.

Figure 9:
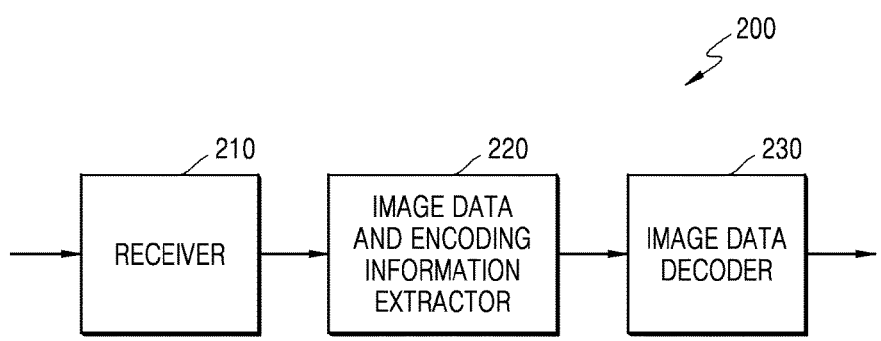
FIG. 9 illustrates a block diagram of a video decoding apparatus based on coding units according to a tree structure, according to an embodiment.

Similarly, when the decoder 26 of the inter-layer video decoding apparatus 20 according to an embodiment decodes a multi-layer video based on a coding unit according to a tree structure, in order to decode the received base layer video stream and second layer video stream for each respective layer, the inter-layer video decoding apparatus 20 may include as many video decoding apparatuses 200 of FIG. 9 as the number of layers of the multi-view video and the video decoding apparatuses 200 may be controlled to perform decoding on single-layer videos that are respectively assigned to the video decoding apparatuses 200. In addition, the inter-layer video encoding apparatus 10 may perform inter-view compensation by using the decoding result of separate single-layer of each video decoding apparatuses 200. Thus, the decoder 26 of the inter-layer video decoding apparatus 20 may generate first layer images and second layer images, which are restored for respective layers.

FIG. 8 illustrates a block diagram of a video encoding apparatus based on coding units according to a tree structure 100, according to an embodiment of the present invention.

The video encoding apparatus involving video prediction based on coding units according to the tree structure 100 includes a coding unit determiner 120 and an output unit 130. Hereinafter, for convenience of description, the video encoding apparatus involving video prediction based on coding units according to the tree structure 100 is referred as 'video encoding apparatus 100'.

The coding unit determiner 120 may split a current picture based on a largest coding unit that is a coding unit having a maximum size for a current picture of an image. If the current picture is larger than the largest coding unit, image data of the current picture may be split into the at least one largest coding unit. The largest coding unit according to an embodiment may be a data unit having a size of 32×32, 64×64, 128×128, 256×256, etc., wherein a shape of the data unit is a square having a width and length in squares of 2.

A coding unit according to an embodiment may be characterized by a maximum size and a depth. The depth denotes the number of times the coding unit is spatially split from the largest coding unit, and as the depth deepens, deeper coding units according to depths may be split from the largest coding unit to a minimum coding unit. A depth of the largest coding unit is an uppermost depth and a depth of the minimum coding unit is a lowermost depth. Since a size of a coding unit corresponding to each depth decreases as the depth of the largest coding unit deepens, a coding unit corresponding to an upper depth may include a plurality of coding units corresponding to lower depths.

As described above, the image data of the current picture is split into the largest coding units according to a maximum size of the coding unit, and each of the largest coding units may include deeper coding units that are split according to depths. Since the largest coding unit according to an embodiment is split according to depths, the image data of a spatial domain included in the largest coding unit may be hierarchically classified according to depths.

A maximum depth and a maximum size of a coding unit, which limit the total number of times a height and a width of the largest coding unit are hierarchically split, may be predetermined.

The coding unit determiner 120 encodes at least one split region obtained by splitting a region of the largest coding unit according to depths, and determines a depth to output a finally encoded image data according to the at least one split region. In other words, the coding unit determiner 120 determines a final depth by encoding the image data in the deeper coding units according to depths, according to the largest coding unit of the current picture, and selecting a depth having the least encoding error. The determined final depth and the encoded image data according to the determined final depth are output to the output unit 130.

The image data in the largest coding unit is encoded based on the deeper coding units corresponding to at least one depth equal to or below the maximum depth, and results of encoding the image data are compared based on each of the deeper coding units. A depth having the least encoding error may be selected after comparing encoding errors of the deeper coding units. At least one final depth may be determined for each largest coding unit.

The size of the largest coding unit is split as a coding unit is hierarchically split according to depths, and as the number of coding units increases. Also, even if coding units correspond to the same depth in one largest coding unit, it is determined whether to split each of the coding units corresponding to the same depth to a lower depth by measuring an encoding error of the image data of the each coding unit, separately. Accordingly, even when image data is included in one largest coding unit, the encoding errors may differ according to regions in the one largest coding unit, and thus the final depths may differ according to regions in the image data. Thus, one or more final depths may be set in one largest coding unit, and the image data of the largest coding unit may be divided according to coding units of at least one final depth.

Accordingly, the coding unit determiner 120 may determine coding units having a tree structure included in the largest coding unit. The 'coding units having a tree structure' according to an embodiment include coding units corresponding to a depth determined to be the final depth, from among all deeper coding units included in the largest coding unit. A coding unit of a final depth may be hierarchically determined according to depths in the same region of the largest coding unit, and may be independently determined in different regions. Similarly, a final depth in a current region may be independently determined from a final depth in another region.

A maximum depth according to an embodiment is an index related to the number of splitting times from a largest coding unit to a minimum coding unit. A first maximum depth according to an embodiment may denote the total number of splitting times from the largest coding unit to the minimum coding unit. A second maximum depth according to an embodiment may denote the total number of depth levels from the largest coding unit to the minimum coding unit. For example, when a depth of the largest coding unit is 0, a depth of a coding unit, in which the largest coding unit is split once, may be set to 1, and a depth of a coding unit, in which the largest coding unit is split twice, may be set to 2. Here, if the minimum coding unit is a coding unit in which the largest coding unit is split four times, 5 depth levels of depths 0, 1, 2, 3, and 4 exist, and thus the first maximum depth may be set to 4, and the second maximum depth may be set to 5.

Prediction encoding and transformation may be performed according to the largest coding unit. The prediction encoding and the transformation are also performed based on the deeper coding units according to a depth equal to or depths less than the maximum depth, according to the largest coding unit.

Since the number of deeper coding units increases whenever the largest coding unit is split according to depths, encoding, including the prediction encoding and the transformation, is performed on all of the deeper coding units generated as the depth deepens. For convenience of description, the prediction encoding and the transformation will now be described based on a coding unit of a current depth, in a largest coding unit.

The video encoding apparatus 100 according to the embodiment may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit so as to perform the prediction encoding on the image data in the coding unit.

In order to perform prediction encoding in the largest coding unit, the prediction encoding may be performed based on a coding unit corresponding to a final depth, i.e., based on a coding unit that is no longer split into coding units corresponding to a lower depth. Hereinafter, the coding unit that is no longer split and becomes a basis unit for prediction encoding will now be referred to as a 'prediction unit'. A partition obtained by splitting the prediction unit may include a prediction unit or a data unit obtained by splitting at least one selected from a height and a width of the prediction unit. A partition is a data unit where a prediction unit of a coding unit is split, and a prediction unit may be a partition having the same size as a coding unit.

For example, when a coding unit of 2N×2N (where N is a positive integer) is no longer split and becomes a prediction unit of 2N×2N, and a size of a partition may be 2N×2N, 2N×N, N×2N, or N×N. Examples of a partition mode may selectively include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one selected from an intra mode, a inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a least encoding error.

The video encoding apparatus 100 according to the embodiment may also perform the transformation on the image data in a coding unit based not only on the coding unit for encoding the image data, but also based on a data unit that is different from the coding unit. In order to perform the transformation in the coding unit, the transformation may be performed based on a data unit having a size smaller than or equal to the coding unit. For example, the data unit for the transformation may include a data unit for an intra mode and a data unit for an inter mode.

The transformation unit in the coding unit may be recursively split into smaller sized regions in the similar manner as the coding unit according to the tree structure. Thus, residual data in the coding unit may be divided according to the transformation unit having the tree structure according to transformation depths.

A transformation depth indicating the number of splitting times to reach the transformation unit by splitting the height and width of the coding unit may also be set in the transformation unit. For example, in a current coding unit of 2N×2N, a transformation depth may be 0 when the size of a transformation unit is 2N×2N, may be 1 when the size of the transformation unit is N×N, and may be 2 when the size of the transformation unit is N/2×N/2. That is, the transformation unit having the tree structure may be set according to the transformation depths.

Split information according to depths requires not only information about depths, but also about information related to prediction encoding and transformation. Accordingly, the coding unit determiner 120 not only determines a depth having a least encoding error, but also determines a partition mode in a prediction unit, a prediction mode according to prediction units, and a size of a transformation unit for transformation.

Coding units according to a tree structure in a largest coding unit and methods of determining a prediction unit/ partition, and a transformation unit, according to embodiments, will be described in detail later with reference to FIGS. 9 through 19.

The coding unit determiner 120 may measure an encoding error of deeper coding units according to depths by using Rate-Distortion Optimization based on Lagrangian multipliers.

The output unit 130 outputs the image data of the largest coding unit, which is encoded based on the at least one depth determined by the coding unit determiner 120, and the split information according to depths, in bitstreams.

The encoded image data may be obtained by encoding residual data of an image.

The split information according to depths may include depth information, information about the partition mode in the prediction unit, information about the prediction mode, split information of the transformation unit, or the like.

The information about the final depth may be defined by using split information according to depths, which indicates whether encoding is performed on coding units of a lower depth instead of a current depth. If the current depth of the current coding unit is the depth, image data in the current coding unit is encoded and output, and thus the split information may be defined not to split the current coding unit to a lower depth. Alternatively, if the current depth of the current coding unit is not the depth, the encoding is performed on the coding unit of the lower depth, and thus the split information may be defined to split the current coding unit to obtain the coding units of the lower depth.

If the current depth is not the depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one largest coding unit, and split information is determined for a coding unit of a depth, split information may be determined for one largest coding unit. Also, data of the largest coding unit may be hierarchically split according to depths, and thus a depth of the data may be different according to locations, so that the depth and the split information may be set for the data.

Accordingly, the output unit 130 according to the present embodiment may assign encoding information about a corresponding depth and an encoding mode to at least one selected from the coding unit, the prediction unit, and a minimum unit included in the largest coding unit.

The minimum unit according to an embodiment is a square data unit obtained by splitting the minimum coding unit constituting the lowermost depth by 4. Alternatively, the minimum unit according to an embodiment may be a maximum square data unit that may be included in all of the coding units, prediction units, partition units, and transformation units included in the largest coding unit.

For example, the encoding information output by the output unit 130 may be classified into encoding information according to deeper coding units, and encoding information according to prediction units. The encoding information according to the deeper coding units may include the information about the prediction mode and about the size of the partitions. The encoding information according to the prediction units may include information about an estimated direction during an inter mode, about a reference image index of the inter mode, about a motion vector, about a chroma component of an intra mode, and about an interpolation method during the intra mode.

Information about a maximum size of the coding unit defined according to pictures, slices, or GOPs, and information about a maximum depth may be inserted into a header of a bitstream, a sequence parameter set, or a picture parameter set.

Information about a maximum size of the transformation unit permitted with respect to a current video, and information about a minimum size of the transformation unit may also be output through a header of a bitstream, a sequence parameter set, or a picture parameter set. The output unit 130 may encode and output reference information, prediction information, and slice type information that are related to prediction.

According to the simplest embodiment for the video encoding apparatus 100, the deeper coding unit may be a coding unit obtained by dividing a height or width of a coding unit of an upper depth, which is one layer above, by two. In other words, when the size of the coding unit of the current depth is 2N×2N, the size of the coding unit of the lower depth is N×N. Also, the coding unit with the current depth having a size of 2N×2N may include a maximum of 4 of the coding units with the lower depth.

Accordingly, the video encoding apparatus 100 may form the coding units having the tree structure by determining coding units having an optimum shape and an optimum size for each largest coding unit, based on the size of the largest coding unit and the maximum depth determined considering characteristics of the current picture. Also, since encoding may be performed on each largest coding unit by using any one of various prediction modes and transformations, an optimum encoding mode may be determined considering characteristics of the coding unit of various image sizes.

Thus, if an image having a high resolution or a large data amount is encoded in a conventional macroblock, the number of macroblocks per picture excessively increases. Accordingly, the number of pieces of compressed information generated for each macroblock increases, and thus it is difficult to transmit the compressed information and data compression efficiency decreases. However, by using the video encoding apparatus 100 according to the present embodiment, image compression efficiency may be increased since a coding unit is adjusted while considering characteristics of an image while increasing a maximum size of a coding unit while considering a size of the image.

The inter-layer video encoding apparatus 10 described above with reference to FIG. 1A may include the video encoding apparatuses 100 corresponding to the number of layers so as to encode single layer images in each of the layers of a multilayer video. For example, a first layer encoder 12 may include one video encoding apparatus 100, and a second layer encoder 14 may include the video encoding apparatuses 100 corresponding to the number of second layers.

When the video encoding apparatuses 100 encode first layer images, the coding unit determiner 120 may determine a prediction unit for inter-image prediction for each of coding units of a tree structure according to each largest coding unit, and may perform the inter-image prediction on each prediction unit.

When the video encoding apparatuses 100 encode second layer images, the coding unit determiner 120 may determine prediction units and coding units of a tree structure according to each largest coding unit, and may perform inter-prediction on each of the prediction units.

The video encoding apparatuses 100 may encode a luminance difference between the first layer image and the second layer image so as to compensate for the luminance difference. However, whether or not to perform luminance may be determined according to a coding mode of a coding unit. For example, luminance compensation may be performed only on a prediction unit having a size of 2N×2N.

FIG. 9 illustrates a block diagram of a video decoding apparatus based on coding units according to a tree structure 200, according to various embodiments.

The video decoding apparatus involving video prediction based on coding units according to the tree structure 200 according to the embodiment includes a receiver 210, an image data and encoding information extractor 220, and an image data decoder 230. Hereinafter, for convenience of description, the video decoding apparatus involving video prediction based on coding units according to the tree structure 200 according to the embodiment is referred as 'video decoding apparatus 200'.

Definitions of various terms, such as a coding unit, a depth, a prediction unit, a transformation unit, and various split information, for decoding operations of the video decoding apparatus 200 according to the embodiment are identical to those described with reference to FIG. 8 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each largest coding unit, and outputs the extracted image data to the image data decoder 230. The image data and encoding information extractor 220 may extract information about a maximum size of a coding unit of a current picture, from a header about the current picture, a sequence parameter set, or a picture parameter set.

Also, the image data and encoding information extractor 220 extracts a final depth and split information with respect to the coding units having a tree structure according to each largest coding unit, from the parsed bitstream. The extracted final depth and the split information are output to the image data decoder 230. That is, the image data in a bit stream is split into the largest coding unit so that the image data decoder 230 decodes the image data for each largest coding unit.

The depth and the split information according to the largest coding unit may be set for information about at least one coding unit corresponding to the depth, and split information according to depths may include partition mode information of a corresponding coding unit, prediction mode information, and split information of a transformation unit. Also, splitting information may be extracted as the information about the depth.

The depth and the split information according to each largest coding unit extracted by the image data and encoding information extractor 220 is information about a depth and split information determined to generate a minimum encoding error when an encoder, such as the video encoding apparatus 100, repeatedly performs encoding for each deeper coding unit according to depths according to each largest coding unit. Accordingly, the video decoding apparatus 200 may reconstruct an image by decoding the image data according to a final depth and an encoding mode that generates the minimum encoding error.

Since encoding information about the depth and the encoding mode may be assigned to a predetermined data unit from among a corresponding coding unit, a prediction unit, and a minimum unit, the image data and encoding information extractor 220 may extract a depth and split information according to the predetermined data units. If information about a depth and split of a corresponding largest coding unit is recorded according to predetermined data units, the predetermined data units having the same information about depth and split may be inferred to be the data units included in the same largest coding unit.

The image data decoder 230 reconstructs the current picture by decoding the image data in each largest coding unit based on the information about depth and split according to the largest coding units. In other words, the image data decoder 230 may decode the encoded image data based on the extracted information about the partition mode, the prediction mode, and the transformation unit for each coding unit from among the coding units having the tree structure included in each largest coding unit. A decoding process may include a prediction including intra prediction and motion compensation, and an inverse transformation.

The image data decoder 230 may perform intra prediction or motion compensation according to a partition and a prediction mode of each coding unit, based on the information about the partition mode and the prediction mode of the prediction unit of the coding unit according to depths.

In addition, the image data decoder 230 may read information about a transformation unit according to a tree structure for each coding unit so as to perform inverse transformation based on transformation units for each coding unit, for inverse transformation for each largest coding unit. Via the inverse transformation, a pixel value of a spatial domain of the coding unit may be reconstructed.

The image data decoder 230 may determine a depth of a current largest coding unit by using split information according to depths. If the split information indicates that image data is no longer split in the current depth, the current depth is a depth. Accordingly, the image data decoder 230 may decode encoded data in the current largest coding unit by using the information about the partition mode of the prediction unit, the prediction mode, and the size of the transformation unit for each coding unit corresponding to the final depth.

In other words, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode. As such, the current coding unit may be decoded by obtaining the information about the encoding mode for each coding unit.

Also, the inter-layer video decoding apparatus 20 described above with reference to FIG. 2A may include the video decoding apparatuses 200 corresponding to the number of views, so as to decode a received first layer image stream and a received second layer image stream and to reconstruct first layer images and second layer images.

When the first layer image stream is received, the image data decoder 230 of the video decoding apparatus 200 may split samples of the first layer images, which are extracted from the first layer image stream by an extractor 220, into coding units according to a tree structure of a largest coding unit. The image data decoder 230 may perform motion compensation, based on prediction units for the inter-image prediction, on each of the coding units according to the tree structure of the samples of the first layer images, and may reconstruct the first layer images.

When the second layer image stream is received, the image data decoder 230 of the video decoding apparatus 200 may split samples of the second layer images, which are extracted from the second layer image stream by the extractor 220, into coding units according to a tree structure of a largest coding unit. The image data decoder 230 may perform motion compensation, based on prediction units for the inter-image prediction, on each of the coding units of the samples of the second layer images, and may reconstruct the second layer images.

The extractor 220 may obtain, from the bitstream, information related to a luminance error so as to compensate for the luminance difference between the first layer image and the second layer image. However, whether or not to perform luminance may be determined according to a coding mode of a coding unit. For example, luminance compensation may be performed only on a prediction unit having a size of 2N×2N.

Thus, the video decoding apparatus 200 may obtain information about at least one coding unit that generates the minimum encoding error when encoding is recursively performed for each largest coding unit, and may use the information to decode the current picture. That is, the coding units having the tree structure determined to be the optimum coding units in each largest coding unit may be decoded.

Accordingly, even if an image has high resolution or has an excessively large data amount, the image may be efficiently decoded and reconstructed by using a size of a coding unit and an encoding mode, which are adaptively determined according to characteristics of the image, by using optimal split information received from an encoder.

Figure 10:
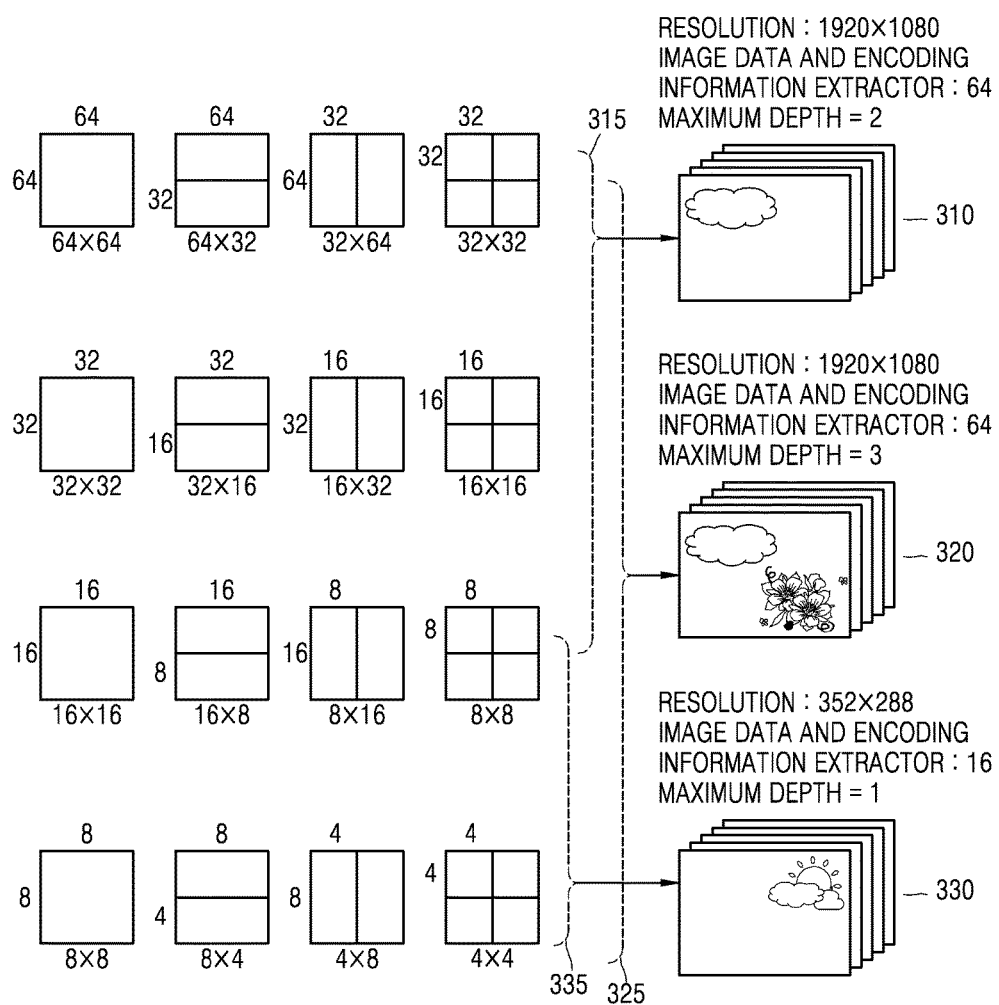
FIG. 10 illustrates a diagram for describing a concept of coding units according to an embodiment of the present invention.

FIG. 10 illustrates a diagram for describing a concept of coding units according to various embodiments.

A size of a coding unit may be expressed by width x height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 10 denotes the total number of splits from a largest coding unit to a minimum decoder.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having a higher resolution than the video data 330 may be selected as 64.

Since the maximum depth of the video data 310 is 2, coding units 315 of the vide data 310 may include a largest coding unit having a long axis size of 64, and coding units having long axis sizes of 32 and 16 since depths are deepened to two layers by splitting the largest coding unit twice. On the other hand, since the maximum depth of the video data 330 is 1, coding units 335 of the video data 330 may include a largest coding unit having a long axis size of 16, and coding units having a long axis size of 8 since depths are deepened to one layer by splitting the largest coding unit once.

Since the maximum depth of the video data 320 is 3, coding units 325 of the video data 320 may include a largest coding unit having a long axis size of 64, and coding units having long axis sizes of 32, 16, and 8 since the depths are deepened to 3 layers by splitting the largest coding unit three times. As a depth deepens, an expression capability with respect to detailed information may be improved.

Figure 11:
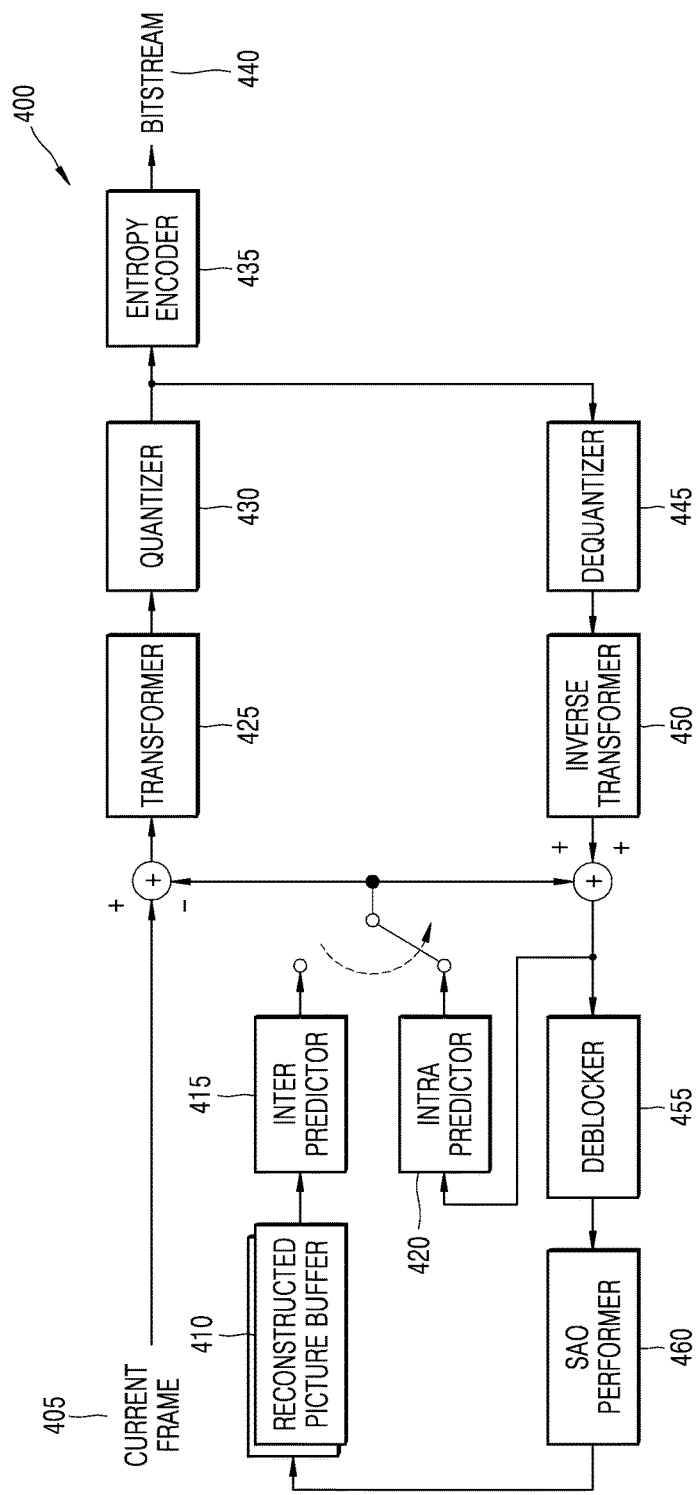
FIG. 11 illustrates a block diagram of an image encoder based on coding units, according to an embodiment of the present invention.

FIG. 11 illustrates a block diagram of an image encoder 400 based on coding units, according to various embodiments.

The image encoder 400 according to the embodiment performs operations of the video encoding apparatus 100 to encode image data. That is, an intra predictor 420 performs intra prediction on a coding unit in an intra mode and from among a current image 405, according to prediction units, and an inter predictor 415 performs inter prediction on a coding unit in an inter mode according to prediction units, by using a reference image obtained from the current image 405 and a reconstructed picture buffer 410. The current image 405 may be split by a largest coding unit and may be sequentially encoded. Here, encoding may be performed on coding units of a tree structure, which are split from the largest coding unit.

Prediction data with respect to the coding unit in each mode output from the intra predictor 420 or the inter predictor 415 is subtracted from data with respect to an encoded coding unit of the current image 405, so that residue data is generated. The residue data is output as a quantized transformation coefficient of each transformation unit through a transformer 425 and a quantizer 430. The quantized transformation coefficient is reconstructed as residue data of a spatial domain through an inverse quantizer 445 and an inverse transformer 450. The reconstructed residue data of the spatial domain is added to the prediction data with respect to the coding unit in each mode output from the intra predictor 420 or the inter predictor 415, and thus is reconstructed as data of the spatial domain with respect to the coding unit of the current image 405. The reconstructed data of the spatial domain is generated as a reconstructed image through a deblocking unit 455 and an SAO performer 460. The generated reconstructed image is stored in the reconstructed picture buffer 410. Reconstructed images stored in the reconstructed picture buffer 410 may be used as a reference image for inter prediction with respect to another image. The transformation coefficient quantized in the transformer 425 and the quantizer 430 may be output as a bitstream 440 through an entropy encoder 435.

In order for the image encoder 400 according to the embodiment to be applied in the video encoding apparatus 100, all elements of the image encoder 400, i.e., the inter predictor 415, the intra predictor 420, the transformer 425, the quantizer 430, the entropy encoder 435, the inverse quantizer 445, the inverse transformer 450, the deblocking unit 455, and the SAO performer 460 may perform operations based on each coding unit among coding units according to a tree structure in each largest coding unit.

In particular, the intra predictor 420 and the inter predictor 415 may determine a partition mode and a prediction mode of each coding unit from among the coding units according to a tree structure by referring to a maximum size and a maximum depth of a current largest coding unit, and the transformer 425 may determine whether or not to split a transformation unit according to a quadtree in each coding unit from among the coding units according to the tree structure.

Figure 12:
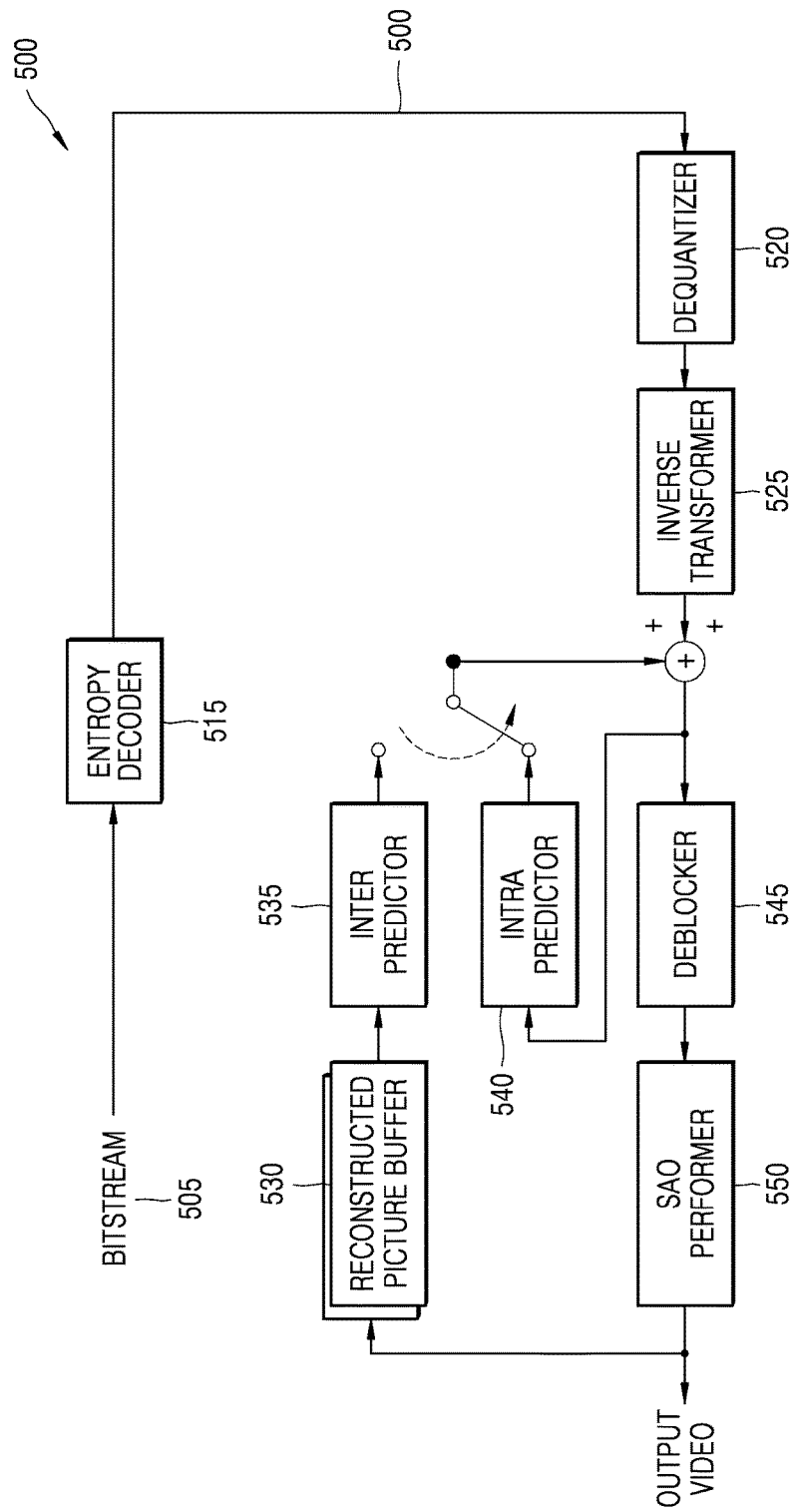
FIG. 12 illustrates a block diagram of an image decoder based on coding units, according to an embodiment of the present invention.

FIG. 12 illustrates a block diagram of an image decoder 500 based on coding units, according to various embodiments.

An entropy decoder 515 parses, from a bitstream 505, encoded image data to be decoded and encoding information required for decoding. The encoded image data is as a quantized transformation unit, and an inverse quantizer 520 and an inverse transformer 525 reconstruct residue data from the quantized transformation unit.

An intra predictor 540 performs intra prediction on a coding unit in an intra mode according to prediction units. An inter predictor 535 performs inter prediction by using a reference image with respect to a coding unit in an inter mode from among a current image, which is obtained by a reconstructed picture buffer 530 according to prediction units.

Prediction data with respect to the coding unit in each mode which passed through the intra predictor 540 or the inter predictor 535, and the residue data are added, so that data of a spatial domain with respect to the coding unit of the current image 405 may be reconstructed, and the reconstructed data of the spatial domain may be output as a output video through a deblocking unit 545 and an SAO performer 550.

In order for the image data decoder 230 of the video decoding apparatus 200 to decode the image data, operations after the entropy decoder 515 of the image decoder 500 may be sequentially performed.

In order for the image decoder 500 to be applied in the video decoding apparatus 200 according to the embodiment, all elements of the image decoder 500, i.e., the entropy decoder 515, the inverse quantizer 520, the inverse transformer 525, the intra predictor 540, the inter predictor 535, the deblocking unit 545, and the SAO performer 550 may perform operations based on each coding unit from among coding units according to a tree structure for each largest coding unit.

In particular, the intra predictor 540 and the inter predictor 535 may determine a partition mode and a prediction mode of each coding unit from among the coding units according to a tree structure, and the inverse transformer 525 may determine whether or not to split a transformation unit according to a quadtree in each coding unit.

The encoding operation of FIG. 10 and the decoding operation of FIG. 11 are described as a videostream encoding operation and a videostream decoding operation, respectively, in a single layer. Therefore, if the encoder 12 of FIG. 1A encodes a videostream of at least two layers, the encoder 12 may include the image encoder 400 for each of layers. Similarly, if the decoder 26 of FIG. 2A decodes a videostream of at least two layers, the decoder 26 may include the image decoder 500 for each of layers.

Figure 13:
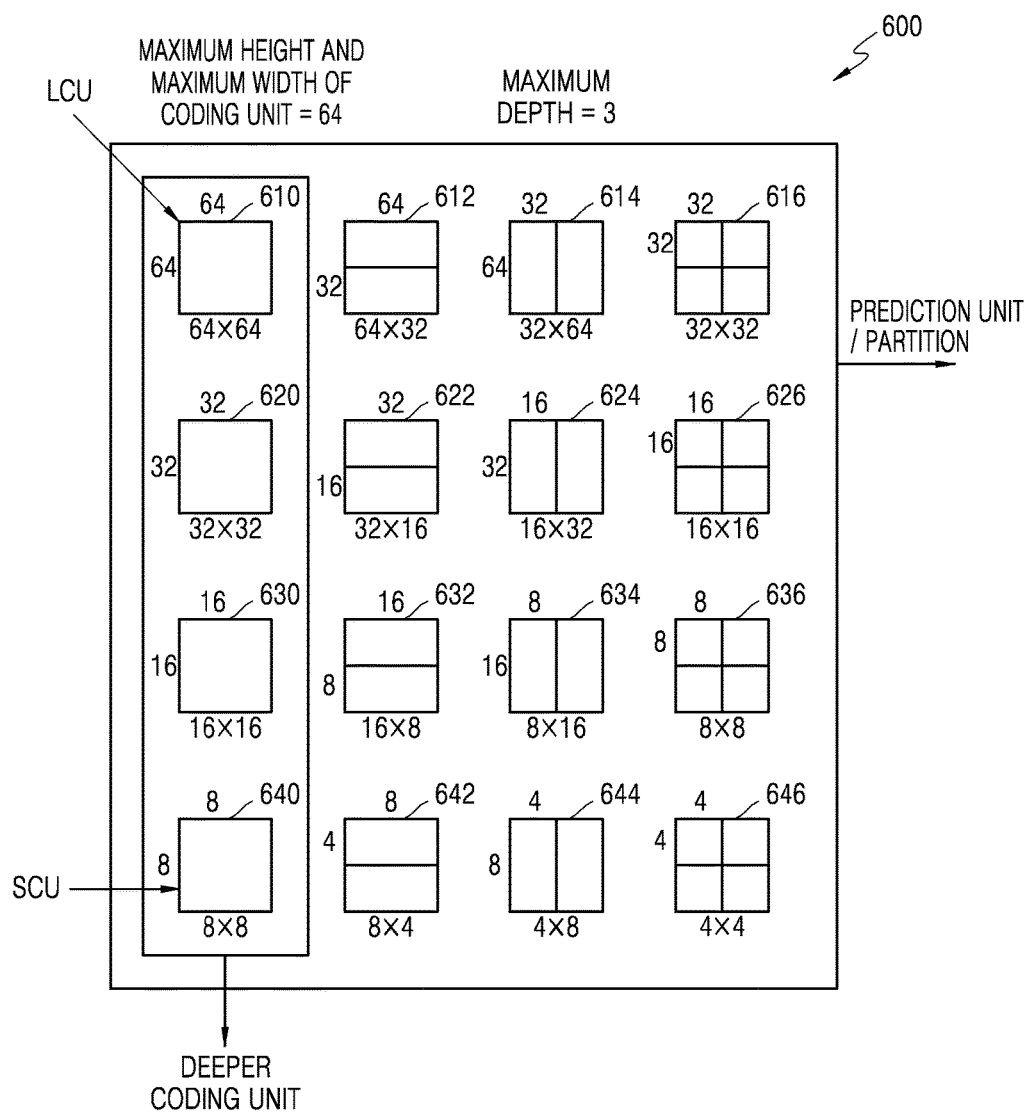
FIG. 13 illustrates a diagram illustrating deeper coding units and partitions, according to an embodiment of the present invention.

FIG. 13 illustrates a diagram illustrating deeper coding units according to depths, and partitions, according to various embodiments.

The video encoding apparatus 100 according to the embodiment and the video decoding apparatus 200 according to the embodiment use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 600 of coding units, according to the present embodiment, the maximum height and the maximum width of the coding units are each 64, and the maximum depth is 3. In this case, the maximum depth refers to a total number of times the coding unit is split from the largest coding unit to the minimum coding unit. Since a depth deepens along a vertical axis of the hierarchical structure 600, a height and a width of the deeper coding unit are each split. Also, a prediction unit and partitions, which are bases for prediction encoding of each deeper coding unit, are shown along a horizontal axis of the hierarchical structure 600.

That is, a coding unit 610 is a largest coding unit in the hierarchical structure 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, and a coding unit 640 having a size of 8×8 and a depth of 3. The coding unit 640 having the size of 8×8 and the depth of 3 is a minimum coding unit.

The prediction unit and the partitions of a coding unit are arranged along the horizontal axis according to each depth. In other words, if the coding unit 610 having a size of 64×64 and a depth of 0 is a prediction unit, the prediction unit may be split into partitions include in the encoder 610, i.e. a partition 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 1 may be split into partitions included in the coding unit 620, i.e. a partition 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 2 may be split into partitions included in the coding unit 630, i.e. a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having the size of 8×8 and the depth of 3 may be split into partitions included in the coding unit 640, i.e. a partition having a size of 8×8 included in the coding unit 640, partitions 642 having a size of 8×4, partitions 644 having a size of 4×8, and partitions 646 having a size of 4×4.

In order to determine the at least one final depth of the coding units constituting the largest coding unit 610, the coding unit determiner 120 of the video encoding apparatus 100 according to the embodiment performs encoding for coding units corresponding to each depth included in the largest coding unit 610.

The number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a least encoding error that is a representative encoding error may be selected for the current depth by performing encoding for each prediction unit in the coding units corresponding to the current depth, along the horizontal axis of the hierarchical structure 600. Alternatively, the minimum encoding error may be searched for by comparing representative encoding errors according to depths, by performing encoding for each depth as the depth deepens along the vertical axis of the hierarchical structure 600. A depth and a partition having the minimum encoding error in the coding unit 610 may be selected as the final depth and a partition mode of the coding unit 610.

Figure 14:
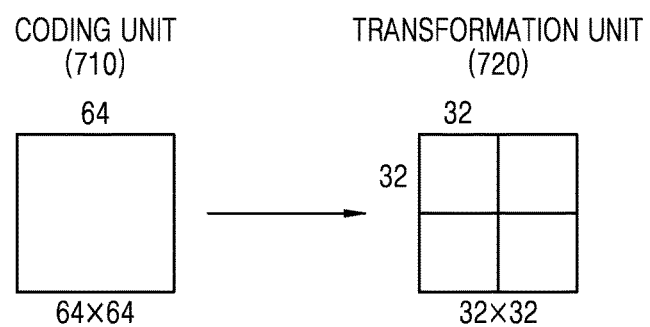
FIG. 14 illustrates a diagram for describing a relationship between a coding unit and transformation units, according to an embodiment of the present invention.

FIG. 14 illustrates a diagram for describing a relationship between a coding unit 710 and transformation units 720, according to various embodiments.

The video encoding apparatus 100 according to the embodiment or the video decoding apparatus 200 according to the embodiment encodes or decodes an image according to coding units having sizes smaller than or equal to a largest coding unit for each largest coding unit. Sizes of transformation units for transformation during encoding may be selected based on data units that are not larger than a corresponding coding unit.

For example, in the video encoding apparatus 100 according to the embodiment or the video decoding apparatus 200 according to the embodiment, if a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error with respect to an original image may be selected.

FIG. 15 illustrates a plurality of pieces of encoding information, according to various embodiments.

The output unit 130 of the video encoding apparatus 100 according to the embodiment may encode and transmit partition mode information 800, prediction mode information 810, and transformation unit size information 820 for each coding unit corresponding to a depth, as split information.

The partition mode information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the partition mode information 800 is set to indicate one of the partition 804 having a size of 2N×N, the partition 806 having a size of N×2N, and the partition 808 having a size of N×N.

The prediction mode information 810 indicates a prediction mode of each partition. For example, the prediction mode information 810 may indicate a mode of prediction encoding performed on a partition indicated by the partition mode information 800, i.e., an intra mode 812, an inter mode 814, or a skip mode 816.

The transformation unit size information 820 indicates a transformation unit to be based on when transformation is performed on a current coding unit. For example, the transformation unit may be a first intra transformation unit 822, a second intra transformation unit 824, a first inter transformation unit 826, or a second inter transformation unit 828.

The image data and encoding information extractor 220 of the video decoding apparatus 200 may extract and use the partition mode information 800, the prediction mode information 810, and the transformation unit size information 820 for decoding, according to each deeper coding unit.

Figure 16:
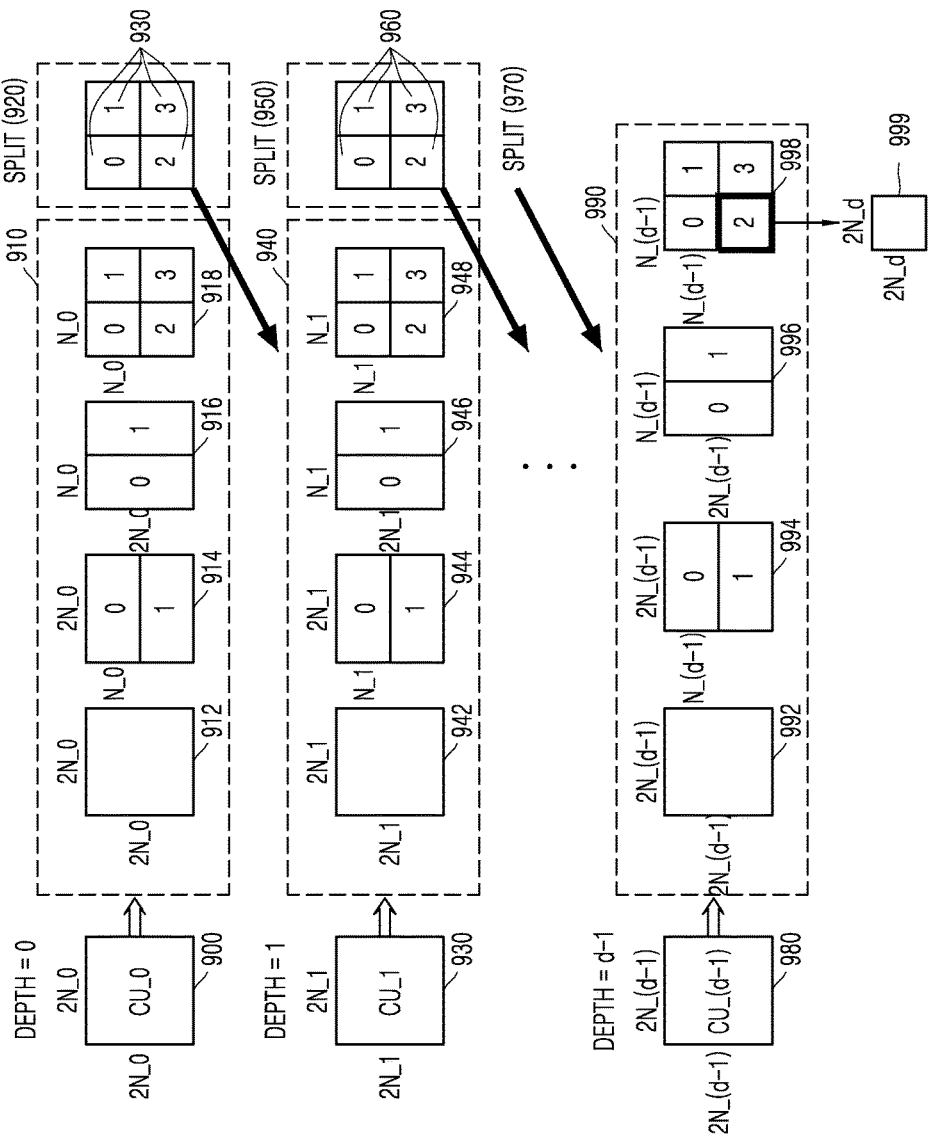
FIG. 16 is a diagram of deeper coding units, according to an embodiment of the present invention.

FIG. 16 is a diagram of deeper coding units according to depths, according to various embodiments.

Split information may be used to indicate a change of a depth. The spilt information indicates whether a coding unit of a current depth is split into coding units of a lower depth.

Figure 23:
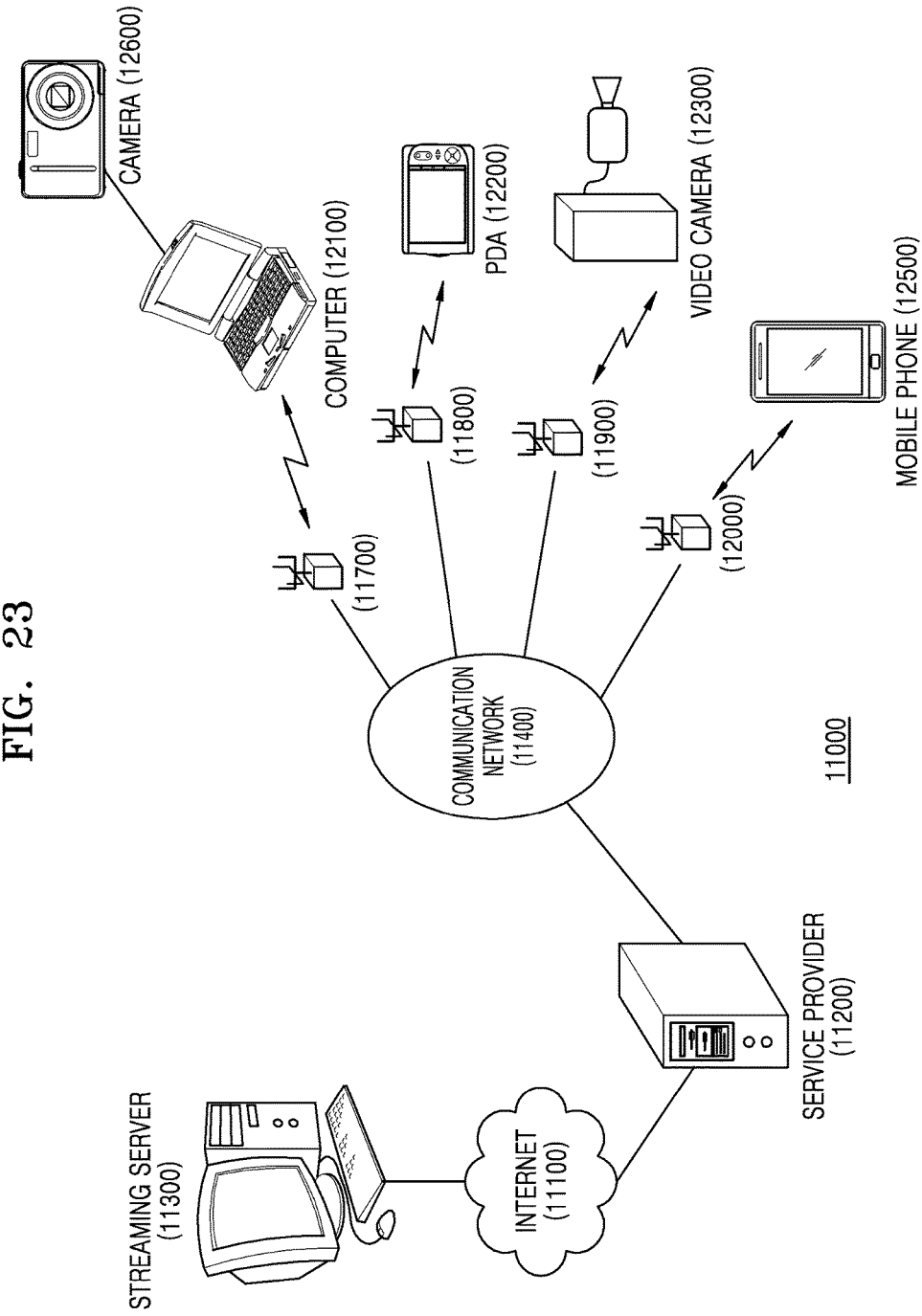
FIG. 23 illustrates a diagram of an overall structure of a content supply system for providing a content distribution service.

A prediction unit 910 for prediction encoding a coding unit 900 having a depth of 0 and a size of 2N_0×2N_0 may include partitions of a partition mode 912 having a size of 2N_0×2N_0, a partition mode 914 having a size of 2N_0×N_0, a partition mode 916 having a size of N_0×2N_0, and a partition mode 918 having a size of N_0×N_0. FIG. 23 only illustrates the partition modes 912 through 918 which are obtained by symmetrically splitting the prediction unit 910, but a partition mode is not limited thereto, and the partitions of the prediction unit 910 may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition mode. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

If an encoding error is smallest in one of the partition modes 912, 914, and 916 having the sizes of 2N_0×2N_0, 2N_0×N_0 and N_0×2N_0, the prediction unit 910 may not be split into a lower depth.

If the encoding error is the smallest in the partition mode 918 having the size of N_0×N_0, a depth is changed from 0 to 1 to split the partition mode 918 in operation 920, and encoding is repeatedly performed on coding units 930 having a depth of 2 and a size of N_0×N_0 to search for a minimum encoding error.

A prediction unit 940 for prediction encoding the coding unit 930 having a depth of 1 and a size of 2N_1×2N_1 (=N_0×N_0) may include partitions of a partition mode 942 having a size of 2N_1×2N_1, a partition mode 944 having a size of 2N_1×N_1, a partition mode 946 having a size of N_1×2N_1, and a partition mode 948 having a size of N_1×N_1.

If an encoding error is the smallest in the partition mode 948 having the size of N_1×N_1, a depth is changed from 1 to 2 to split the partition mode 948 in operation 950, and encoding is repeatedly performed on coding units 960, which have a depth of 2 and a size of N_2×N_2 to search for a minimum encoding error.

When a maximum depth is d, split operation according to each depth may be performed up to when a depth becomes d−1, and split information may be encoded as up to when a depth is one of 0 to d−2. In other words, when encoding is performed up to when the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition mode 992 having a size of 2N_(d−1)×2N_(d−1), a partition mode 994 having a size of 2N_(d−1)×N_(d−1), a partition mode 996 having a size of N_(d−1)×2N_(d−1), and a partition mode 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition modes 992 through 998 to search for a partition mode having a minimum encoding error.

Even when the partition mode 998 having the size of N_(d−1)×N_(d−1) has the minimum encoding error, since a maximum depth is d, a coding unit CU_(d−1) having a depth of d−1 is no longer split into a lower depth, and a depth for the coding units constituting a current largest coding unit 900 is determined to be d−1 and a partition mode of the current largest coding unit 900 may be determined to be N_(d−1)×N_(d−1). Also, since the maximum depth is d, split information for the coding unit 952 having a depth of d−1 is not set.

A data unit 999 may be a 'minimum unit' for the current largest coding unit. A minimum unit according to the embodiment may be a square data unit obtained by splitting a minimum coding unit 980 having a lowermost depth by 4. By performing the encoding repeatedly, the video encoding apparatus 100 according to the embodiment may select a depth having the least encoding error by comparing encoding errors according to depths of the coding unit 900 to determine a depth, and set a corresponding partition mode and a prediction mode as an encoding mode of the depth.

As such, the minimum encoding errors according to depths are compared in all of the depths of 0, 1, . . . , d−1, d, and a depth having the least encoding error may be determined as a depth. The depth, the partition mode of the prediction unit, and the prediction mode may be encoded and transmitted as split information. Also, since a coding unit is split from a depth of 0 to a depth, only split information of the depth is set to '0', and split information of depths excluding the depth is set to '1'.

The image data and encoding information extractor 220 of the video decoding apparatus 200 according to the embodiment may extract and use the information about the depth and the prediction unit of the coding unit 900 to decode the partition 912. The video decoding apparatus 200 according to the embodiment may determine a depth, in which split information is '0', as a depth by using split information according to depths, and use split information of the corresponding depth for decoding.

Figure 17:
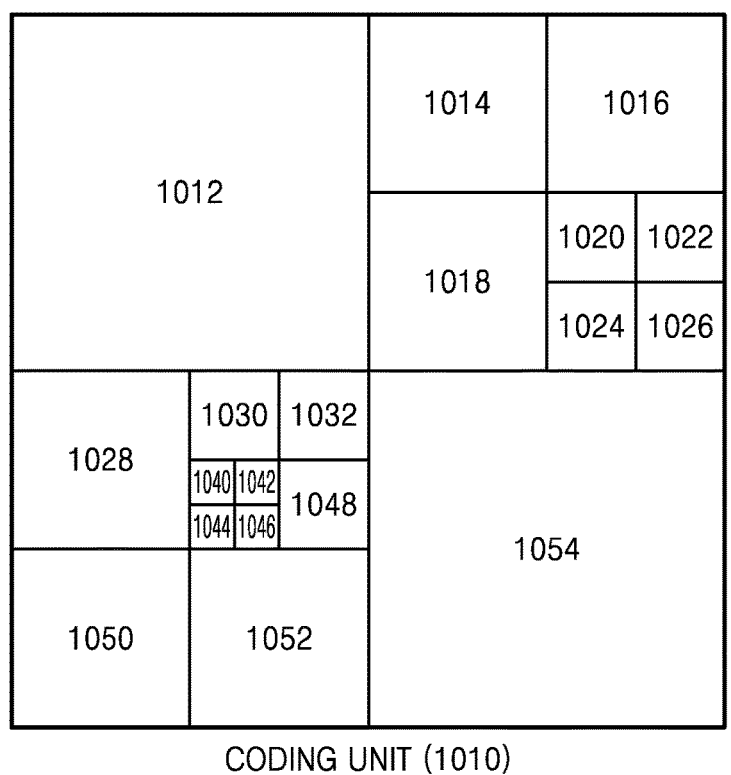
FIGS. 17, 18, and 19 are diagrams for describing a relationship between coding units, prediction units, and transformation units, according to embodiments of the present invention.
Figure 18:
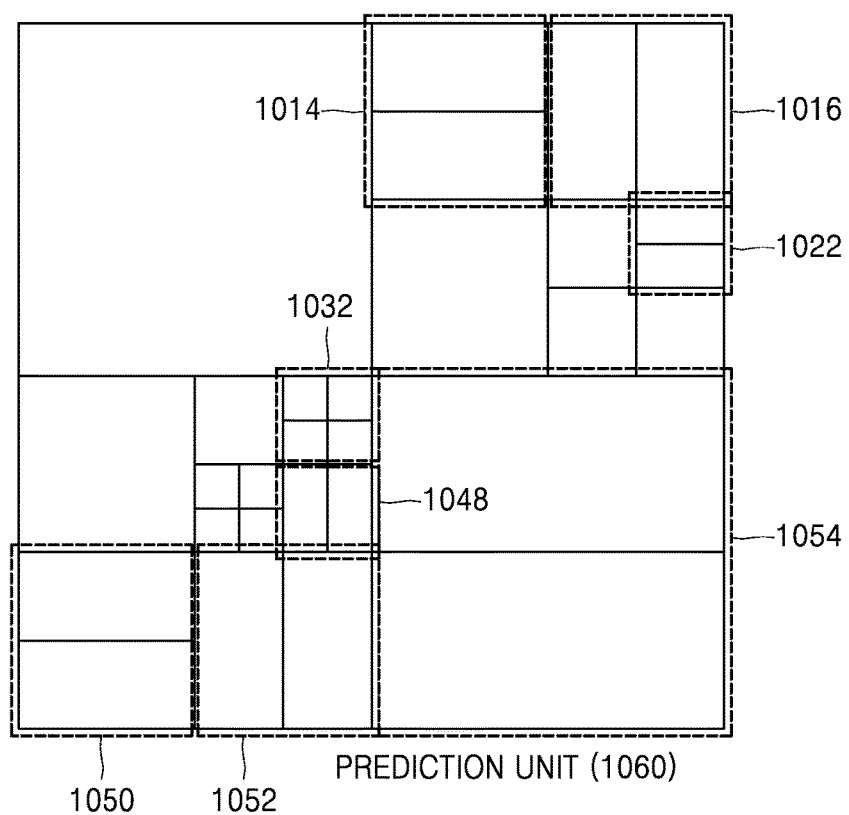
Figure 19:
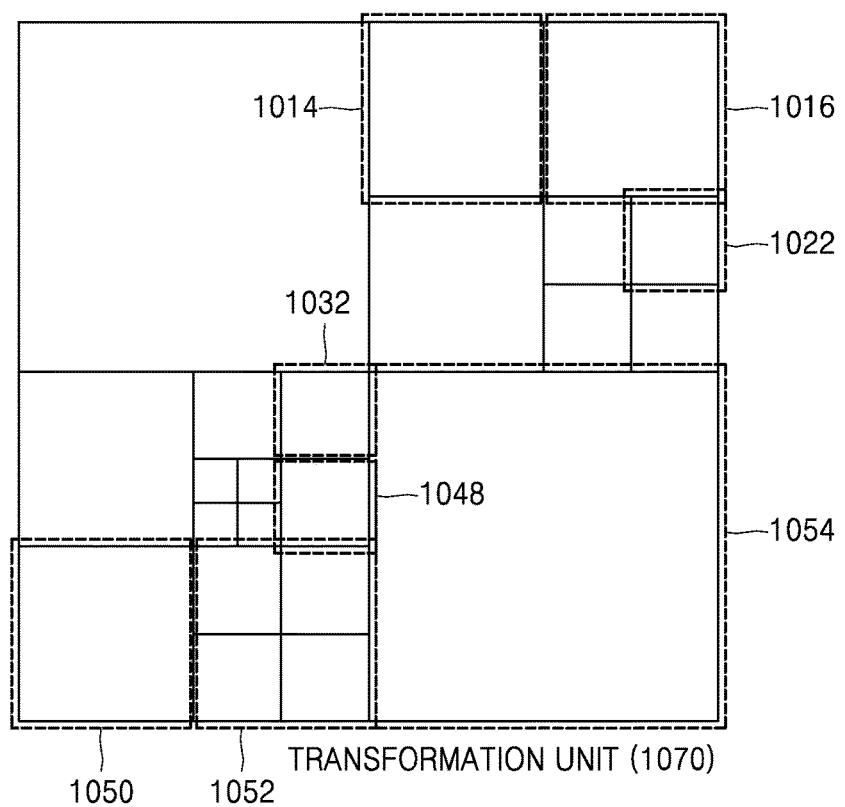

FIGS. 17, 18, and 19 are diagrams for describing a relationship between coding units, prediction units, and transformation units, according to various embodiments.

Coding units 1010 are deeper coding units according to depths determined by the video encoding apparatus 100, in a largest coding unit. Prediction units 1060 are partitions of prediction units of each of the coding units 1010, and transformation units 1070 are transformation units of each of the coding units 1010.

When a depth of a largest coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some encoders 1014, 1016, 1022, 1032, 1048, 1050, 1052, and 1054 are obtained by splitting the coding units in the encoders 1010. That is, partition modes in the coding units 1014, 1022, 1050, and 1054 have a size of 2N×N, partition modes in the coding units 1016, 1048, and 1052 have a size of N×2N, and a partition mode of the coding unit 1032 has a size of N×N. Prediction units and partitions of the coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, and 1052 in the transformation units 1070 are different from those in the prediction units 1060 in terms of sizes and shapes. That is, the video encoding apparatus 100 according to the present embodiment and the video decoding apparatus 200 according to the present embodiment may perform intra prediction/motion estimation/motion compensation/and transformation/inverse transformation individually on a data unit in the same coding unit.

Accordingly, encoding is recursively performed on each of coding units having a hierarchical structure in each region of a largest coding unit to determine an optimum coding unit, and thus coding units having a recursive tree structure may be obtained. Encoding information may include split information about a coding unit, information about a partition mode, information about a prediction mode, and information about a size of a transformation unit. Table 2 below shows the encoding information that may be set by the video encoding apparatus 100 according to the embodiment and the video decoding apparatus 200 according to the embodiment.

TABLE 2

| Split Information 0 (Encoding on Coding Unit having Size of 2N × 2N and Current Depth of d) | | | | | Split Information 1 |
|---|---|---|---|---|---|
| Prediction Mode | Partition Type | | Size of Transformation Unit | | Repeatedly Encode Coding Units having Lower Depth of d + 1 |
| | Symmetrical Partition mode | Asymmetrical Partition mode | Split Information 0 of Transformation Unit | Split Information 1 of Transformation Unit | |
| Intra Inter Skip (Only 2N × 2N) | 2N × 2N 2N × N N × 2N N × N | 2N × nU 2N × nD nL × 2N nR × 2N | 2N × 2N | N × N (Symmetrical Partition mode) N/2 × N/2 (Asymmetrical Partition mode) | |

The output unit 130 of the video encoding apparatus 100 according to the embodiment may output the encoding information about the coding units having a tree structure, and the image data and encoding information extractor 220 of the video decoding apparatus 200 according to the embodiment may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is a depth, and thus information about a partition mode, prediction mode, and a size of a transformation unit may be defined for the depth. If the current coding unit is further split according to the split information, encoding is independently performed on four split coding units of a lower depth.

A prediction mode may be one of an intra mode, an inter mode, and a skip mode. The intra mode and the inter mode may be defined in all partition modes, and the skip mode is defined only in a partition mode having a size of 2N×2N.

The information about the partition mode may indicate symmetrical partition modes having sizes of 2N×2N, 2N×N, N×2N, and N×N, which are obtained by symmetrically splitting a height or a width of a prediction unit, and asymmetrical partition modes having sizes of 2N×nU, 2N×nD, nL×2N, and nR×2N, which are obtained by asymmetrically splitting the height or width of the prediction unit. The asymmetrical partition modes having the sizes of 2N×nU and 2N×nD may be respectively obtained by splitting the height of the prediction unit in 1:3 and 3:1, and the asymmetrical partition modes having the sizes of nL×2N and nR×2N may be respectively obtained by splitting the width of the prediction unit in 1:3 and 3:1.

The size of the transformation unit may be set to be two types in the intra mode and two types in the inter mode. In other words, if split information of the transformation unit is 0, the size of the transformation unit may be 2N×2N, which is the size of the current coding unit. If split information of the transformation unit is 1, the transformation units may be obtained by splitting the current coding unit. Also, if a partition mode of the current coding unit having the size of 2N×2N is a symmetrical partition mode, a size of a transformation unit may be N×N, and if the partition mode of the current coding unit is an asymmetrical partition mode, the size of the transformation unit may be N/2×N/2.

The encoding information about coding units having a tree structure according to the embodiment may be assigned to at least one selected from a coding unit corresponding to a depth, a prediction unit, and a minimum unit. The coding unit corresponding to the depth may include at least one selected from a prediction unit and a minimum unit containing the same encoding information.

Accordingly, it is determined whether adjacent data units are included in the same coding unit corresponding to the final depth by comparing encoding information of the adjacent data units. Also, a corresponding coding unit corresponding to a final depth is determined by using encoding information of a data unit, and thus a distribution of final depths in a largest coding unit may be determined.

Accordingly, if a current coding unit is predicted based on encoding information of adjacent data units, encoding information of data units in deeper coding units adjacent to the current coding unit may be directly referred to and used.

In another embodiment, if a current coding unit is predicted based on encoding information of adjacent data units, data units adjacent to the current coding unit are searched using encoded information of the data units, and the searched adjacent coding units may be referred for predicting the current coding unit.

Figure 20:
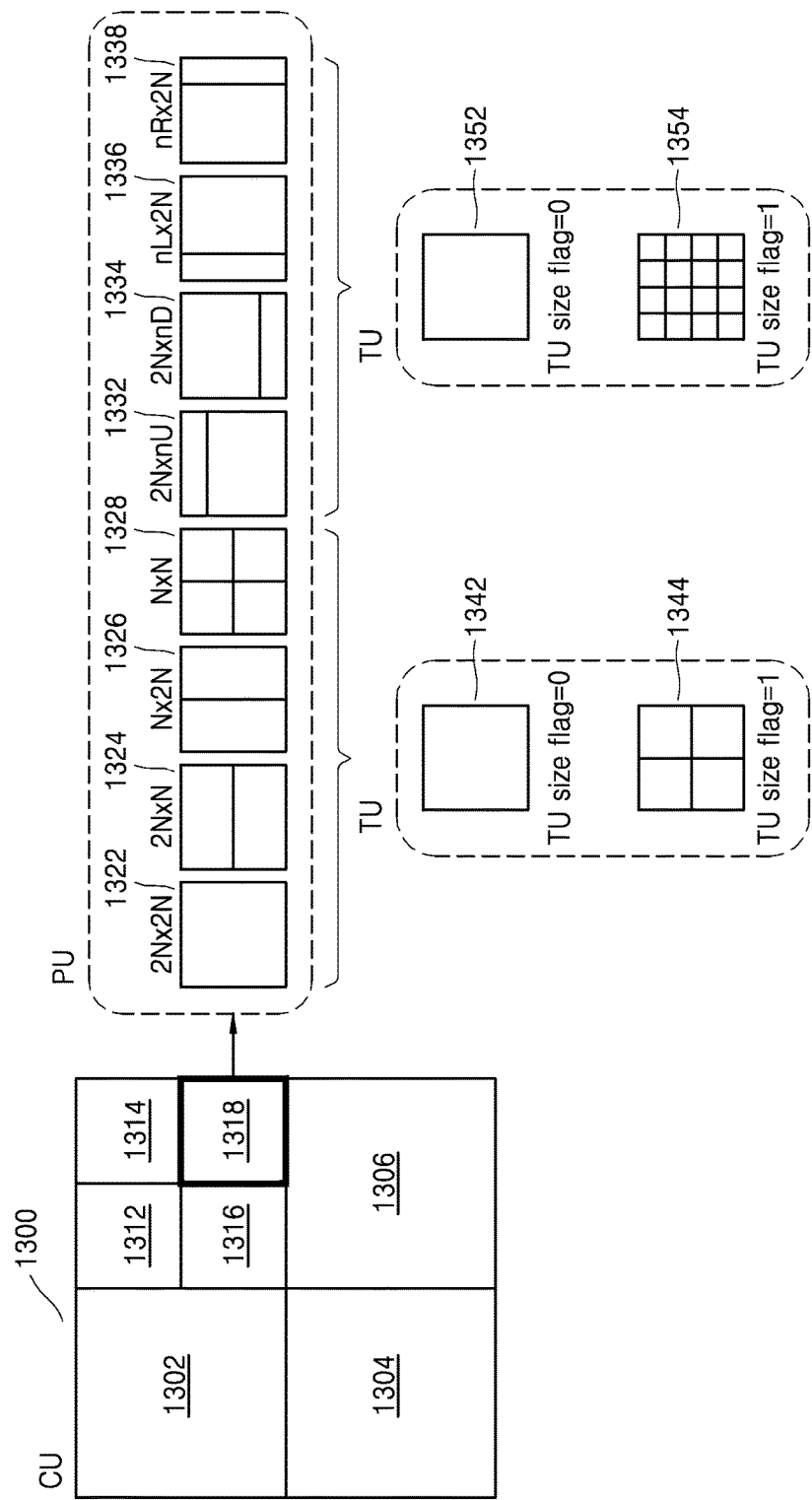
FIG. 20 illustrates a diagram for describing a relationship between a coding unit, a prediction unit, and a transformation unit, according to encoding mode information of Table 2.

FIG. 20 illustrates a diagram for describing a relationship between a coding unit, a prediction unit, and a transformation unit, according to encoding mode information of Table 2.

A largest coding unit 1300 includes coding units 1302, 1304, 1306, 1312, 1314, 1316, and 1318 of depths. Here, since the coding unit 1318 is a coding unit of a depth, split information may be set to 0. Information about a partition mode of the coding unit 1318 having a size of 2N×2N may be set to be one of partition modes including 2N×2N 1322, 2N×N 1324, N×2N 1326, N×N 1328, 2N×nU 1332, 2N×nD 1334, nL×2N 1336, and nR×2N 1338.

Transformation unit split information (TU size flag) is a type of a transformation index. A size of a transformation unit corresponding to the transformation index may be changed according to a prediction unit type or partition mode of the coding unit.

For example, when the information about the partition mode is set to be one of symmetrical partition modes 2N×2N 1322, 2N×N 1324, N×2N 1326, and N×N 1328, if the transformation unit split information is 0, a transformation unit 1342 having a size of 2N×2N is set, and if the transformation unit split information is 1, a transformation unit 1344 having a size of N×N is set.

When the information about the partition mode is set to be one of asymmetrical partition modes 2N×nU 1332, 2N×nD 1334, nL×2N 1336, and nR×2N 1338, if the transformation unit split information is 0, a transformation unit 1352 having a size of 2N×2N may be set, and if the transformation unit split information is 1, a transformation unit 1354 having a size of N/2×N/2 may be set.

As described above with reference to FIG. 19, the transformation unit split information (TU size flag) is a flag having a value or 0 or 1, but the transformation unit split information is not limited to a flag having 1 bit, and the transformation unit may be hierarchically split while the transformation unit split information increases in a manner of 0, 1, 2, 3 . . . etc., according to setting. The transformation unit split information may be an example of the transformation index.

In this case, the size of a transformation unit that has been actually used may be expressed by using the transformation unit split information according to the embodiment, together with a maximum size of the transformation unit and a minimum size of the transformation unit. The video encoding apparatus 100 according to the embodiment is capable of encoding maximum transformation unit size information, minimum transformation unit size information, and maximum transformation unit split information. The result of encoding the maximum transformation unit size information, the minimum transformation unit size information, and the maximum transformation unit split information may be inserted into an SPS. The video decoding apparatus 200 according to the embodiment may decode video by using the maximum transformation unit size information, the minimum transformation unit size information, and the maximum transformation unit split information.

For example, (a) if the size of a current coding unit is 64×64 and a maximum transformation unit size is 32×32, (a-1) then the size of a transformation unit may be 32×32 when a TU size flag is 0, (a-2) may be 16×16 when the TU size flag is 1, and (a-3) may be 8×8 when the TU size flag is 2.

As another example, (b) if the size of the current coding unit is 32×32 and a minimum transformation unit size is 32×32, (b-1) then the size of the transformation unit may be 32×32 when the TU size flag is 0. Here, the TU size flag cannot be set to a value other than 0, since the size of the transformation unit cannot be less than 32×32.

As another example, (c) if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit may be defined by Equation (1):

$$\text{CurrMinTuSize}=\max(\text{MinTransformSize},\text{RootTuSize}/(2^{\wedge}\text{MaxTransformSizeIndex})) \quad (1)$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. That is, in Equation (1), 'RootTuSize/(2^MaxTransformSizeIndex)' denotes a transformation unit size when the transformation unit size 'RootTuSize', when the TU size flag is 0, is split by the number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that can be determined in the current coding unit.

According to an embodiment, the maximum transformation unit size RootTuSize may vary according to the type of a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

$$\text{RootTuSize}=\min(\text{MaxTransformSize},\text{PUSize}) \quad (2)$$

That is, if the current prediction mode is the inter mode, the transformation unit size 'RootTuSize', when the TU size flag is 0, may be a smaller value from among the maximum transformation unit size and the current prediction unit size.

If a prediction mode of a current partition unit is an intra mode, 'RootTuSize' may be determined by using Equation (3) below. In Equation (3), 'PartitionSize' denotes the size of the current partition unit.

$$\text{RootTuSize}=\min(\text{MaxTransformSize},\text{PartitionSize}) \quad (3)$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an embodiment, and a factor for determining the current maximum transformation unit size is not limited thereto.

According to the video encoding method based on coding units of a tree structure described above with reference to FIGS. 8 through 20, image data of a spatial domain is encoded in each of the coding units of the tree structure, and the image data of the spatial domain is reconstructed in a manner that decoding is performed on each largest coding unit according to the video decoding method based on the coding units of the tree structure, so that a video that is formed of pictures and pictures sequences may be reconstructed. The reconstructed video may be reproduced by a reproducing apparatus, may be stored in a storage medium, or may be transmitted via a network.

The one or more embodiments can be written as computer programs and can be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), etc.

For convenience of description, the inter-layer video encoding methods and/or video encoding methods which are described above with reference to FIGS. 1A through 20 are collectively referred to as 'the video encoding method of the present invention'. Also, the inter-layer video decoding methods and/or video decoding methods which are described above with reference to FIGS. 1A through 20 are referred to as 'the video decoding method of the present invention'.

Also, a video encoding apparatus including the inter-layer video encoding apparatus 10, the video encoding apparatus 100, or the image encoder 400, which are described above with reference to FIGS. 1A through 20, is collectively referred as a 'video encoding apparatus of the present invention'. Also, a video decoding apparatus including the inter-layer video decoding apparatus 20, the video decoding apparatus 200, or the image decoder 500, which are described above with reference to FIGS. 1A through 20, is collectively referred to as a 'video decoding apparatus of the present invention'.

A computer-readable recording medium storing a program, e.g., a disc 26000, according to an embodiment will now be described in detail.

Figure 21:
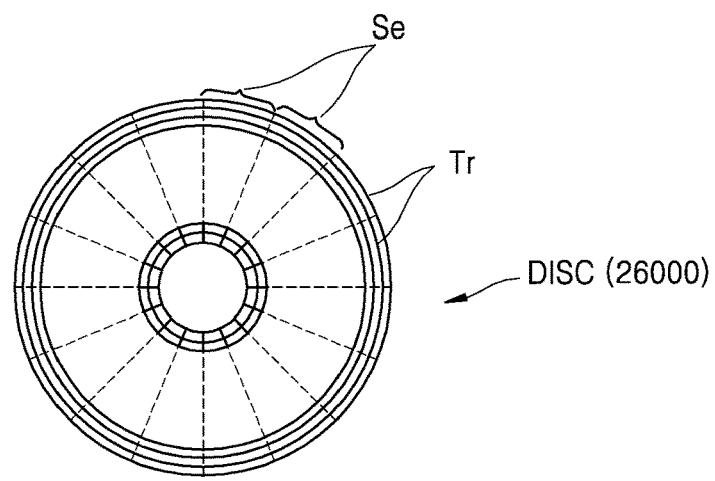
FIG. 21 illustrates a diagram of a physical structure of a disc in which a program is stored, according to an embodiment.

FIG. 21 illustrates a diagram of a physical structure of the disc 26000 in which a program is stored, according to various embodiments. The disc 26000, which is a storage medium, may be a hard drive, a compact disc-read only memory (CD-ROM) disc, a Blu-ray disc, or a digital versatile disc (DVD). The disc 26000 includes a plurality of concentric tracks Tr that are each divided into a specific number of sectors Se in a circumferential direction of the disc 26000. In a specific region of the disc 26000, a program that executes the quantized parameter determining method, the video encoding method, and the video decoding method described above may be assigned and stored.

A computer system embodied using a storage medium that stores a program for executing the video encoding method and the video decoding method as described above will now be described with reference to FIG. 22.

Figure 22:
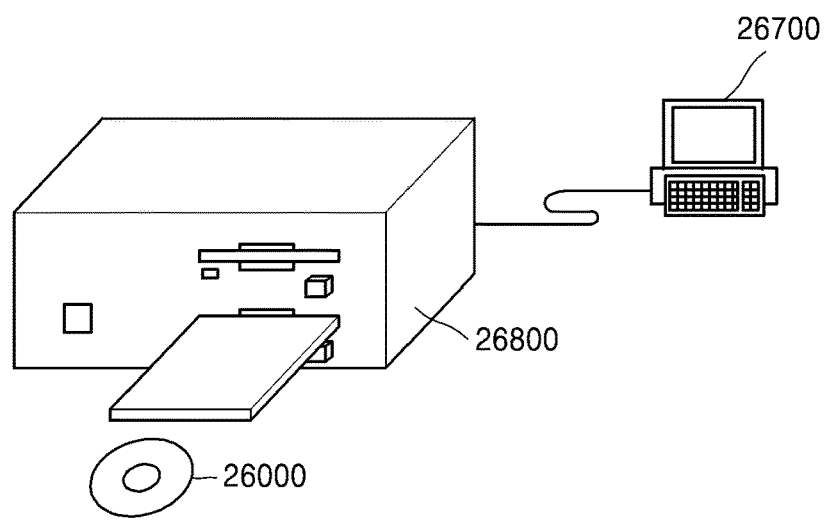
FIG. 22 illustrates a diagram of a disc drive for recording and reading a program by using the disc.

FIG. 22 illustrates a diagram of a disc drive 26800 for recording and reading a program by using the disc 26000. A computer system 26700 may store a program that executes at least one selected from a video encoding method and a video decoding method according to an embodiment, in the disc 26000 via the disc drive 26800. To run the program stored in the disc 26000 in the computer system 26700, the program may be read from the disc 26000 and be transmitted to the computer system 26700 by using the disc drive 26800.

The program that executes at least one selected from a video encoding method and a video decoding method according to an embodiment may be stored not only in the disc 26000 illustrated in FIGS. 21 and 22 but also may be stored in a memory card, a ROM cassette, or a solid state drive (SSD).

A system to which the video encoding method and the video decoding method described above are applied will be described below.

FIG. 23 illustrates a diagram of an overall structure of a content supply system 11000 for providing a content distribution service. A service area of a communication system is divided into predetermined-sized cells, and wireless base stations 11700, 11800, 11900, and 12000 are installed in these cells, respectively.

The content supply system 11000 includes a plurality of independent devices. For example, the plurality of independent devices, such as a computer 12100, a personal digital assistant (PDA) 12200, a video camera 12300, and a mobile phone 12500, are connected to the Internet 11100 via an internet service provider 11200, a communication network 11400, and the wireless base stations 11700, 11800, 11900, and 12000.

However, the content supply system 11000 is not limited to as illustrated in FIG. 23, and devices may be selectively connected thereto. The plurality of independent devices may be directly connected to the communication network 11400, not via the wireless base stations 11700, 11800, 11900, and 12000.

The video camera 12300 is an imaging device, e.g., a digital video camera, which is capable of capturing video images. The mobile phone 12500 may employ at least one communication method from among various protocols, e.g., Personal Digital Communications (PDC), Code Division Multiple Access (CDMA), Wideband-Code Division Multiple Access (W-CDMA), Global System for Mobile Communications (GSM), and Personal Handyphone System (PHS).

The video camera 12300 may be connected to a streaming server 11300 via the wireless base station 11900 and the communication network 11400. The streaming server 11300 allows content received from a user via the video camera 12300 to be streamed via a real-time broadcast. The content received from the video camera 12300 may be encoded using the video camera 12300 or the streaming server 11300. Video data captured by the video camera 12300 may be transmitted to the streaming server 11300 via the computer 12100.

Video data captured by a camera 12600 may also be transmitted to the streaming server 11300 via the computer 12100. The camera 12600 is an imaging device capable of capturing both still images and video images, similar to a digital camera. The video data captured by the camera 12600 may be encoded using the camera 12600 or the computer 12100. Software that performs encoding and decoding video may be stored in a computer-readable recording medium, e.g., a CD-ROM disc, a floppy disc, a hard disc drive, an SSD, or a memory card, which may be accessible by the computer 12100.

If video data is captured by a camera built in the mobile phone 12500, the video data may be received from the mobile phone 12500.

The video data may also be encoded by a large scale integrated circuit (LSI) system installed in the video camera 12300, the mobile phone 12500, or the camera 12600.

The content supply system 11000 may encode content data recorded by a user using the video camera 12300, the camera 12600, the mobile phone 12500, or another imaging device, e.g., content recorded during a concert, and transmit the encoded content data to the streaming server 11300. The streaming server 11300 may transmit the encoded content data in a type of a streaming content to other clients that request the content data.

The clients are devices capable of decoding the encoded content data, e.g., the computer 12100, the PDA 12200, the video camera 12300, or the mobile phone 12500. Thus, the content supply system 11000 allows the clients to receive and reproduce the encoded content data. Also, the content supply system 11000 allows the clients to receive the encoded content data and decode and reproduce the encoded content data in real time, thereby enabling personal broadcasting.

Encoding and decoding operations of the plurality of independent devices included in the content supply system 11000 may be similar to those of a video encoding apparatus and a video decoding apparatus according to embodiments.

Figure 24:
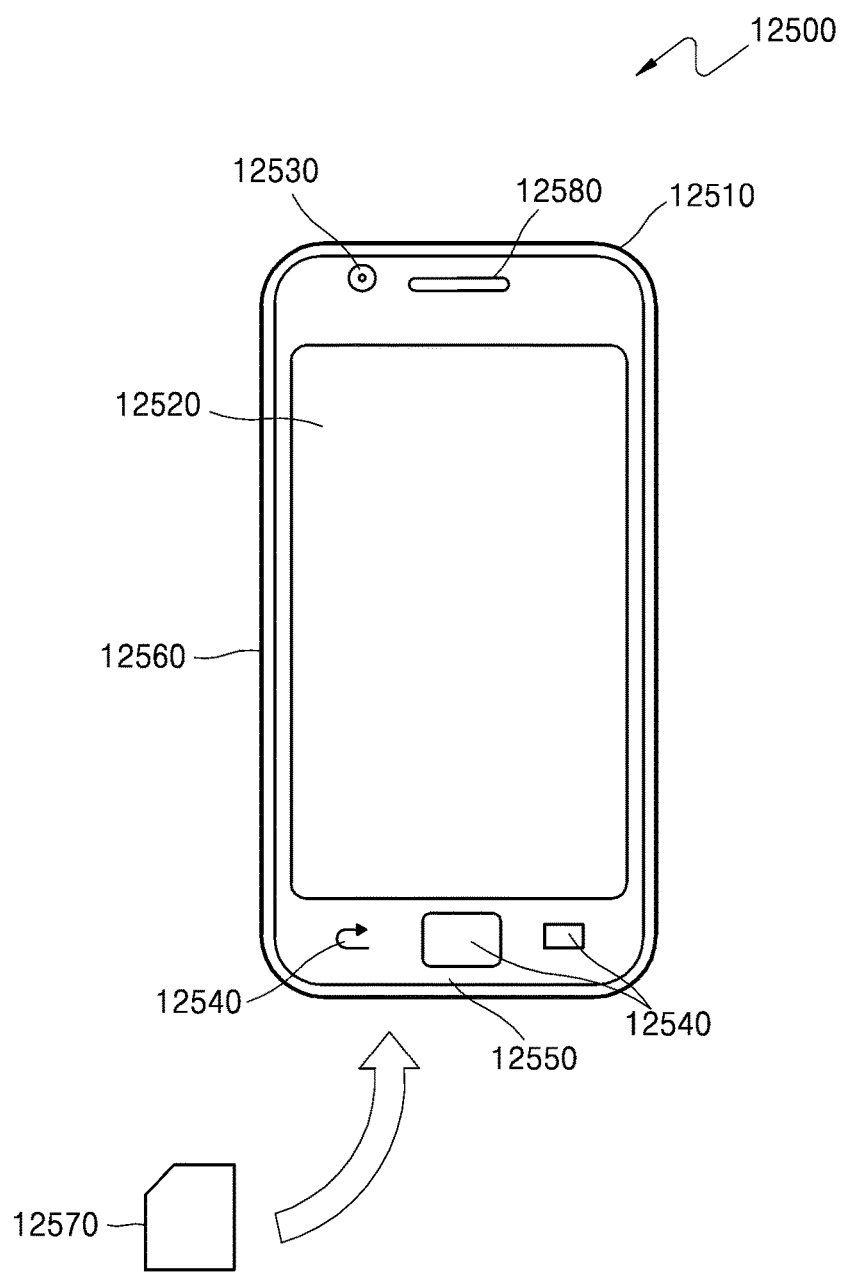
FIGS. 24 and 25 illustrate external and internal structures of a mobile phone to which a video encoding method and a video decoding method are applied, according to embodiments.
Figure 25:
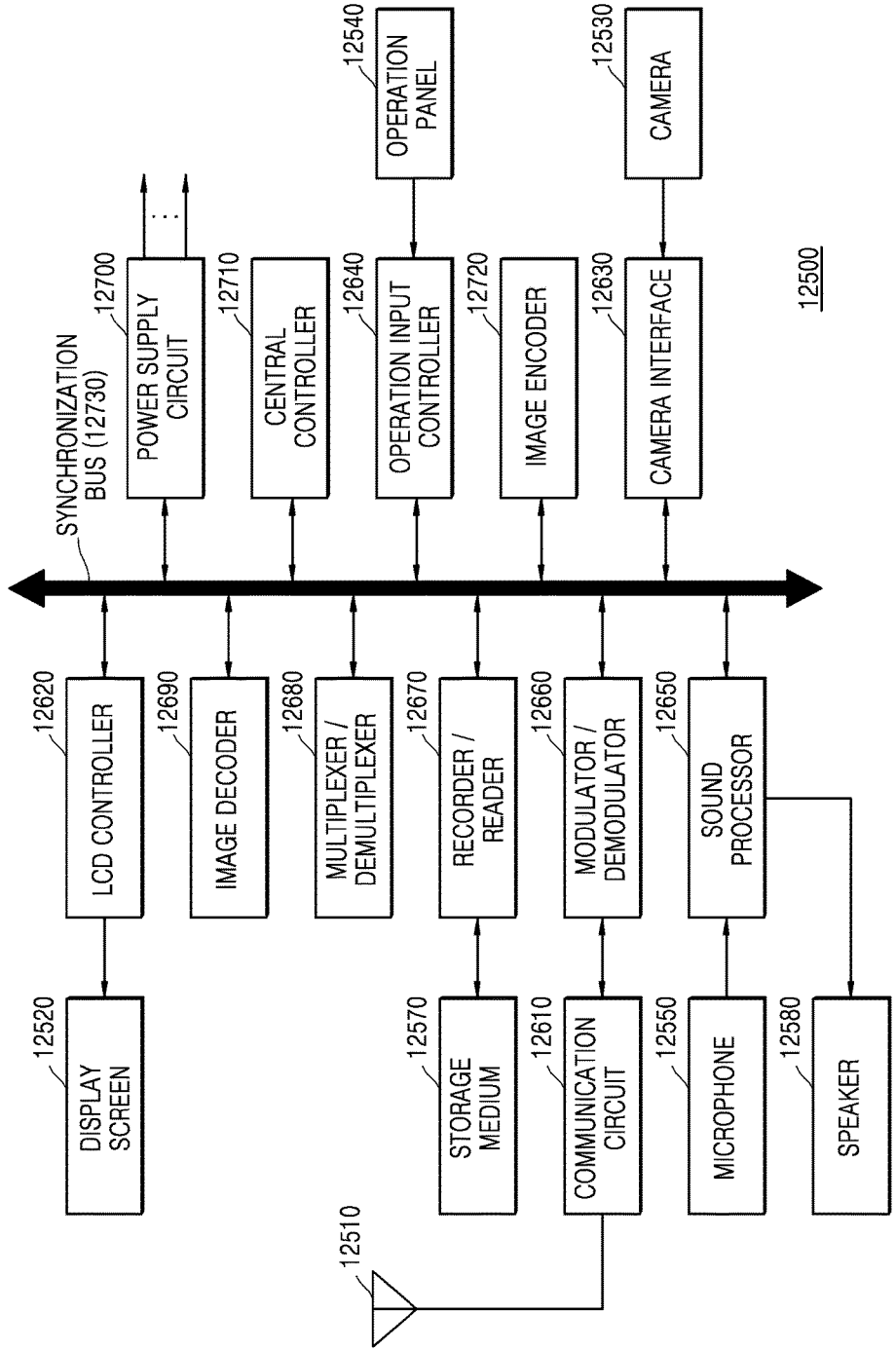

With reference to FIGS. 24 and 25, the mobile phone 12500 included in the content supply system 11000 according to an embodiment will now be described in detail.

FIG. 24 illustrates an external structure of the mobile phone 12500 to which a video encoding method and a video decoding method are applied, according to various embodiments. The mobile phone 12500 may be a smart phone, the functions of which are not limited and a large number of the functions of which may be changed or expanded.

The mobile phone 12500 includes an internal antenna 12510 via which a radio-frequency (RF) signal may be exchanged with the wireless base station 12000, and includes a display screen 12520 for displaying images captured by a camera 12530 or images that are received via the antenna 12510 and decoded, e.g., a liquid crystal display (LCD) or an organic light-emitting diode (OLED) screen.

The mobile phone 12500 includes an operation panel 12540 including a control button and a touch panel. If the display screen 12520 is a touch screen, the operation panel 12540 further includes a touch sensing panel of the display screen 12520. The mobile phone 12500 includes a speaker 12580 for outputting voice and sound or another type of a sound output unit, and a microphone 12550 for inputting voice and sound or another type of a sound input unit. The mobile phone 12500 further includes the camera 12530, such as a charge-coupled device (CCD) camera, to capture video and still images. The mobile phone 12500 may further include a storage medium 12570 for storing encoded/decoded data, e.g., video or still images captured by the camera 12530, received via email, or obtained according to various ways; and a slot 12560 via which the storage medium 12570 is loaded into the mobile phone 12500. The storage medium 12570 may be a flash memory, e.g., a secure digital (SD) card or an electrically erasable and programmable read only memory (EEPROM) included in a plastic case.

FIG. 25 illustrates an internal structure of the mobile phone 12500. In order to systemically control parts of the mobile phone 12500 including the display screen 12520 and the operation panel 12540, a power supply circuit 12700, an operation input controller 12640, an image encoder 12720, a camera interface 12630, an LCD controller 12620, an image decoder 12690, a multiplexer/demultiplexer 12680, a recording/reading unit 12670, a modulation/demodulation unit 12660, and a sound processor 12650 are connected to a central controller 12710 via a synchronization bus 12730.

If a user operates a power button and sets from a 'power off' state to a 'power on' state, the power supply circuit 12700 supplies power to all the parts of the mobile phone 12500 from a battery pack, thereby setting the mobile phone 12500 to an operation mode.

The central controller 12710 includes a central processing unit (CPU), a ROM, and a RAM.

While the mobile phone 12500 transmits communication data to the outside, a digital signal is generated by the mobile phone 12500 under control of the central controller 12710. For example, the sound processor 12650 may generate a digital sound signal, the image encoder 12720 may generate a digital image signal, and text data of a message may be generated via the operation panel 12540 and the operation input controller 12640. When a digital signal is transmitted to the modulation/demodulation unit 12660 by control of the central controller 12710, the modulation/demodulation unit 12660 modulates a frequency band of the digital signal, and a communication circuit 12610 performs digital-to-analog conversion (DAC) and frequency conversion on the frequency band-modulated digital sound signal. A transmission signal output from the communication circuit 12610 may be transmitted to a voice communication base station or the wireless base station 12000 via the antenna 12510.

For example, when the mobile phone 12500 is in a conversation mode, a sound signal obtained via the microphone 12550 is transformed into a digital sound signal by the sound processor 12650, by control of the central controller 12710. The digital sound signal may be transformed into a transformation signal via the modulation/demodulation unit 12660 and the communication circuit 12610, and may be transmitted via the antenna 12510.

When a text message, e.g., email, is transmitted during a data communication mode, text data of the text message is input via the operation panel 12540 and is transmitted to the central controller 12610 via the operation input controller 12640. By control of the central controller 12610, the text data is transformed into a transmission signal via the modulation/demodulation unit 12660 and the communication circuit 12610 and is transmitted to the wireless base station 12000 via the antenna 12510.

In order to transmit image data during the data communication mode, image data captured by the camera 12530 is provided to the image encoder 12720 via the camera interface 12630. The captured image data may be directly displayed on the display screen 12520 via the camera interface 12630 and the LCD controller 12620.

A structure of the image encoder 12720 may correspond to that of the video encoding apparatus 100 described above. The image encoder 12720 may transform the image data received from the camera 12530 into compressed and encoded image data according to the aforementioned video encoding method, and then output the encoded image data to the multiplexer/demultiplexer 12680. During a recording operation of the camera 12530, a sound signal obtained by the microphone 12550 of the mobile phone 12500 may be transformed into digital sound data via the sound processor 12650, and the digital sound data may be transmitted to the multiplexer/demultiplexer 12680.

The multiplexer/demultiplexer 12680 multiplexes the encoded image data received from the image encoder 12720, together with the sound data received from the sound processor 12650. A result of multiplexing the data may be transformed into a transmission signal via the modulation/demodulation unit 12660 and the communication circuit 12610, and may then be transmitted via the antenna 12510.

While the mobile phone 12500 receives communication data from the outside, frequency recovery and ADC are performed on a signal received via the antenna 12510 to transform the signal into a digital signal. The modulation/demodulation unit 12660 modulates a frequency band of the digital signal. The frequency-band modulated digital signal is transmitted to the video decoder 12690, the sound processor 12650, or the LCD controller 12620, according to the type of the digital signal.

During the conversation mode, the mobile phone 12500 amplifies a signal received via the antenna 12510, and obtains a digital sound signal by performing frequency conversion and ADC on the amplified signal. A received digital sound signal is transformed into an analog sound signal via the modulation/demodulation unit 12660 and the sound processor 12650, and the analog sound signal is output via the speaker 12580, by control of the central controller 12710.

When during the data communication mode, data of a video file accessed at an Internet website is received, a signal received from the wireless base station 12000 via the antenna 12510 is output as multiplexed data via the modulation/demodulation unit 12660, and the multiplexed data is transmitted to the multiplexer/demultiplexer 12680.

In order to decode the multiplexed data received via the antenna 12510, the multiplexer/demultiplexer 12680 demultiplexes the multiplexed data into an encoded video data stream and an encoded audio data stream. Via the synchronization bus 12730, the encoded video data stream and the encoded audio data stream are provided to the video decoder 12690 and the sound processor 12650, respectively.

A structure of the image decoder 12690 may correspond to that of the video decoding apparatus described above. The image decoder 12690 may decode the encoded video data to obtain reconstructed video data and provide the reconstructed video data to the display screen 12520 via the LCD controller 12620, by using the aforementioned video decoding method according to the embodiment.

Thus, the data of the video file accessed at the Internet website may be displayed on the display screen 12520. At the same time, the sound processor 12650 may transform audio data into an analog sound signal, and provide the analog sound signal to the speaker 12580. Thus, audio data contained in the video file accessed at the Internet website may also be reproduced via the speaker 12580.

The mobile phone 12500 or another type of communication terminal may be a transceiving terminal including both a video encoding apparatus and a video decoding apparatus according to an embodiment, may be a transmitting terminal including only the video encoding apparatus, or may be a receiving terminal including only the video decoding apparatus.

Figure 26:
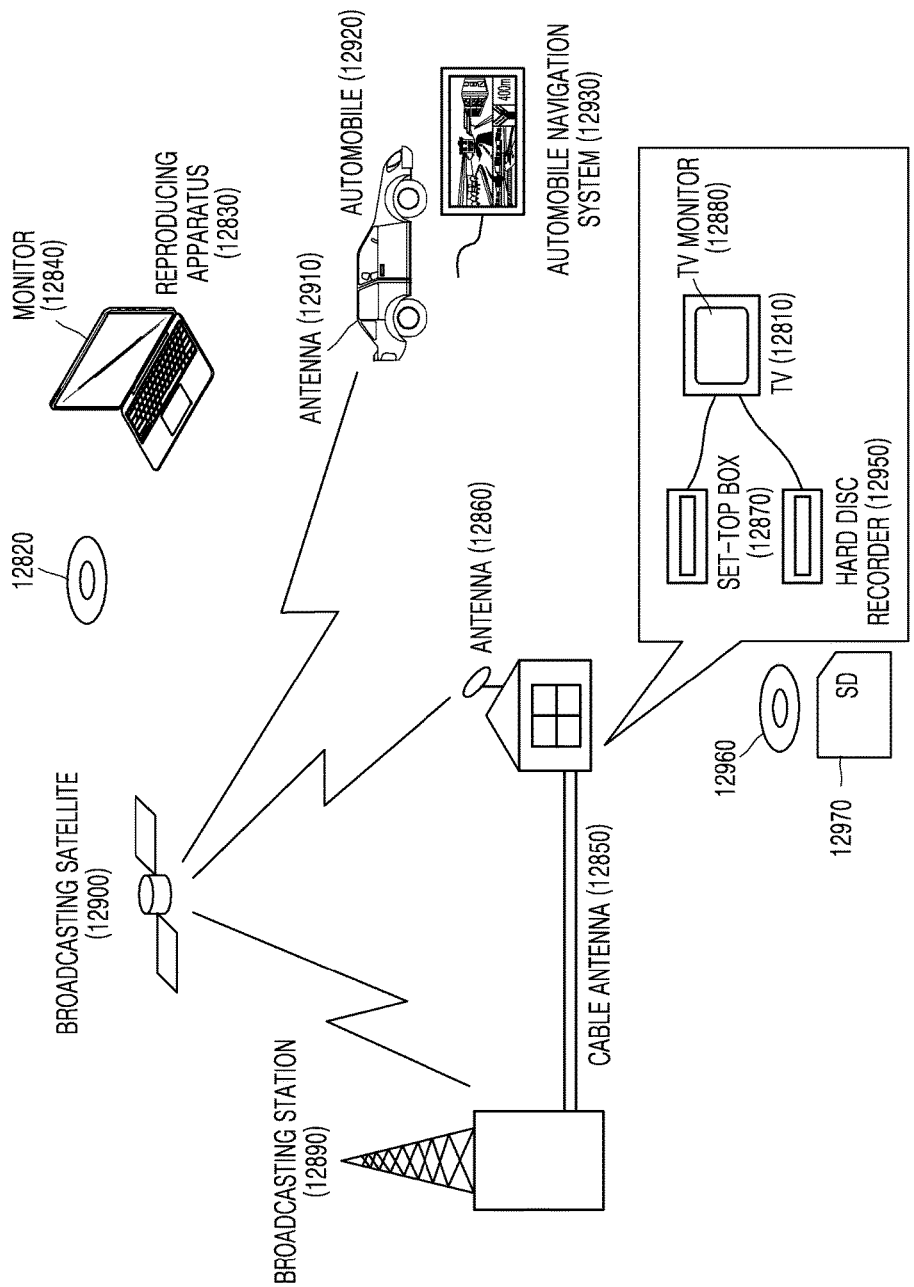
FIG. 26 illustrates a digital broadcasting system to which a communication system is applied, according to an embodiment of the present invention.

A communication system according to an embodiment is not limited to the communication system described above with reference to FIG. 24. For example, FIG. 26 illustrates a digital broadcasting system employing a communication system, according to various embodiments. The digital broadcasting system of FIG. 26 may receive a digital broadcast transmitted via a satellite or a terrestrial network by using the video encoding apparatus and the video decoding apparatus according to the embodiments.

In more detail, a broadcasting station 12890 transmits a video data stream to a communication satellite or a broadcasting satellite 12900 by using radio waves. The broadcasting satellite 12900 transmits a broadcast signal, and the broadcast signal is transmitted to a satellite broadcast receiver via a household antenna 12860. In every house, an encoded videostream may be decoded and reproduced by a TV receiver 12810, a set-top box 12870, or another device.

When the video decoding apparatus according to the embodiment is implemented in a reproducing apparatus 12830, the reproducing apparatus 12830 may parse and decode an encoded videostream recorded on a storage medium 12820, such as a disc or a memory card to reconstruct digital signals. Thus, the reconstructed video signal may be reproduced, for example, on a monitor 12840.

In the set-top box 12870 connected to the antenna 12860 for a satellite/terrestrial broadcast or a cable antenna 12850 for receiving a cable television (TV) broadcast, the video decoding apparatus according to the embodiment may be installed. Data output from the set-top box 12870 may also be reproduced on a TV monitor 12880.

As another example, the video decoding apparatus according to the embodiment may be installed in the TV receiver 12810 instead of the set-top box 12870.

An automobile 12920 that has an appropriate antenna 12910 may receive a signal transmitted from the satellite 12900 or the wireless base station 11700. A decoded video may be reproduced on a display screen of an automobile navigation system 12930 installed in the automobile 12920.

A video signal may be encoded by the video encoding apparatus according to the embodiment and may then be stored in a storage medium. In more detail, an image signal may be stored in a DVD disc 12960 by a DVD recorder or may be stored in a hard disc by a hard disc recorder 12950. As another example, the video signal may be stored in an SD card 12970. If the hard disc recorder 12950 includes the video decoding apparatus according to the embodiment, a video signal recorded on the DVD disc 12960, the SD card 12970, or another storage medium may be reproduced on the TV monitor 12880.

The automobile navigation system 12930 may not include the camera 12530, the camera interface 12630, and the image encoder 12720 of FIG. 25. For example, the computer 12100 and the TV receiver 12810 may not include the camera 12530, the camera interface 12630, and the image encoder 12720 of FIG. 25.

Figure 27:
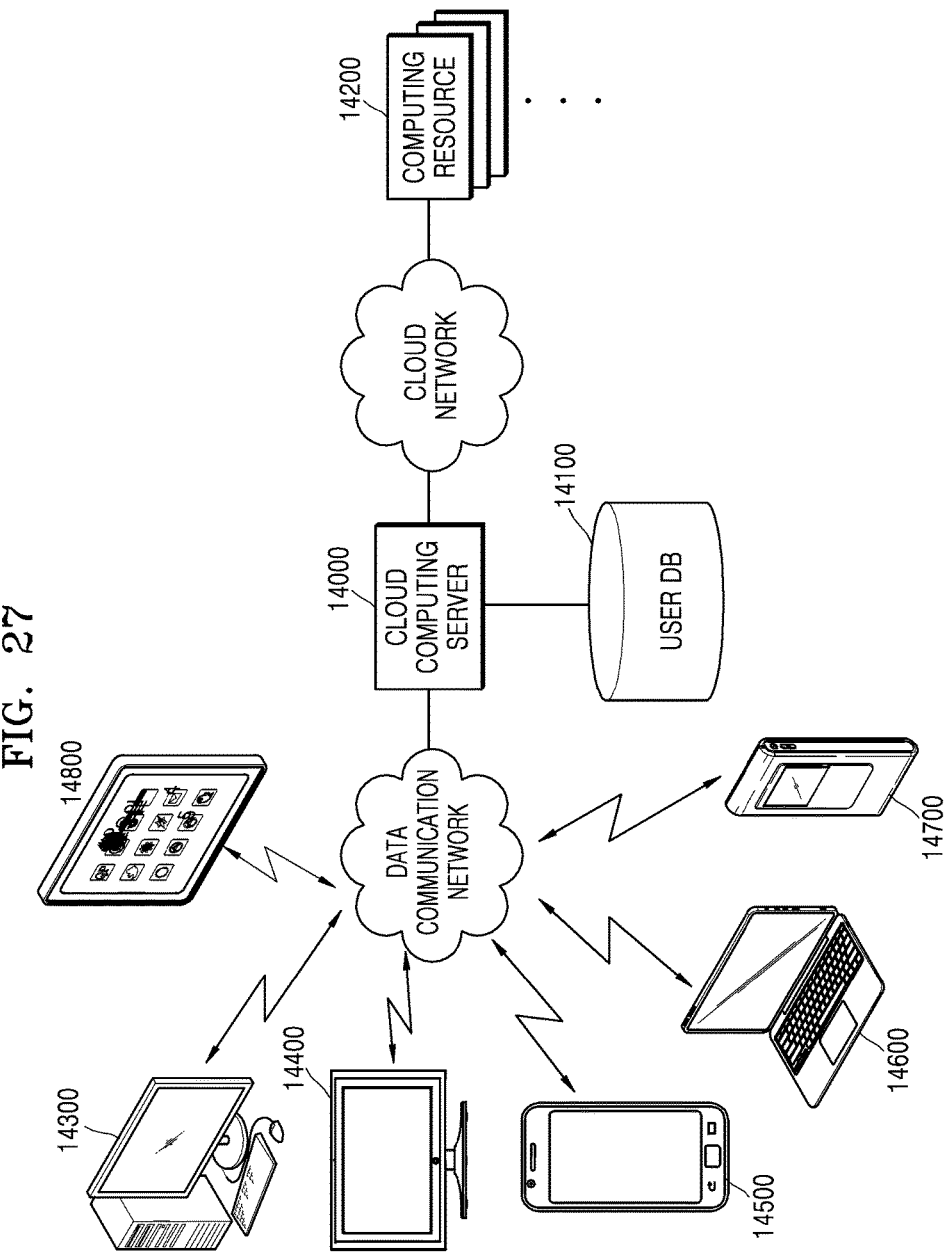
FIG. 27 is a diagram illustrating a network structure of a cloud computing system using a video encoding apparatus and a video decoding apparatus, according to an embodiment of the present invention.

FIG. 27 is a diagram illustrating a network structure of a cloud computing system using a video encoding apparatus and a video decoding apparatus, according to various embodiments.

The cloud computing system of the present invention may include a cloud computing server 14000, a user database (DB) 14100, a plurality of computing resources 14200, and a user terminal.

The cloud computing system provides an on-demand outsourcing service of the plurality of computing resources 14200 via a data communication network, e.g., the Internet, in response to a request from the user terminal. Under a cloud computing environment, a service provider provides users with desired services by combining computing resources at data centers located at physically different locations by using virtualization technology. A service user does not have to install computing resources, e.g., an application, a storage, an operating system (OS), and security software, into his/her own terminal in order to use them, but may select and use desired services from among services in a virtual space generated through the virtualization technology, at a desired point in time.

A user terminal of a specified service user is connected to the cloud computing server 14000 via a data communication network including the Internet and a mobile telecommunication network. User terminals may be provided cloud computing services, and particularly video reproduction services, from the cloud computing server 14000. The user terminals may be various types of electronic devices capable of being connected to the Internet, e.g., a desktop PC 14300, a smart TV 14400, a smart phone 14500, a notebook computer 14600, a portable multimedia player (PMP) 14700, a tablet PC 14800, and the like.

The cloud computing server 14000 may combine the plurality of computing resources 14200 distributed in a cloud network and provide user terminals with a result of combining. The plurality of computing resources 14200 may include various data services, and may include data uploaded from user terminals. As described above, the cloud computing server 14000 may provide user terminals with desired services by combining video database distributed in different regions according to the virtualization technology.

User information about users who have subscribed for a cloud computing service is stored in the user DB 14100. The user information may include logging information, addresses, names, and personal credit information of the users. The user information may further include indexes of videos. Here, the indexes may include a list of videos that have already been reproduced, a list of videos that are being reproduced, a pausing point of a video that was being reproduced, and the like.

Information about a video stored in the user DB 14100 may be shared between user devices. For example, when a video service is provided to the notebook computer 14600 in response to a request from the notebook computer 14600, a reproduction history of the video service is stored in the user DB 14100. When a request to reproduce the video service is received from the smart phone 14500, the cloud computing server 14000 searches for and reproduces the video service, based on the user DB 14100. When the smart phone 14500 receives a video data stream from the cloud computing server 14000, a process of reproducing video by decoding the video data stream is similar to an operation of the mobile phone 12500 described above with reference to FIG. 24.

The cloud computing server 14000 may refer to a reproduction history of a desired video service, stored in the user DB 14100. For example, the cloud computing server 14000 receives a request to reproduce a video stored in the user DB 14100, from a user terminal. If this video was being reproduced, then a method of streaming this video, performed by the cloud computing server 14000, may vary according to the request from the user terminal, i.e., according to whether the video will be reproduced, starting from a start thereof or a pausing point thereof. For example, if the user terminal requests to reproduce the video, starting from the start thereof, the cloud computing server 14000 transmits streaming data of the video starting from a first frame thereof to the user terminal. If the user terminal requests to reproduce the video, starting from the pausing point thereof, the cloud computing server 14000 transmits streaming data of the video starting from a frame corresponding to the pausing point, to the user terminal.

In this case, the user terminal may include the video decoding apparatus described above with reference to FIGS. 1A through 20. In another example, the user terminal may include the video encoding apparatus described above with reference to FIGS. 1A through 20. Alternatively, the user terminal may include both the video decoding apparatus and the video encoding apparatus which are described above with reference to FIGS. 1A through 20.

Various applications where the video encoding method, the video decoding method, the video encoding apparatus, and the video decoding apparatus which are described above with reference to FIGS. 1A through 20 are described above with reference to FIGS. 21 through 27. However, methods of storing the video encoding method and the video decoding method which are described above with reference to FIGS. 1A through 20 in a storage medium or methods of implementing the video encoding apparatus and the video decoding apparatus which are described above with reference to FIGS. 1A through 20 in a device are not limited to the embodiments described above with reference to FIGS. 21 through 27.

While various embodiments have been particularly shown and described, it will be understood by one of ordinary skill in the art that various changes in form and details may be made therein without departing from the spirit and scope of the following claims. The disclosed embodiments should be considered in a descriptive sense only and not for purposes of limitation. Therefore, the scope of the present specification is defined not by the detailed description but by the appended claims, and all differences within the scope will be construed as being included in the scope of the present specification.

The invention claimed is:

1. An inter-layer decoding method comprising:
   reconstructing a color image and a depth image of a first layer, based on encoding
   information about the color image and the depth image of the first layer, wherein the encoding information is obtained from a bitstream;
   determining, from the depth image of the first layer, a sub block of a depth image block of the first layer which corresponds to a sub block of a current block of a second layer image;
   determining whether an area included in the sub block of the determined depth image block of the first layer deviates outside of a boundary of the depth image of the first layer;
   when the area included in the sub block of the depth image block deviates outside of the boundary, determining a depth value of the area deviating outside of the boundary of the depth image by setting a coordinate of the area included in the sub block of the depth image block to correspond to a coordinate of the boundary of the depth image of the first layer;
   determining a disparity vector indicating a corresponding sub block of the first layer with respect to the sub block of the current block, by using a depth value of a pixel among depth values of pixels adjacent to four vertices of the sub block of the depth image block, wherein the depth value of the pixel is a depth value of a pixel included in the area included in the sub block of the depth image block, a coordinate of the pixel is determined to be set to correspond to the coordinate of the boundary of the depth image of the first layer; and
   reconstructing the current block by using the disparity vector.

2. The inter-layer decoding method of claim 1, wherein the determining of the depth value of the area deviating outside of the boundary of the depth image comprises:
   determining the depth value of the area deviating outside of the boundary of the depth image according to a prediction mode of the current block.

3. The inter-layer decoding method of claim 1, wherein, when the area included in the determined depth image block of the first layer deviates outside of the boundary of the depth image of the first layer, the disparity vector is not determined based on a depth value of the depth image block.

4. The inter-layer decoding method of claim 1, wherein the determining of the depth value of the area deviating outside of the boundary of the depth image comprises:
   determining the depth value of the area deviating outside of the boundary as a predetermined depth value.

5. An inter-layer encoding method comprising:
   generating a bitstream comprising encoding information generated by encoding a color image and a depth image of a first layer;
   determining, from the depth image of the first layer, a sub block of a depth image block of the first layer which corresponds to a sub block of a current block of a second layer image;
   determining whether an area included in the determined sub block of the depth image block of the first layer deviates outside of a boundary of the depth image of the first layer;
   when the area included in the sub block of the depth image block deviates outside of the boundary, determining a depth value of the area deviating outside of the boundary of the depth image by setting a coordinate of the area included in the sub block of the depth image block to correspond to a coordinate of the boundary of the depth image of the first layer;
   determining a disparity vector indicating a corresponding sub block of the first layer with respect to the sub block of the current block, by using a depth value of a pixel among depth
   values of pixels adjacent to four vertices of the sub block of the determined depth value of the area deviating outside of the boundary, wherein the depth value of the pixel is a depth value of a pixel included in the area included in the sub block of the depth image block, a coordinate of the pixel is determined to be set to correspond to the coordinate of the boundary of the depth image of the first layer; and
   encoding the current block by using the disparity vector.

6. The inter-layer encoding method of claim 5, wherein the determining of the depth value of the area deviating outside of the boundary of the depth image comprises:

determining the depth value of the area deviating outside of the boundary of the depth image according to a prediction mode of the current block.

7. An inter-layer decoding apparatus comprising at least one processor configured to reconstruct a color image and a depth image of a first layer, based on encoding information about the color image and the depth image of the first layer, wherein the encoding information is obtained from a bitstream, to determine, from the depth image of the first layer, a sub block of a depth image block of the first layer which corresponds to a sub block of a current block of a second layer image, to determine whether an area included in the determined depth image block of the first layer deviates outside of a boundary of the depth image of the first layer, when the area included in the sub block of the depth image block deviates outside of the boundary, to determine a depth value of the area deviating outside of the boundary of the depth image by setting a coordinate of the area included in the sub block of the depth image block to correspond to a coordinate of the boundary of the depth image of the first layer, and to determine a disparity vector indicating a corresponding sub block of the first layer with respect to the current block, by using a depth value of a pixel among depth values of pixels adjacent to four vertices of the sub block of the depth image block, wherein the depth value of the pixel is a depth value of a pixel included in the area included in the sub block of the depth image block, a coordinate of the pixel is determined to be set to correspond to the coordinate of the boundary of the depth image of the first layer, and to reconstruct the current block by using the disparity vector.

* * * * *